United States Patent
Ramaiah et al.

(10) Patent No.: US 12,216,946 B1
(45) Date of Patent: Feb. 4, 2025

(54) SOFTWARE RAID/MANAGEMENT TRUSTED STORAGE-DEVICE-BASED COMMUNICATION SYSTEM

(71) Applicant: Dell Products L.P., Round Rock, TX (US)

(72) Inventors: Dharma Bhushan Ramaiah, Bangalore (IN); Vineeth Radhakrishnan, Bangalore (IN); Shinose Abdul Rahiman, Bangalore (IN); Rama Rao Bisa, Bangalore (IN); Nikhith Ganigarakoppal Kantharaju, Hassan (IN); Sumalatha Pagadala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/228,538

(22) Filed: Jul. 31, 2023

(51) Int. Cl.
*G06F 3/06* (2006.01)

(52) U.S. Cl.
CPC .......... *G06F 3/0689* (2013.01); *G06F 3/0622* (2013.01); *G06F 3/0655* (2013.01)

(58) Field of Classification Search
None
See application file for complete search history.

(56) References Cited

U.S. PATENT DOCUMENTS

| | | | |
|---|---|---|---|
| 11,652,616 B2 * | 5/2023 | Zee | H04L 9/0833 380/279 |
| 2020/0218678 A1 | 7/2020 | Prabhakar et al. | |
| 2023/0087829 A1 * | 3/2023 | Ponnuru | G06F 21/6218 726/17 |

* cited by examiner

*Primary Examiner* — Brian R Peugh
(74) *Attorney, Agent, or Firm* — Joseph Mencher

(57) ABSTRACT

A software Redundant Array of Independent Disk (RAID)/ management trusted storage-device-based communication system includes a chassis housing a software Redundant Array of Independent Disk (RAID) subsystem, a storage device that is coupled to the software RAID subsystem and that includes a storage device memory subsystem, and a management subsystem that is coupled to the storage device. The management subsystem authenticates the storage device to establish management subsystem/storage device trust between the management subsystem and the storage device and, in response, uses the storage device to establish management subsystem/software RAID subsystem trust between the management subsystem and the software RAID subsystem. In response to establishing the management subsystem/ storage device trust and the management subsystem/software RAID subsystem trust, the management subsystem transmits communications with the software RAID subsystem via the storage device memory subsystem in the storage device.

20 Claims, 56 Drawing Sheets

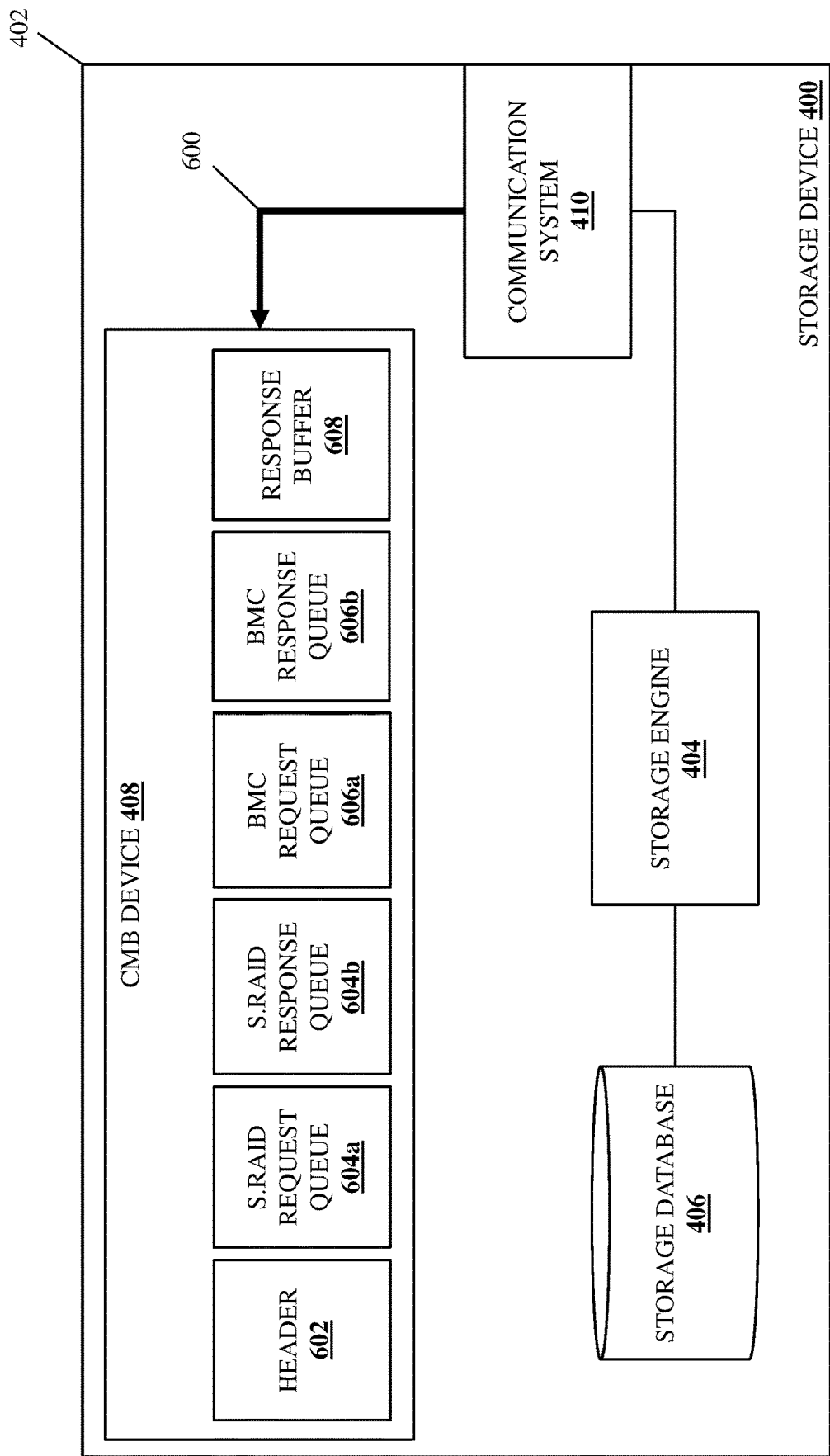

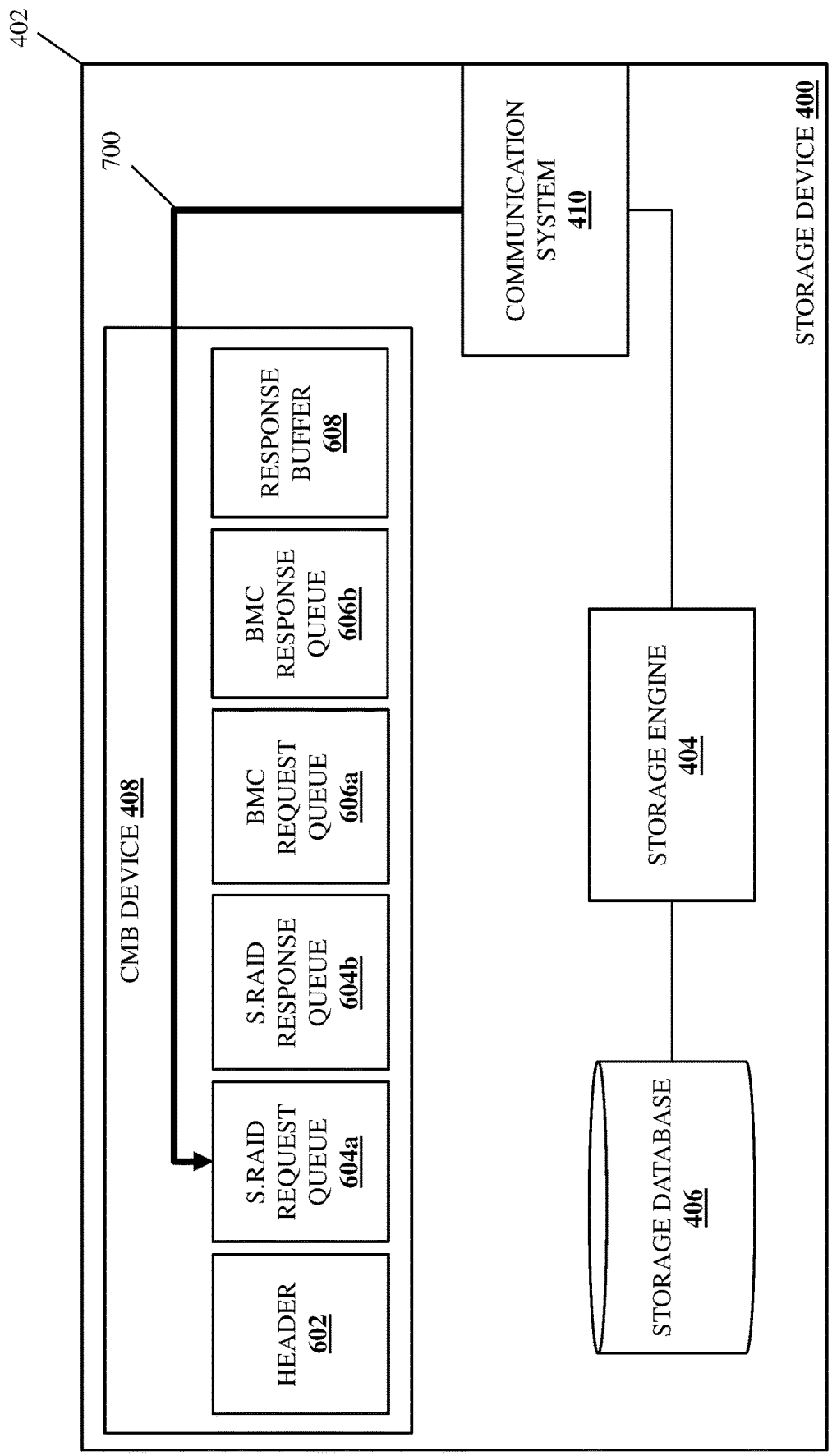

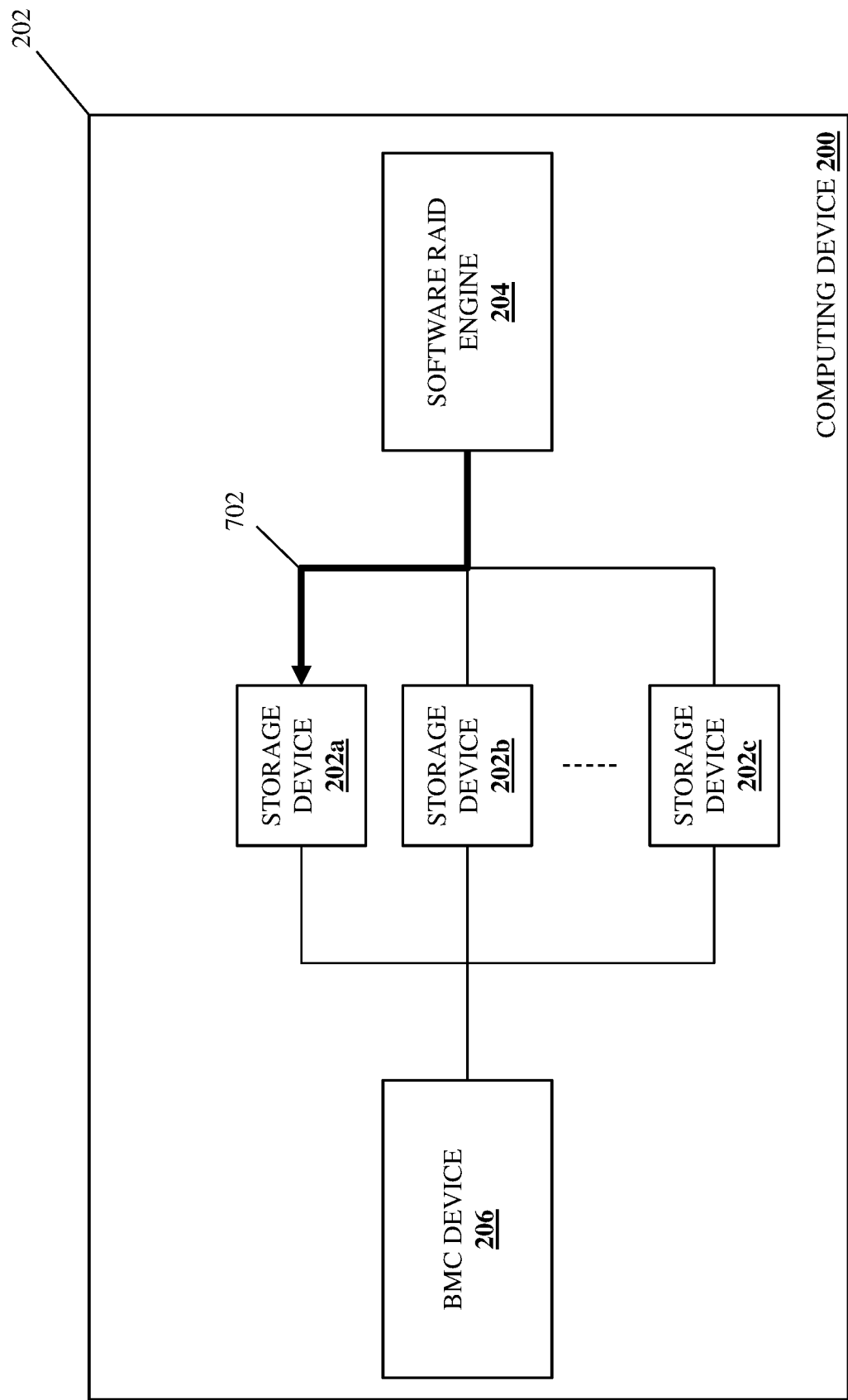

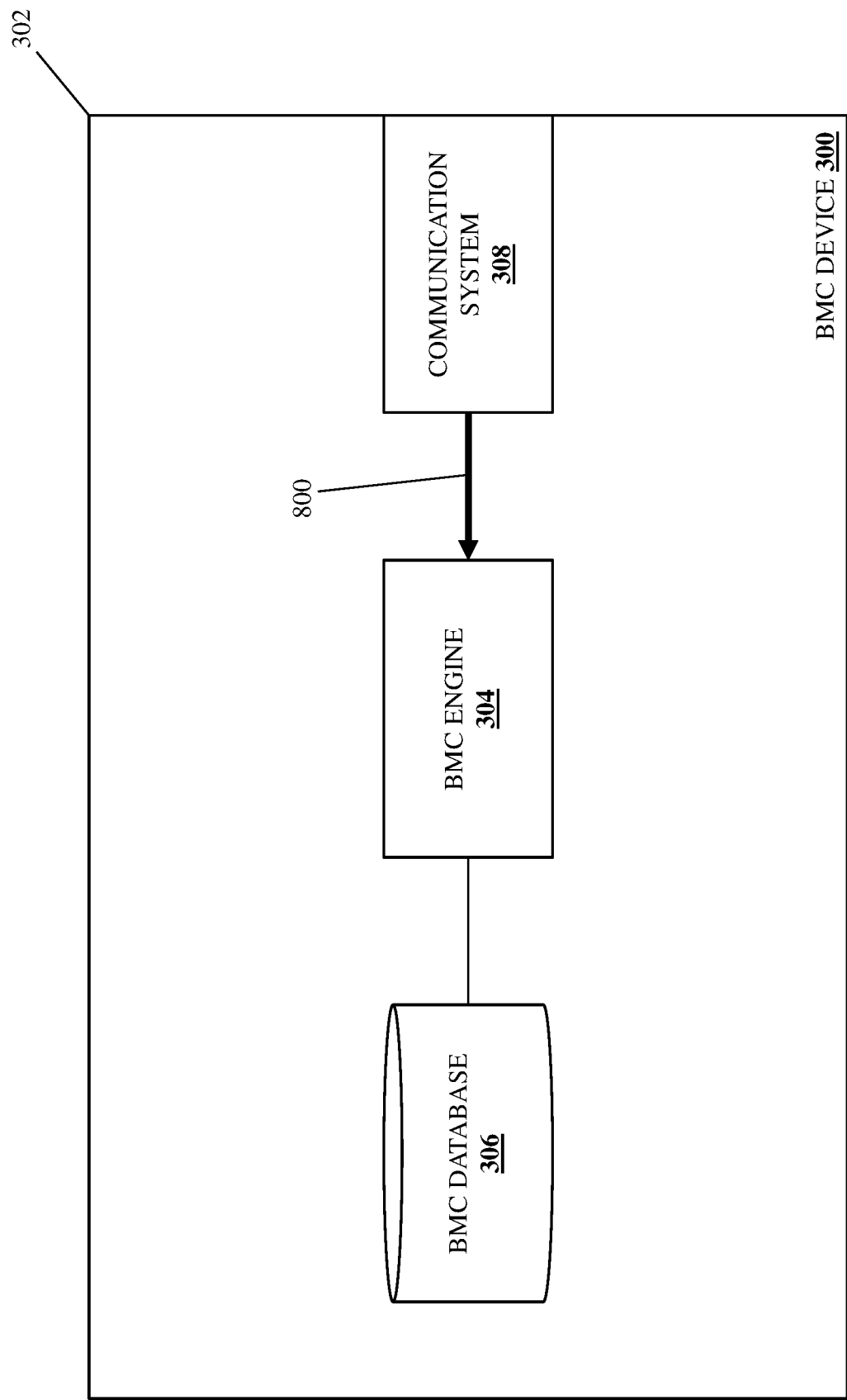

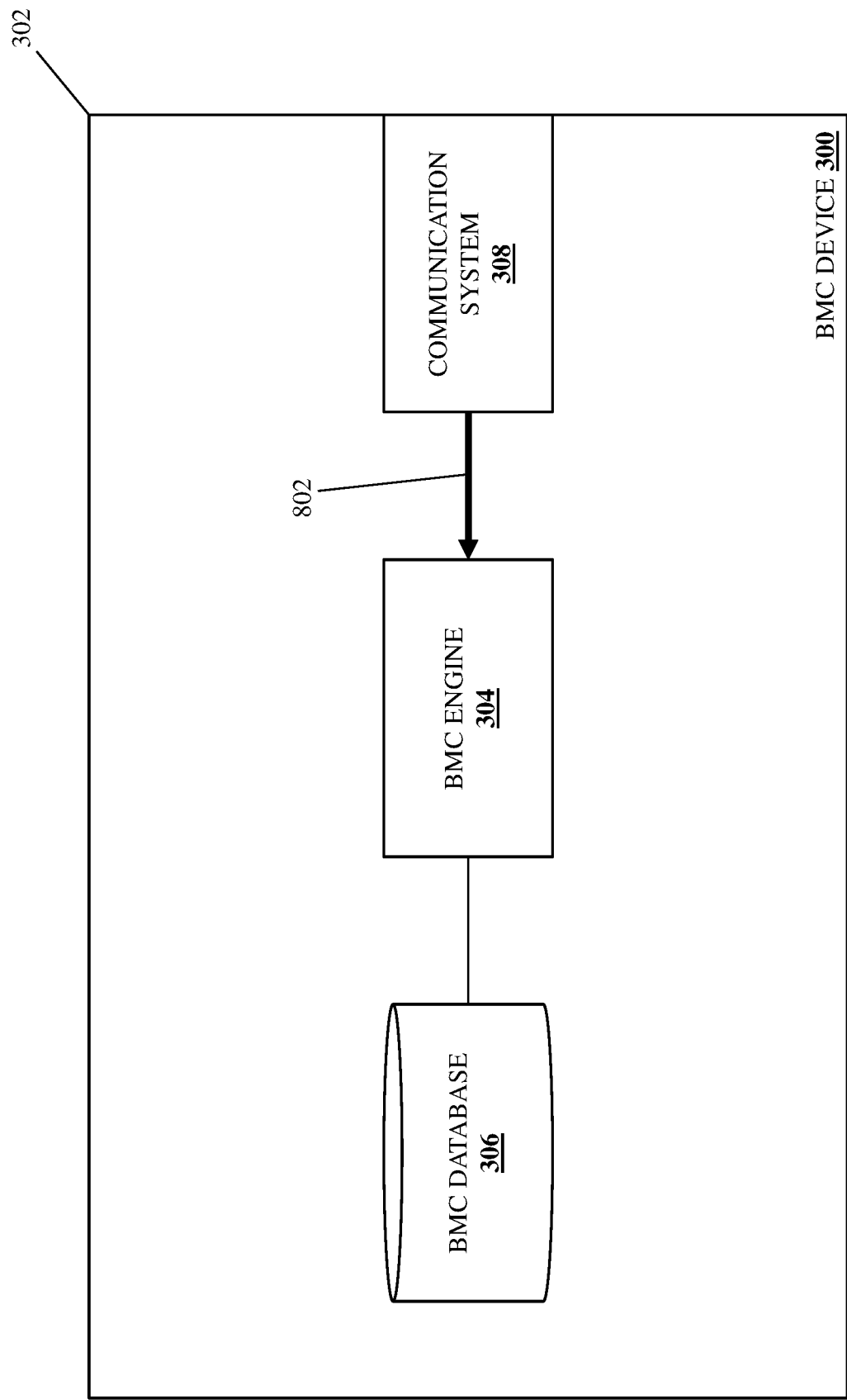

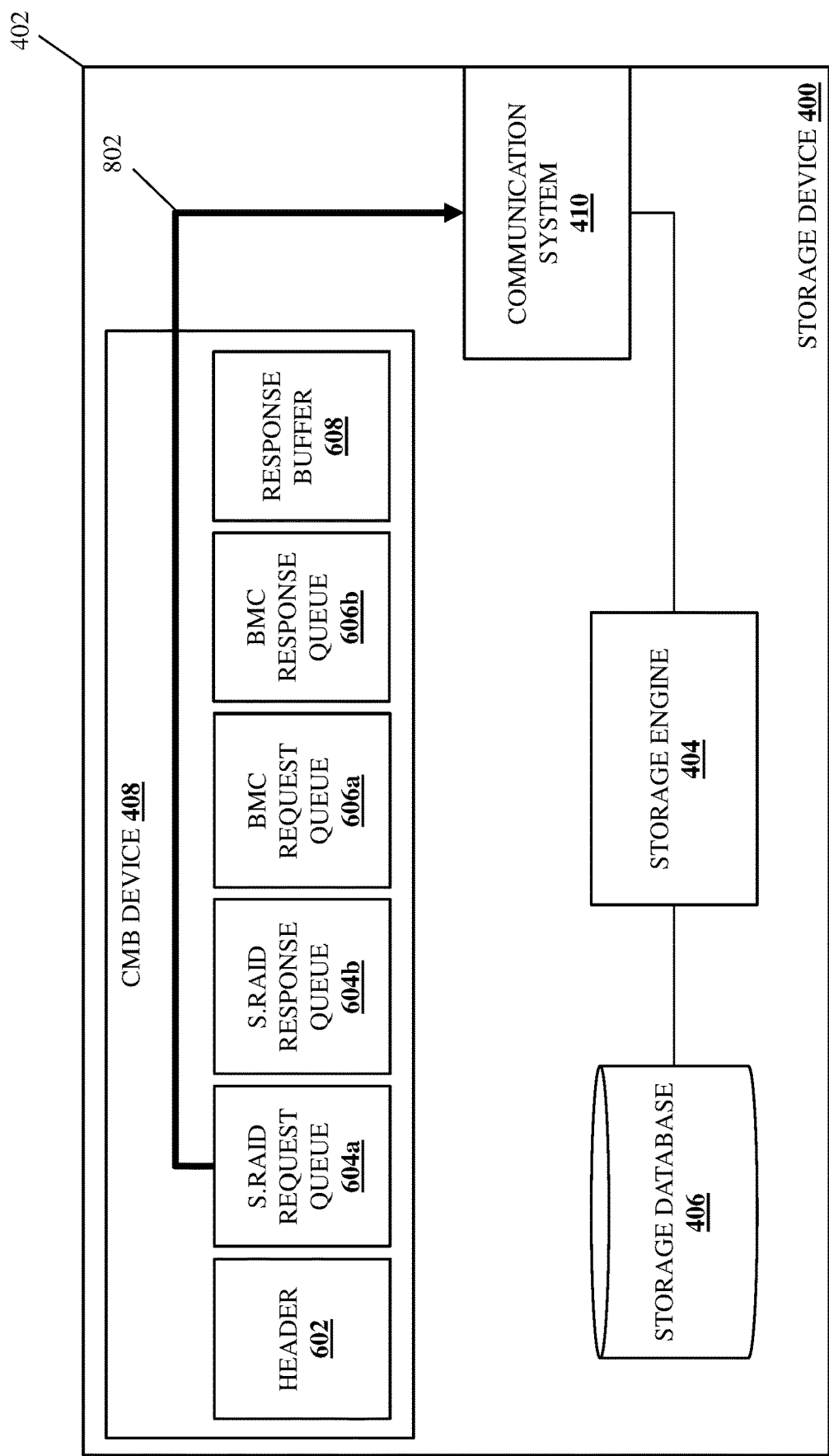

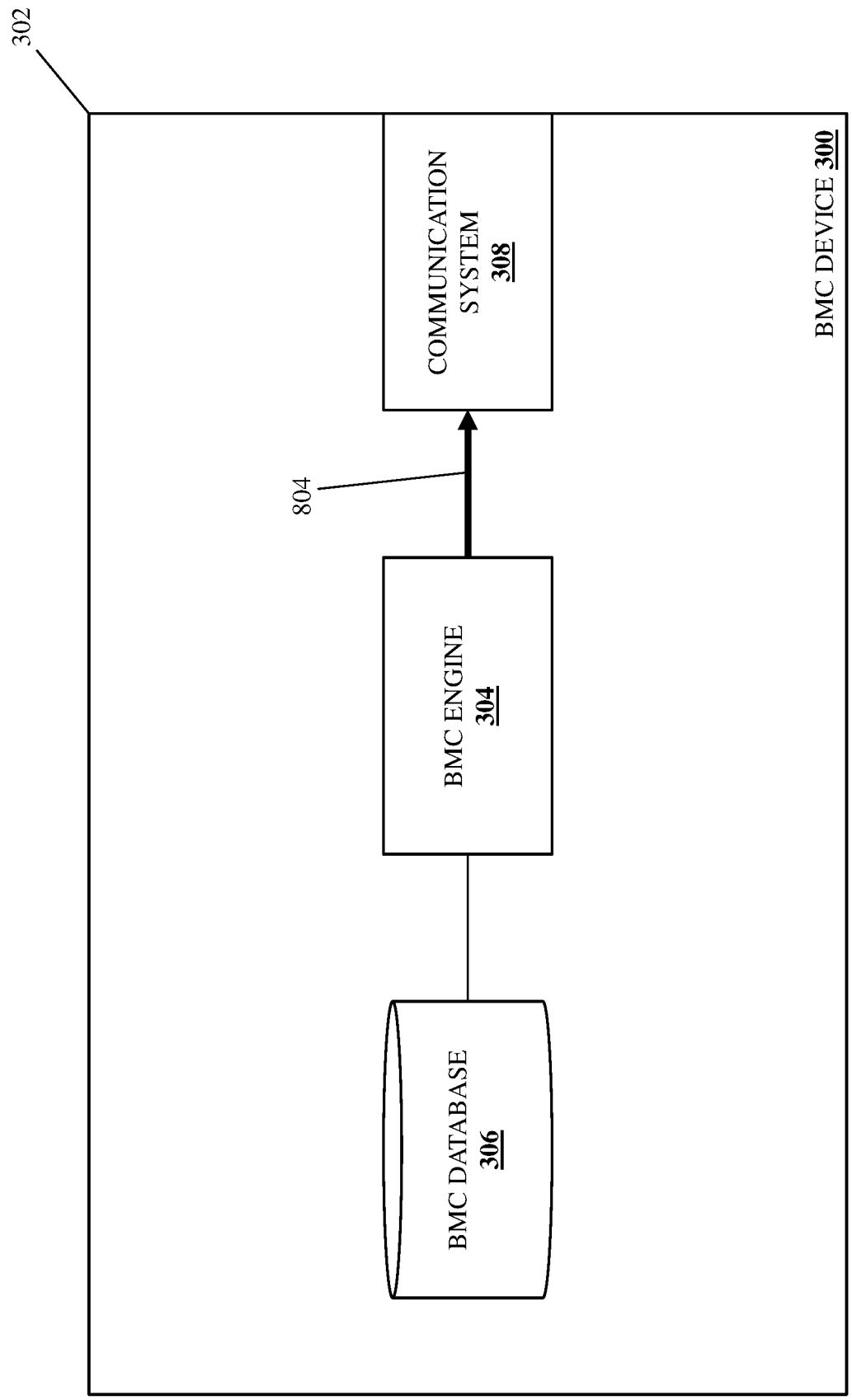

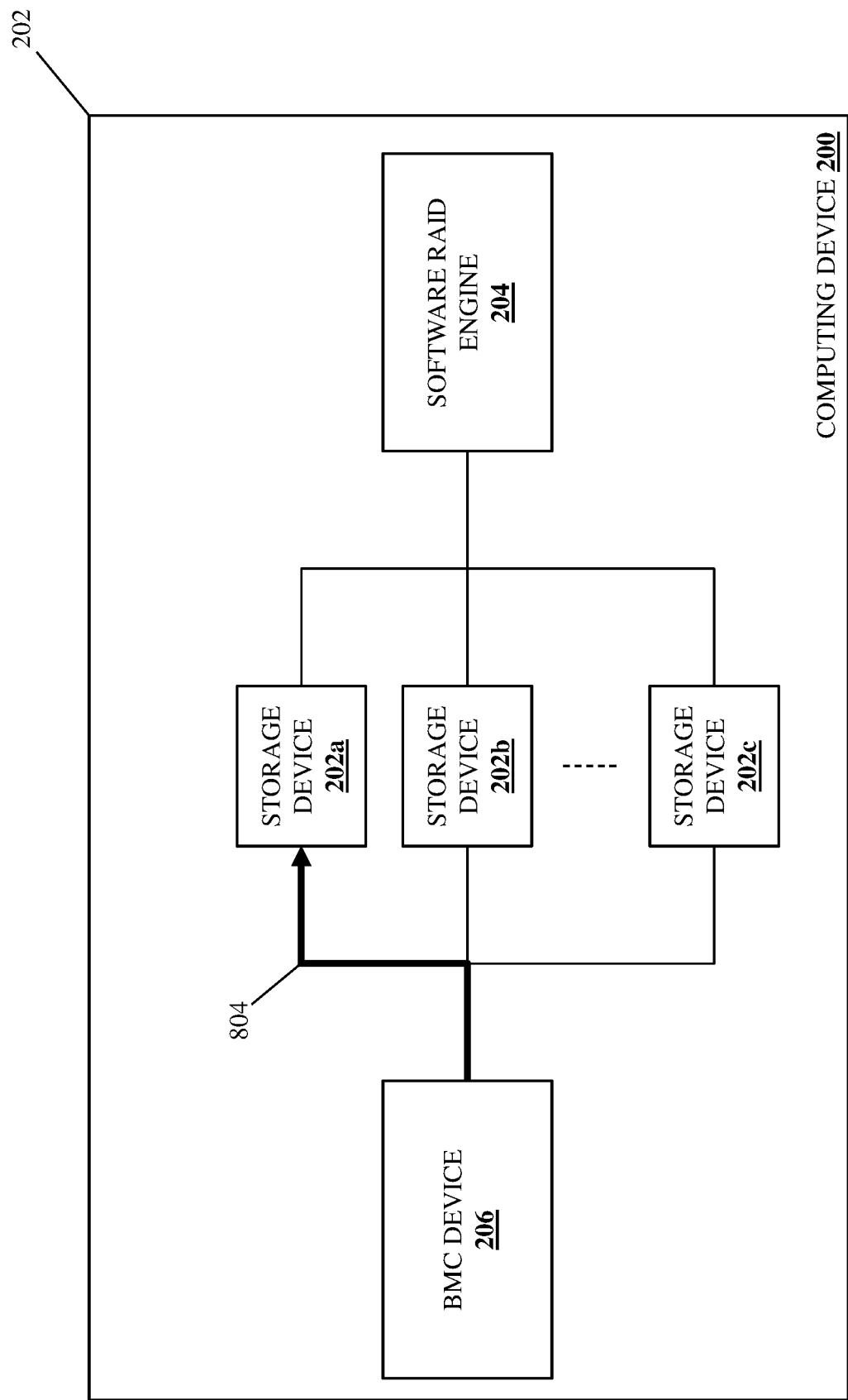

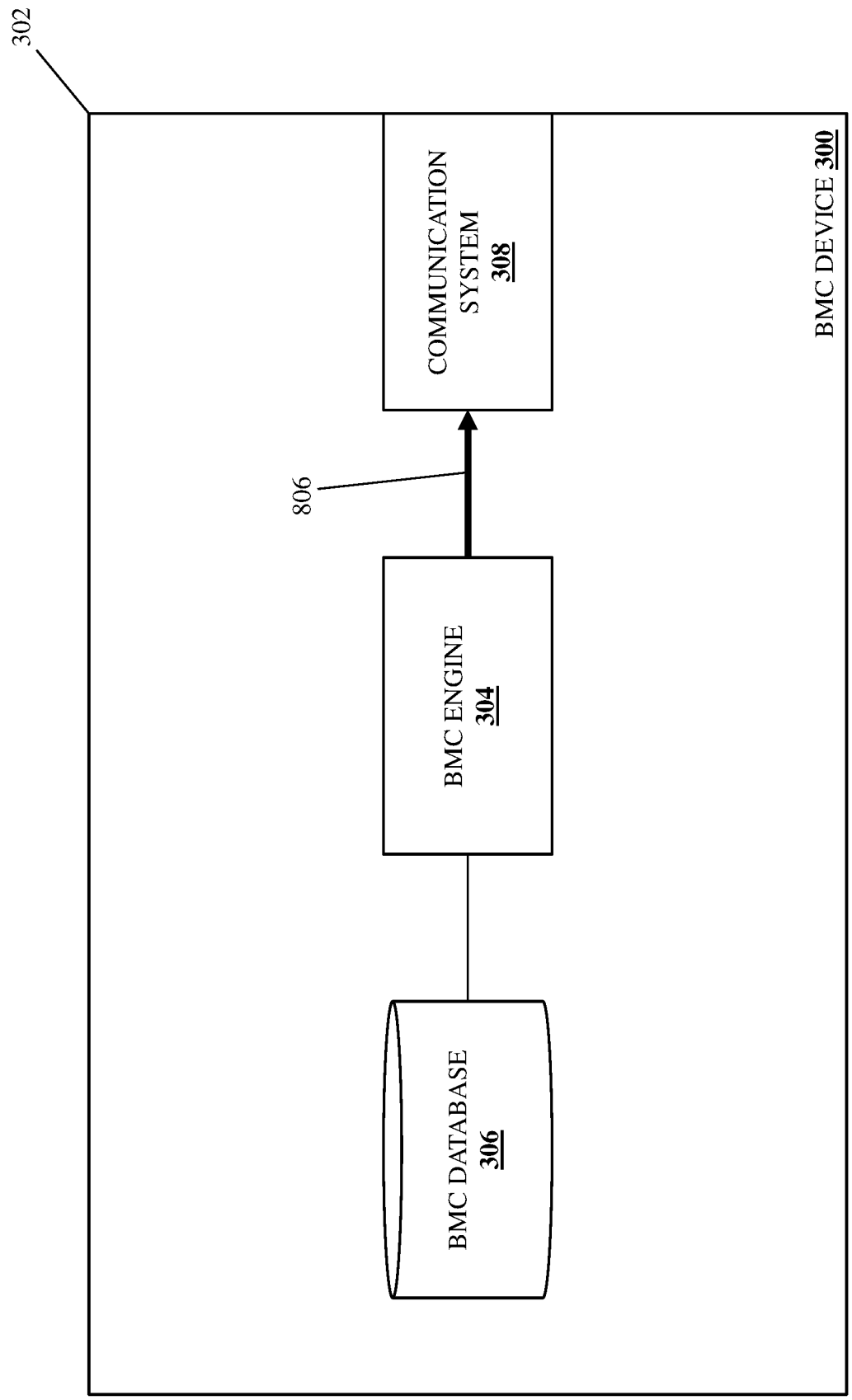

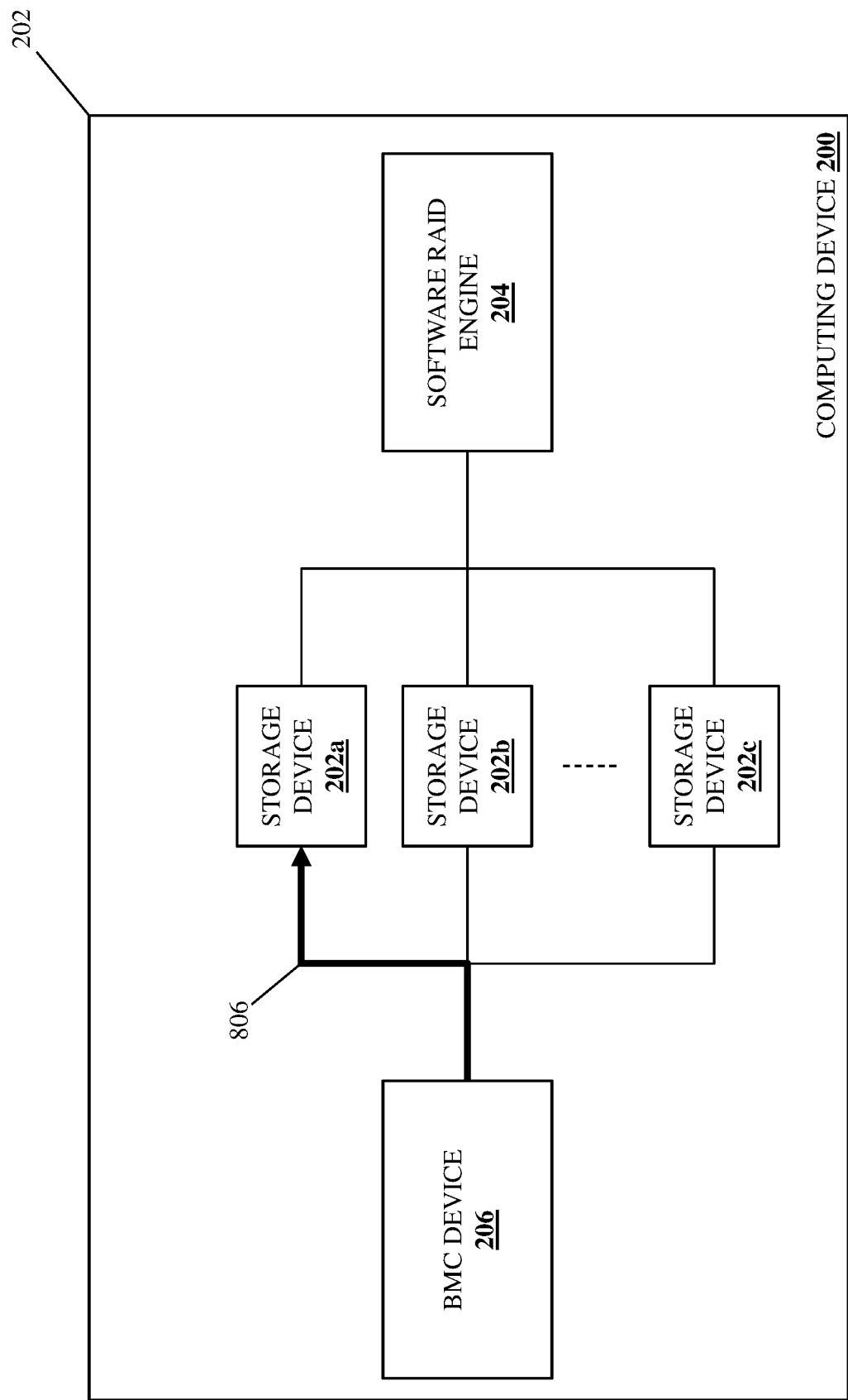

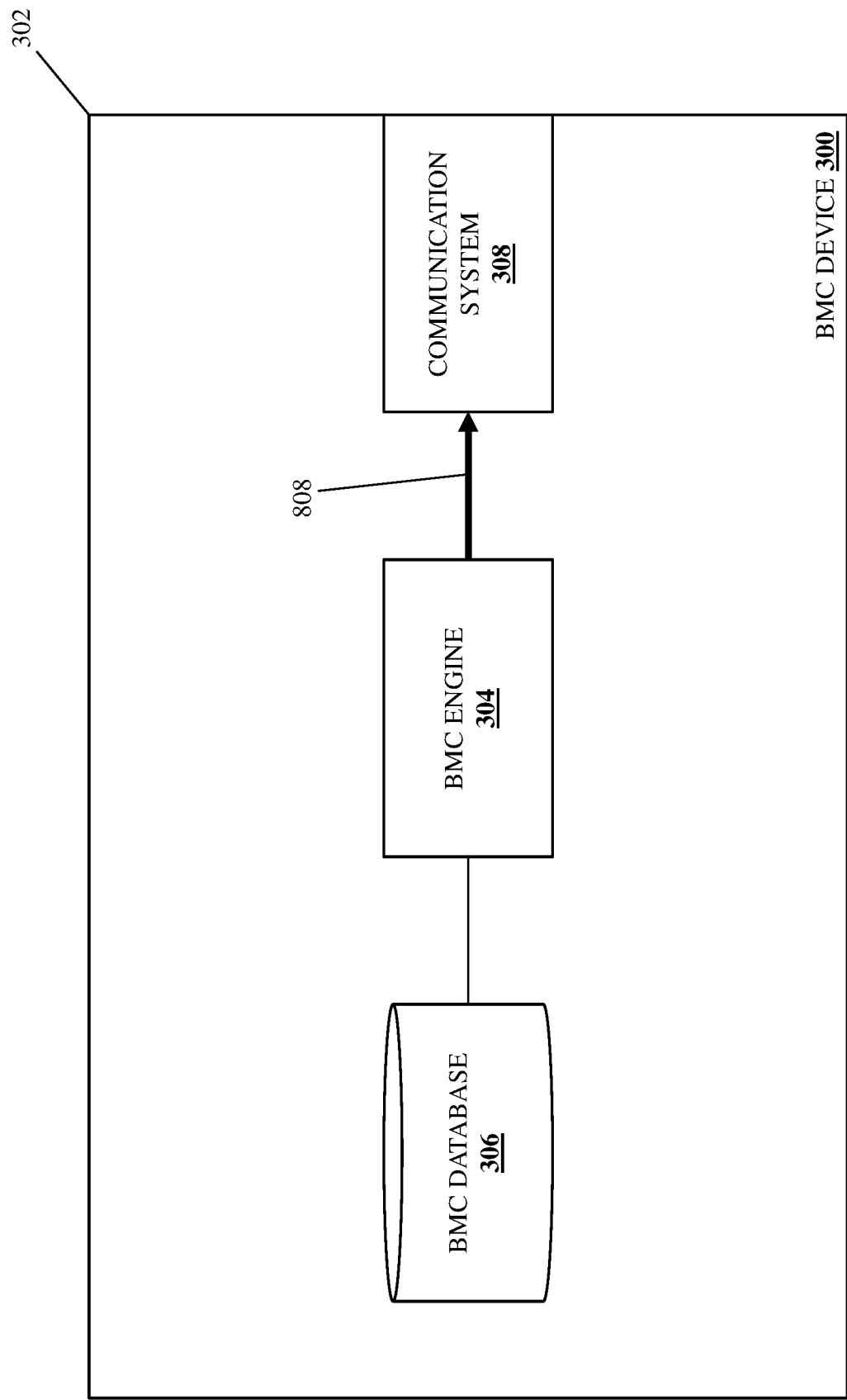

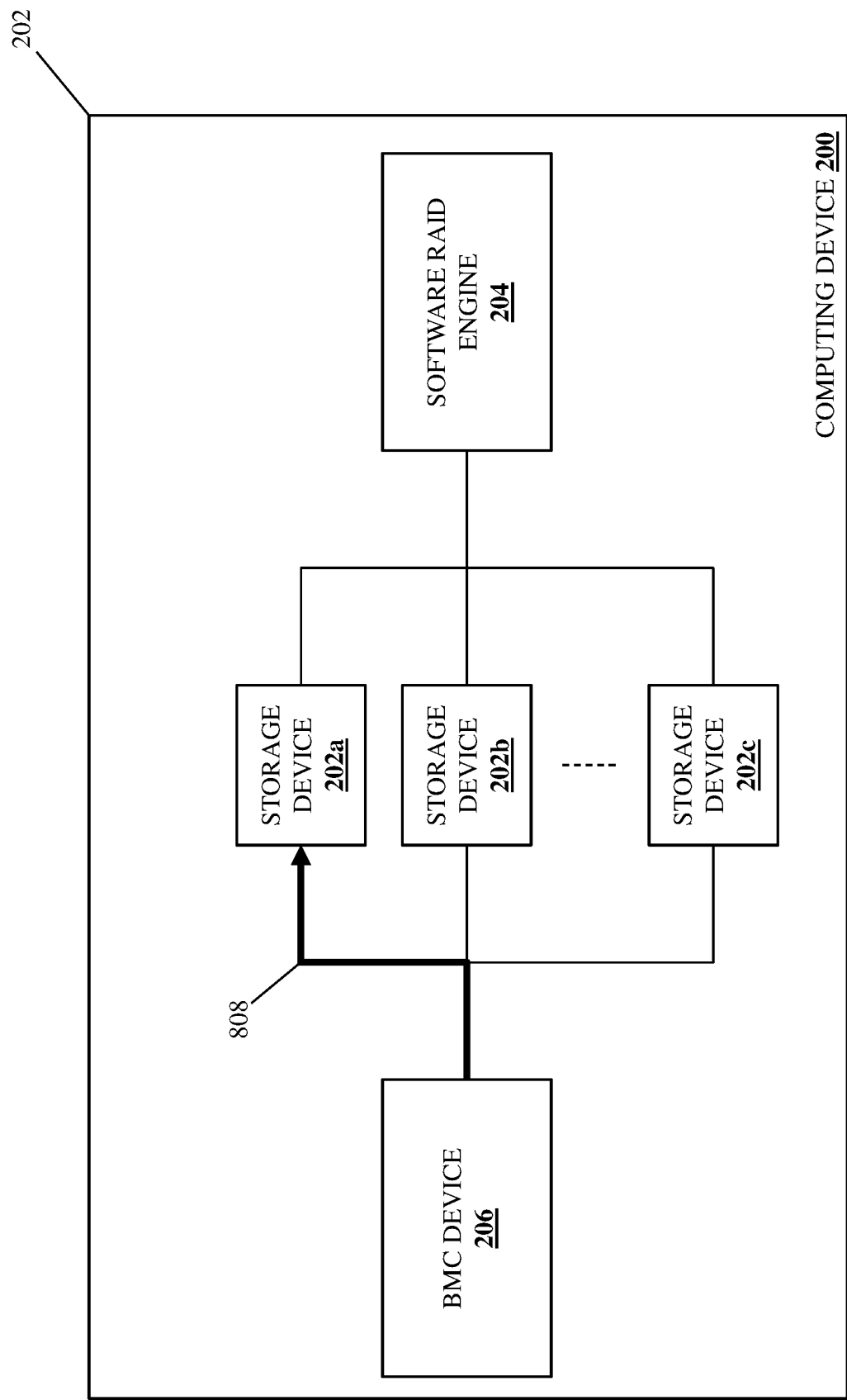

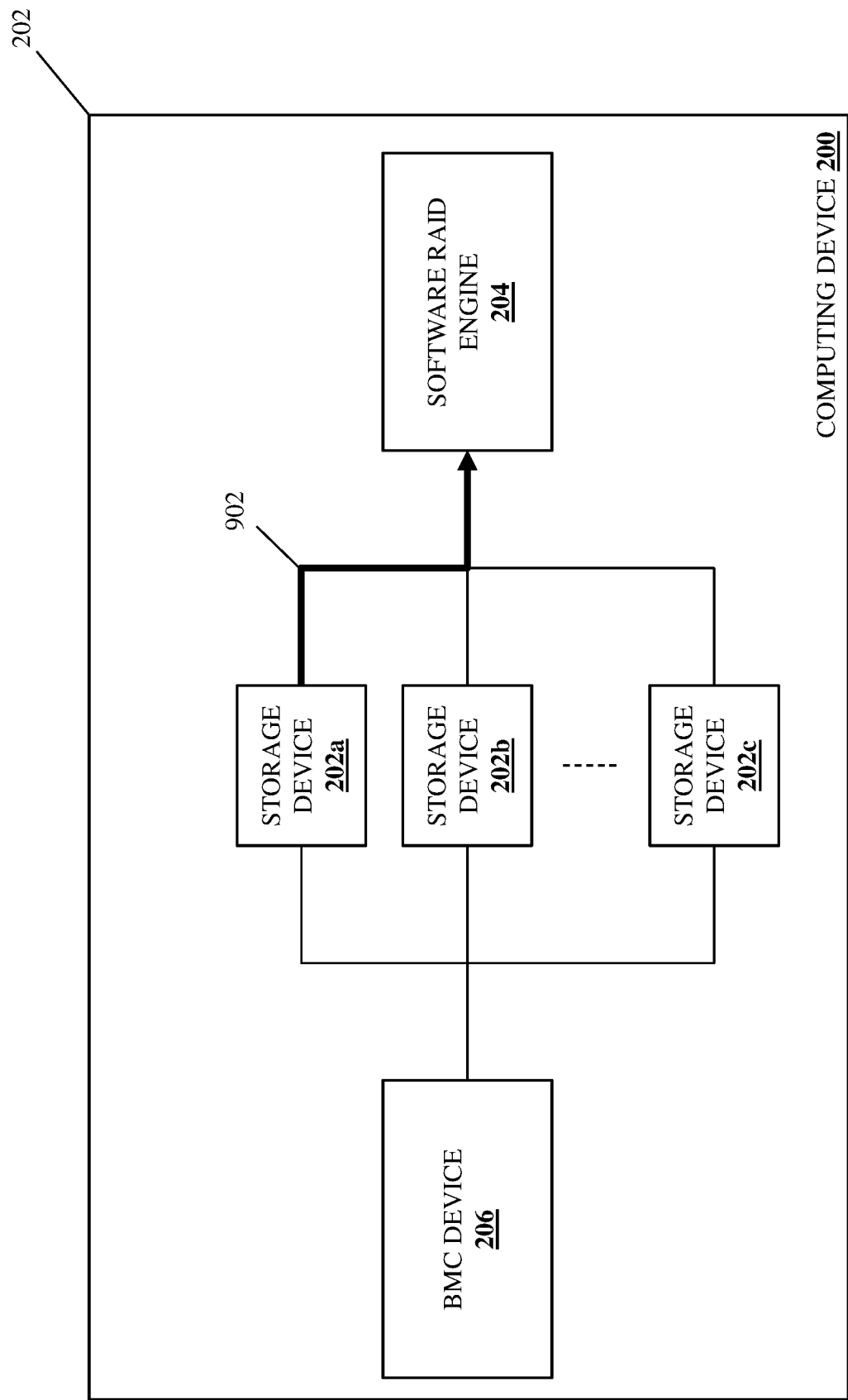

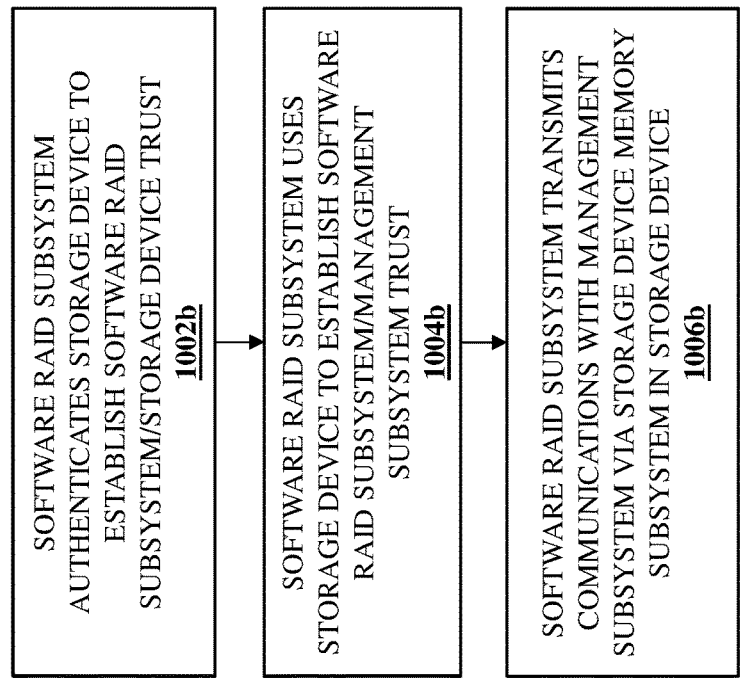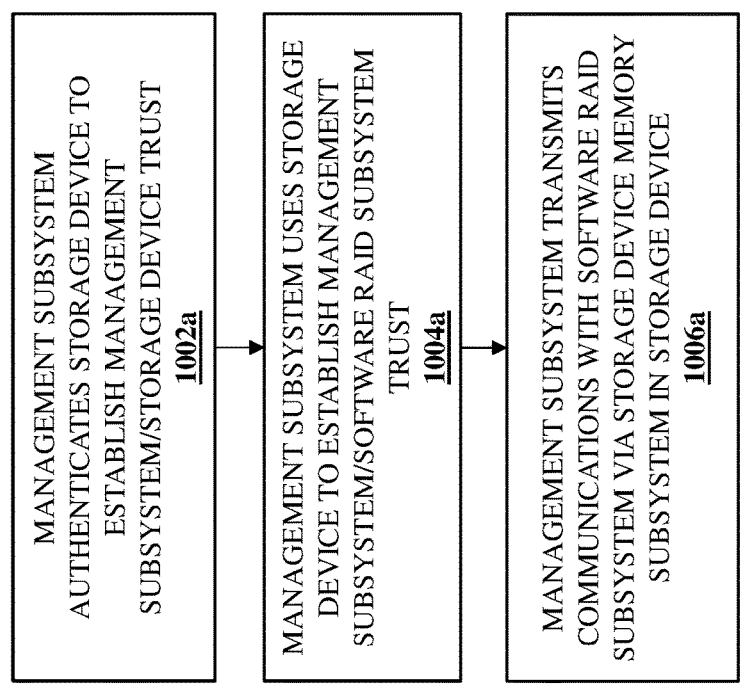
FIG. 10

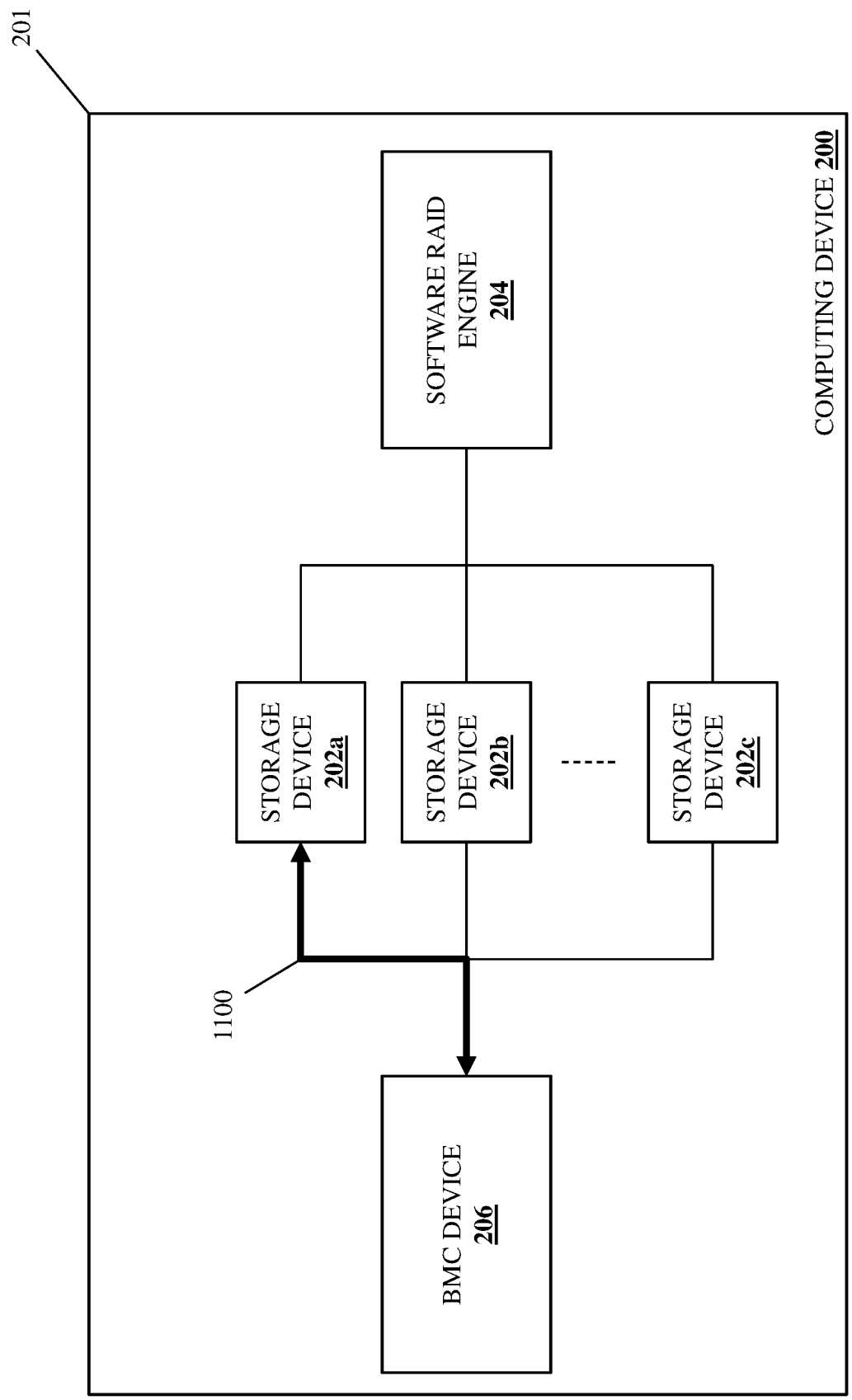

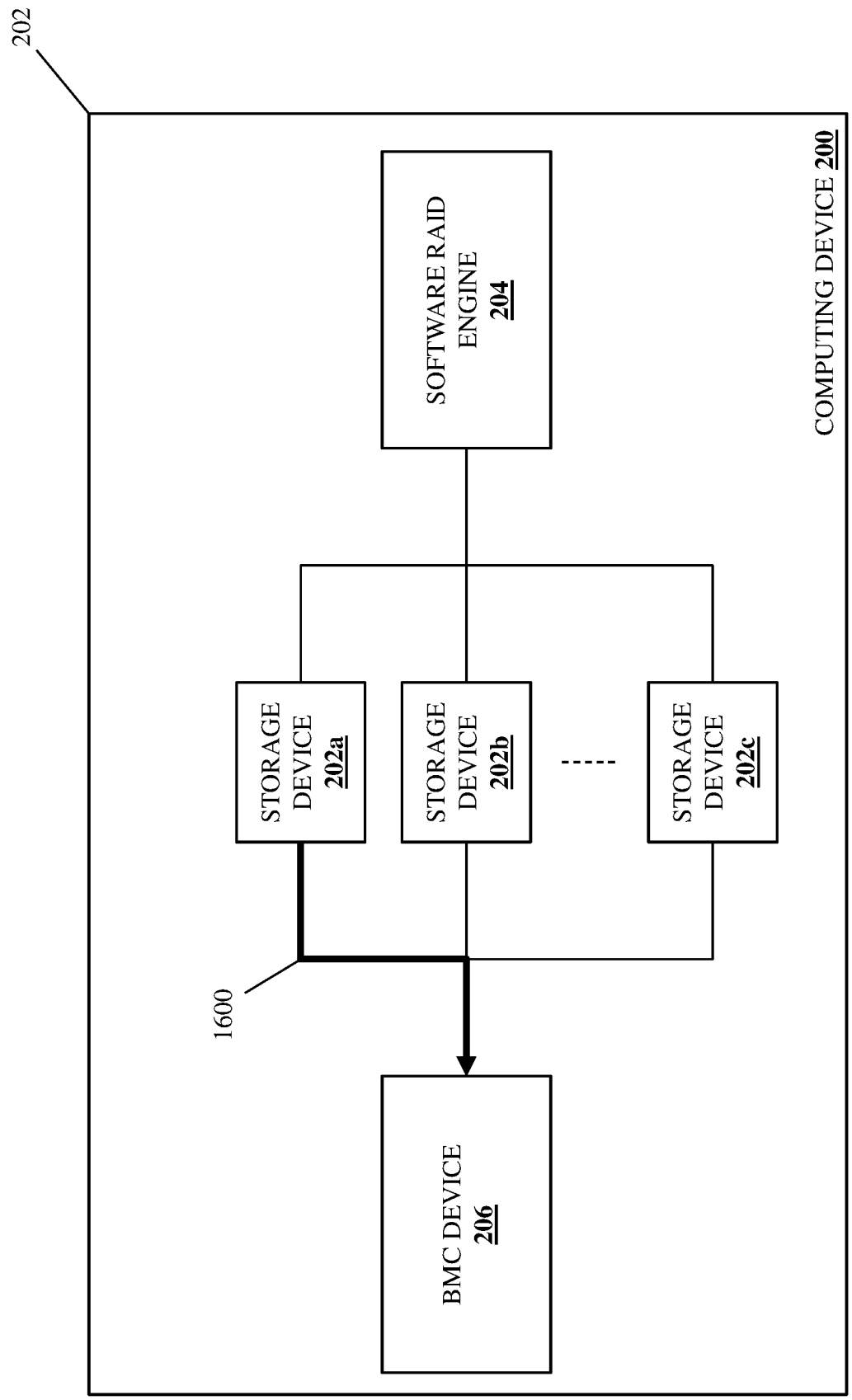

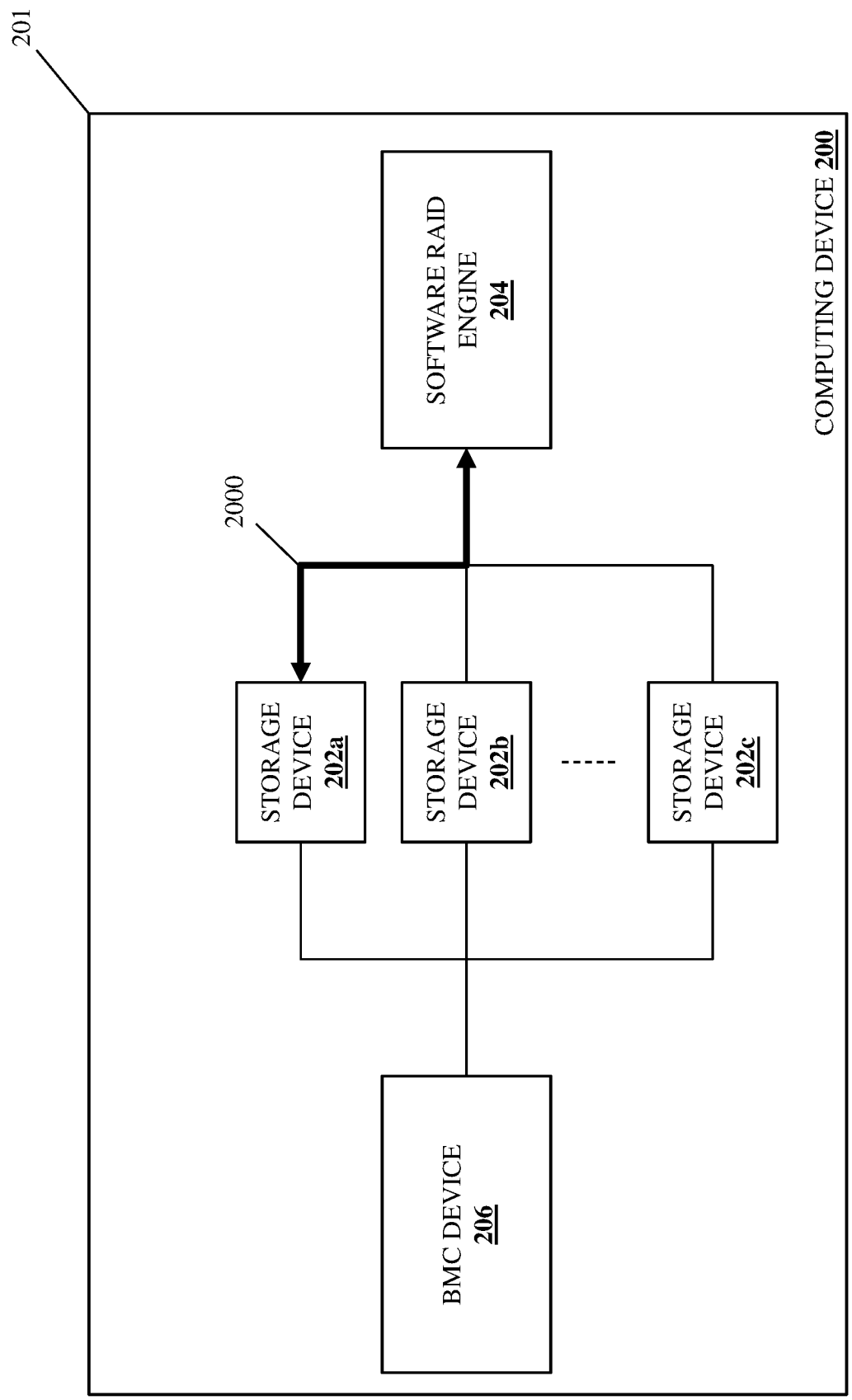

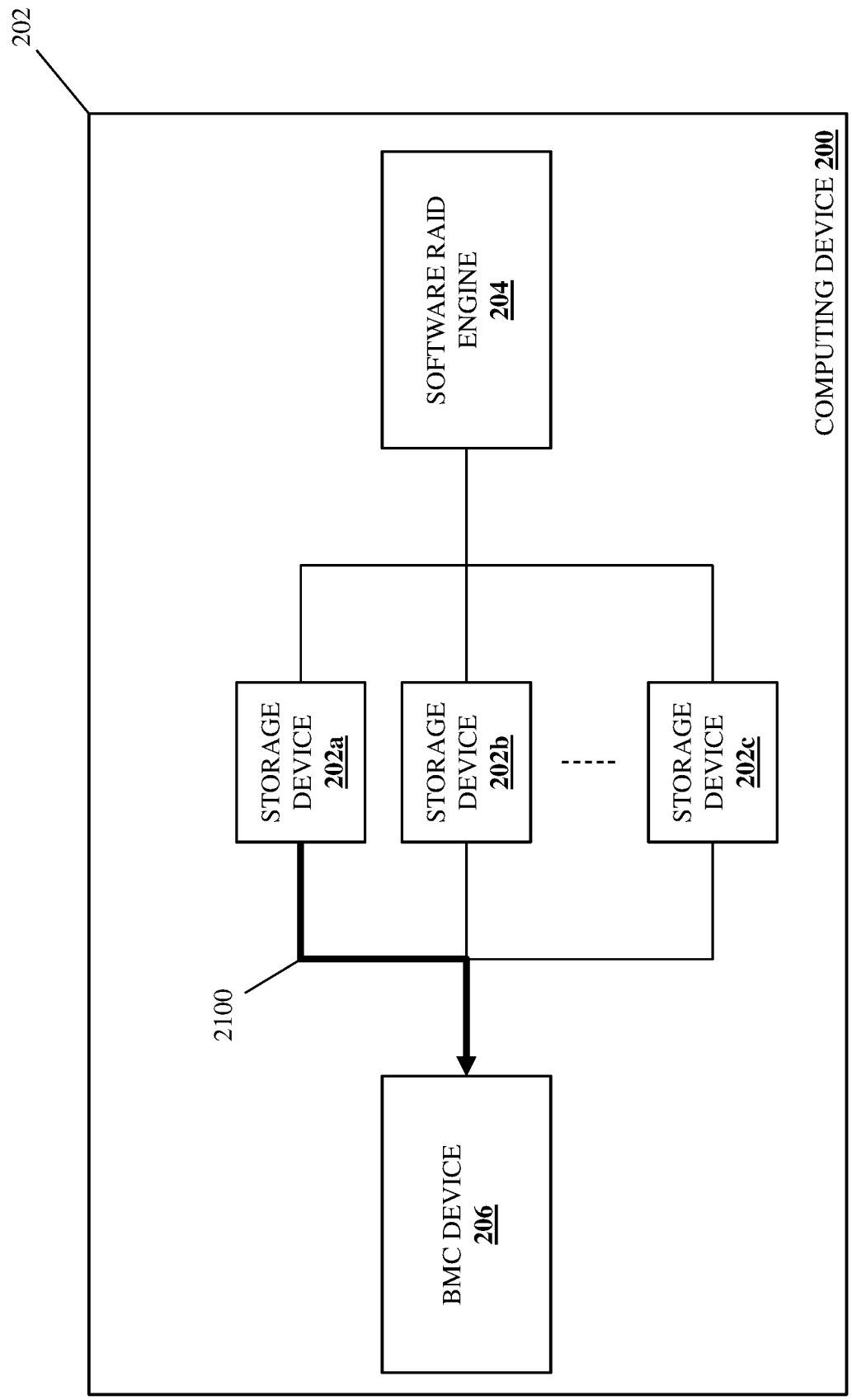

SOFTWARE RAID/MANAGEMENT TRUSTED STORAGE-DEVICE-BASED COMMUNICATION SYSTEM

CROSS-REFERENCE TO RELATED APPLICATIONS

The present application is related to the following co-pending applications: (1) U.S. patent application Ser. No. 18/228,136, filed Jul. 31, 2021, (2) U.S. patent application Ser. No. 18/228,240, filed Jul. 31, 2023; (3) U.S. patent application Ser. No. 18/228,374, filed Jul. 31, 2023; (4) U.S. patent application Ser. No. 18/229,360, filed Aug. 2, 2023; and (5) U.S. patent application Ser. No. 18/446,692, filed Aug. 9, 2023.

BACKGROUND

The present disclosure relates generally to information handling systems, and more particularly to providing trusted storage-device-based communications between a software Redundant Array of Independent Disk (RAID) subsystem and a management subsystem in a computing device.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes include a management subsystem such as a Baseboard Management Controller (BMC) device (e.g., an integrated DELL® Remote Access Controller (iDRAC) device included in server devices provided by DELL® Inc. of Round Rock, Texas, United States) and/or other management subsystems known in the art. Furthermore, server devices are sometimes configured to provide a software Redundant Array of Independent Disk (RAID) subsystem (e.g., including a MICROSOFT® software RAID miniport driver available from MICROSOFT® Corp. of Redmond, Washington, United States; an ESXi® software RAID driver available from VMWARE® Inc. of Palo Alto, California, United States; an open-source LINUX® software RAID driver; etc.) that may be configured to utilize hardware resources in the server device (e.g., a processing system such as a Central Processing Unit (CPU) in the server device) in order to provide data storage virtualization technology and perform any of a variety of RAID operations that combine physical storage device(s) into logical storage device(s) for the purposes of data redundancy, perform improvements, and/or other RAID services that would be apparent to one of skill in the art. However, the conventional provisioning of software RAID subsystems in server devices with management subsystems suffers from several deficiencies.

For example, conventional software RAID subsystems and management subsystems in server devices are relatively limited in their communications. To provide a specific example, the software RAID subsystem and the management subsystem in a server device may benefit from the sharing of relatively critical real-time data such as virtual disk state changes, software RAID critical logs, software RAID initialization failures (e.g., during initialization/boot of the server device, during storage device hot plug operations, etc.), and/or other critical data known in the art, and conventional server devices do not enable the communication of such relatively critical real-time data between the software RAID subsystem and the management subsystem. As such, conventional server devices do not provide any option for a software RAID subsystem to provide software RAID subsystem logs, software RAID subsystem data, Input/Output (I/O) failures, hot-plug information, and/or other software RAID subsystem information in real-time to the management subsystem in its server device.

To provide another specific example, the software RAID subsystem may require information about storage devices that are coupled to the software RAID subsystem via a server backplane. While a System Management Basic Input/Output System (BIOS) (SMBIOS) may be used to read management information available via the BIOS in the server device such as storage device slot-related information (e.g., storage device form factor information, storage device slot length information, etc.) and/or other SMBIOS management information known in the art, the SMBIOS does not make that SMBIOS management information available in real-time, and does not make available a variety of information that would benefit the operation of the software RAID subsystem.

Furthermore, the SMBIOS is implemented according to the SMBIOS specification, and thus any changes/updates to the SMBIOS required to make further information available to the software RAID subsystem will require the relatively long time periods needed for SMBIOS specification change approval and implementation, BIOS implementation, and/or other implementation issues that would be apparent to one of skill in the art, and will then subsequently be dependent on any BIOS updates/releases. Similarly, the Intelligent Platform Management Interface (IPMI) may be used to perform management and monitoring independently of the CPU, BIOS, and operating system in the server device in order to obtain information similar to the SMBIOS management information discussed above, but suffers from similar deficiencies in that that IPMI management information is not made available in real-time, and does not make available a variety of information (e.g., Enterprise and Data Center Standard Form Factor (EDSFF) information) that would benefit the operation of the software RAID subsystem.

At least some of the inventors of the present disclosure have developed a software RAID/management communication system that allows software RAID subsystems and management subsystems in a computing device to utilize a storage device memory subsystem in a storage device in that computing device in order to transmit communications between each other, and that software RAID/management communication system is described in U.S. patent application Ser. No. 18/228,136, filed Jul. 31, 2023, the disclosure of which is incorporated herein by reference in its entirety. However, the inventors of the present disclosure have recognized that the utilization of the storage device as a "middle man" for communications between a software RAID subsystem and a management subsystem in a computing device opens up those communications to "man in the middle" attacks that call the authenticity of those communications into question, which can be particularly troublesome if they provide for the configuration (or reconfiguration) of a RAID system (e.g., creating a RAID volume, deleting a RAID volume, etc.) (as described by at least some of the inventors of the present disclosure in U.S. patent application Ser. No. 18/228,374, filed Jul. 31, 2023, the disclosure of which is incorporated herein by reference in its entirety), transfer sensitive data (e.g., Secure Enterprise Key Manager (SEKM) key exchanges), and/or provide for other communications in which authenticity is a priority.

Accordingly, it would be desirable to provide a software RAID/management storage-device-based communication system that addresses the issues discussed above.

SUMMARY

An Information Handling System (IHS) includes a processing system; and a memory system that is coupled to the processing system and that includes instructions that, when executed by the processing system, cause the processing system to provide a management engine that is configured to: authenticate a storage device that is coupled to the processing system to establish management engine/storage device trust between the processing system and the storage device; use, in response to establishing the management engine/storage device trust, the storage device to establish management engine/software Redundant Array of Independent Disk (RAID) subsystem trust between the management engine and a software RAID subsystem that is coupled to the storage device; and transmit, in response to establishing the management engine/storage device trust and the management engine/software RAID subsystem trust, communications with the software RAID subsystem via the storage device memory subsystem in the storage device.

BRIEF DESCRIPTION OF THE DRAWINGS

FIG. 6B is a schematic view illustrating an embodiment of the operation of the storage device of FIG. 4 during the method of FIGS. 5A and 5B.

FIG. 7B is a schematic view illustrating an embodiment of the operation of the storage device of FIG. 4 during the method of FIGS. 5A and 5B.

FIG. 7C is a schematic view illustrating an embodiment of the operation of the computing device of FIG. 2 during the method of FIGS. 5A and 5B.

FIG. 8A is a schematic view illustrating an embodiment of the operation of the management subsystem of FIG. 3 during the method of FIGS. 5A and 5B.

FIG. 8D is a schematic view illustrating an embodiment of the operation of the management subsystem of FIG. 3 during the method of FIGS. 5A and 5B.

FIG. 8F is a schematic view illustrating an embodiment of the operation of the storage device of FIG. 4 during the method of FIGS. 5A and 5B.

FIG. 8G is a schematic view illustrating an embodiment of the operation of the management subsystem of FIG. 3 during the method of FIGS. 5A and 5B.

FIG. 8H is a schematic view illustrating an embodiment of the operation of the computing device of FIG. 2 during the method of FIGS. 5A and 5B.

FIG. 8J is a schematic view illustrating an embodiment of the operation of the management subsystem of FIG. 3 during the method of FIGS. 5A and 5B.

FIG. 8K is a schematic view illustrating an embodiment of the operation of the computing device of FIG. 2 during the method of FIGS. 5A and 5B.

FIG. 8M is a schematic view illustrating an embodiment of the operation of the management subsystem of FIG. 3 during the method of FIGS. 5A and 5B.

FIG. 8N is a schematic view illustrating an embodiment of the operation of the computing device of FIG. 2 during the method of FIGS. 5A and 5B.

FIG. 9C is a schematic view illustrating an embodiment of the operation of the computing device of FIG. 2 during the method of FIGS. 5A and 5B.

FIG. 10 is a flow chart illustrating an embodiment of a method for providing trusted storage-device-based communications between a software RAID subsystem and a management subsystem in a computing device.

FIG. 11B is a schematic view illustrating an embodiment of the operation of the computing device of FIG. 2 during the method of FIG. 10.

FIG. 16B is a schematic view illustrating an embodiment of the operation of the computing device of FIG. 2 during the method of FIG. 12.

FIG. 20B is a schematic view illustrating an embodiment of the operation of the computing device of FIG. 2 during the method of FIG. 17.

FIG. 21B is a schematic view illustrating an embodiment of the operation of the computing device of FIG. 2 during the method of FIG. 17.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
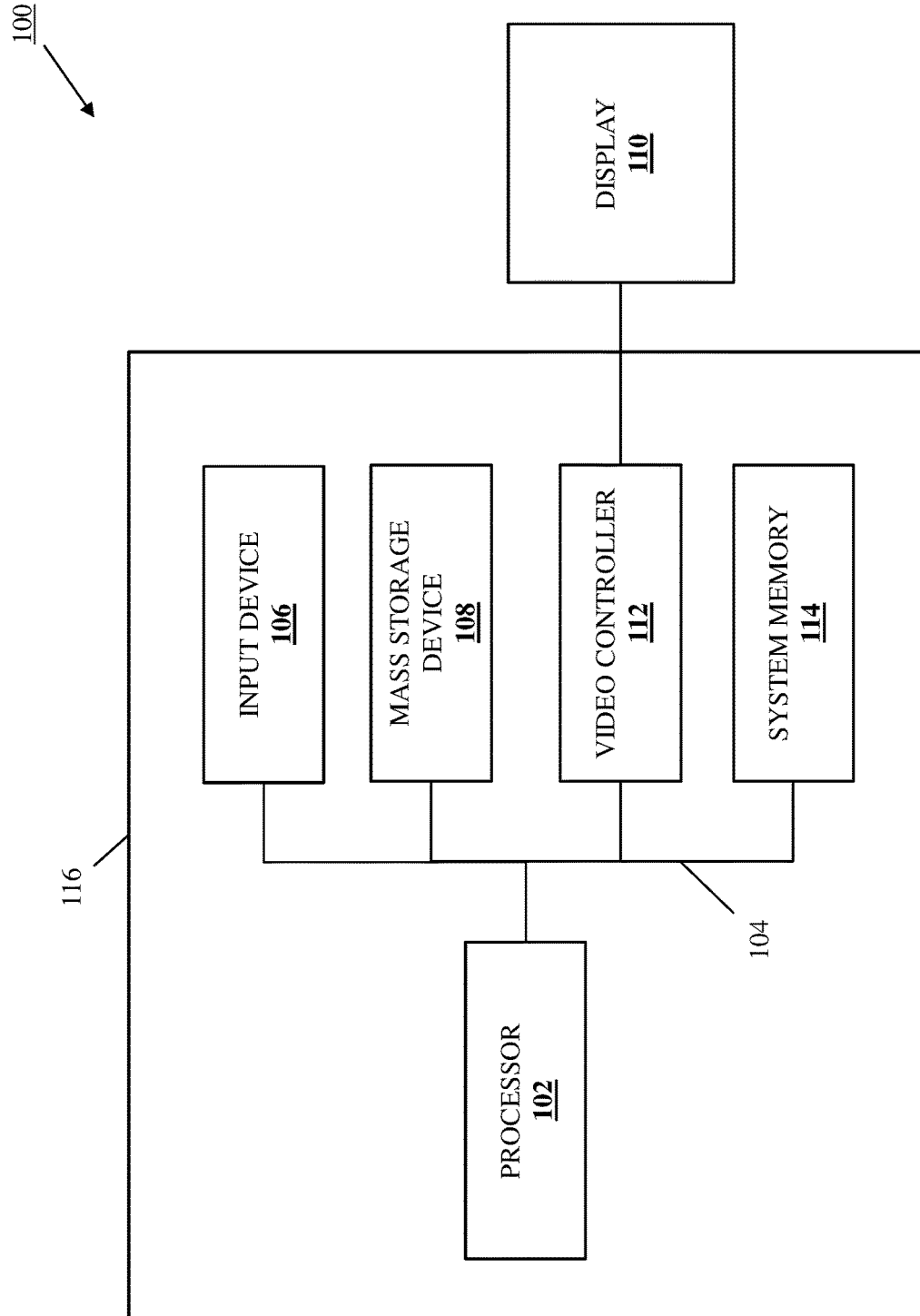
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
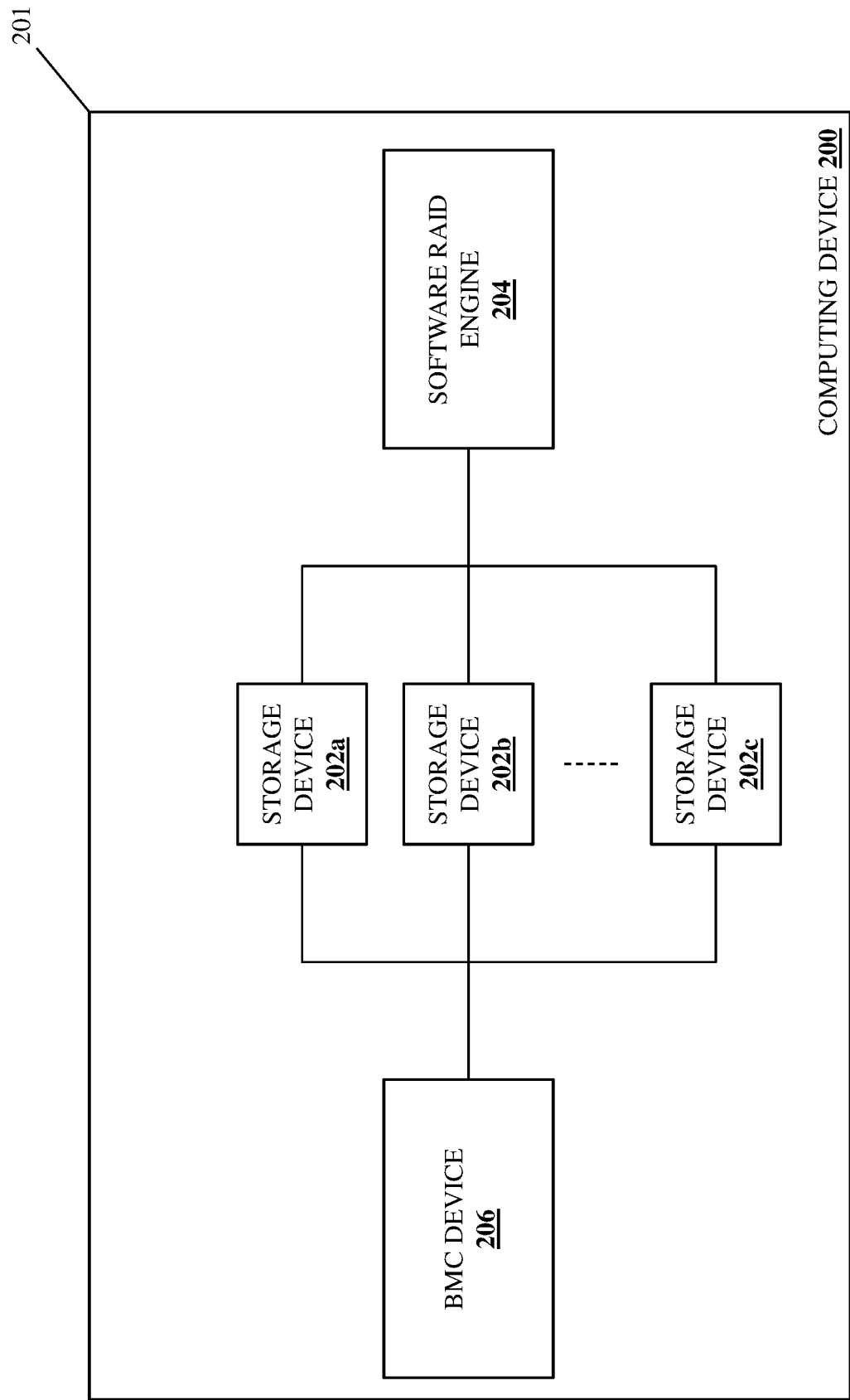
FIG. 2 is a schematic view illustrating an embodiment of a computing device that may provide the software RAID/management communication system of the present disclosure.

Referring now to FIG. 2, an embodiment of a computing device 200 is illustrated that may provide the software RAID/management communication system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 201 that houses the components of the computing device 200, only some of which are illustrated and described below.

In the embodiments illustrated and described below, the chassis 201 houses a plurality of storage devices 202a, 202b, and up to 202c. However, while a plurality of storage devices 202a-202c are illustrated and described, one of skill in the art in possession of the present disclosure will appreciate how embodiments in which a single storage device is provided in the computing device 200 will fall within the scope of the present disclosure as well. In a specific example, the storage devices 202a-202c may be provided by Non-Volatile Memory express (NVMe) storage devices, although one of skill in the art in possession of the present disclosure will appreciate how other types of storage devices (and/or other types of devices with memory subsystem similar to the storage device memory subsystems described below) may allow for the software RAID/management communication functionality described below, and thus will fall within the scope of the present disclosure as well.

The chassis 201 may also house a processing system (not illustrated, but which may include the processor 102 (e.g., a Central Processing Unit (CPU)) discussed above with reference to FIG. 1) and a memory system (not illustrated, but which may include the memory 114 (e.g., Dynamic Random Access Memory (DRAM)) discussed above with reference to FIG. 1) that is coupled to the processing system and that includes instructions that, when executed by the processing system, cause the processing system to provide a software RAID engine 204 that is configured to perform the functionality of the software RAID engines, software RAID subsystems, and/or computing devices discussed below. As illustrated, the software RAID engine 204 is coupled to each of the storage devices 202a-202c (e.g., via a coupling between the processing system and the storage devices 202a-202c).

To provide a specific example, the software RAID engine 204 may be provided by dedicated hardware in the computing device 200 (e.g., a software RAID processing system and software RAID memory system) and may be configured to provide data storage virtualization technology and perform any of a variety of RAID operations that combine physical storage device(s) (e.g., the storage devices 202a- 202c) into logical storage device(s) for the purposes of data redundancy, perform improvements, and/or other RAID services that would be apparent to one of skill in the art. However, the inventors of the present disclosure are developing a software RAID engine that may be included in an operating system provided in a computing device, and thus software RAID engines integrated into an operating system provided by a CPU and DRAM in the computing device 200 are envisioned as falling within the scope of the present disclosure as well. However, while a specific software RAID engine and software RAID functionality has been described, one of skill in the art in possession of the present disclosure will appreciate how the software RAID engine of the present disclosure may be provided in a variety of manners to perform a variety of software RAID functionality while remaining within the scope of the present disclosure as well.

The chassis 201 may also house a management subsystem that, in the illustrated embodiment, is provided by a Baseboard Management Controller (BMC) device 206 such as, for example, an integrated DELL® Remote Access Controller (iDRAC) device that is included in server devices available from DELL® Inc. of Round Rock, Texas, United States, and that is configured to provide an out-of-band management platform that utilizes resources that are primarily separate from the resources of the server device, and may provide a browser-based interface and/or Command Line Interface (CLI) for managing and monitoring hardware in the server device. As illustrated, the BMC device 206 is coupled to each of the storage devices 202a-202c. However, while a specific management subsystem is illustrated and described, one of skill in the art in possession of the present disclosure will appreciate how other management subsystems will fall within the scope of the present disclosure as well. Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the software RAID/management communication functionality discussed below, while remaining within the scope of the present disclosure as well.

Figure 3:
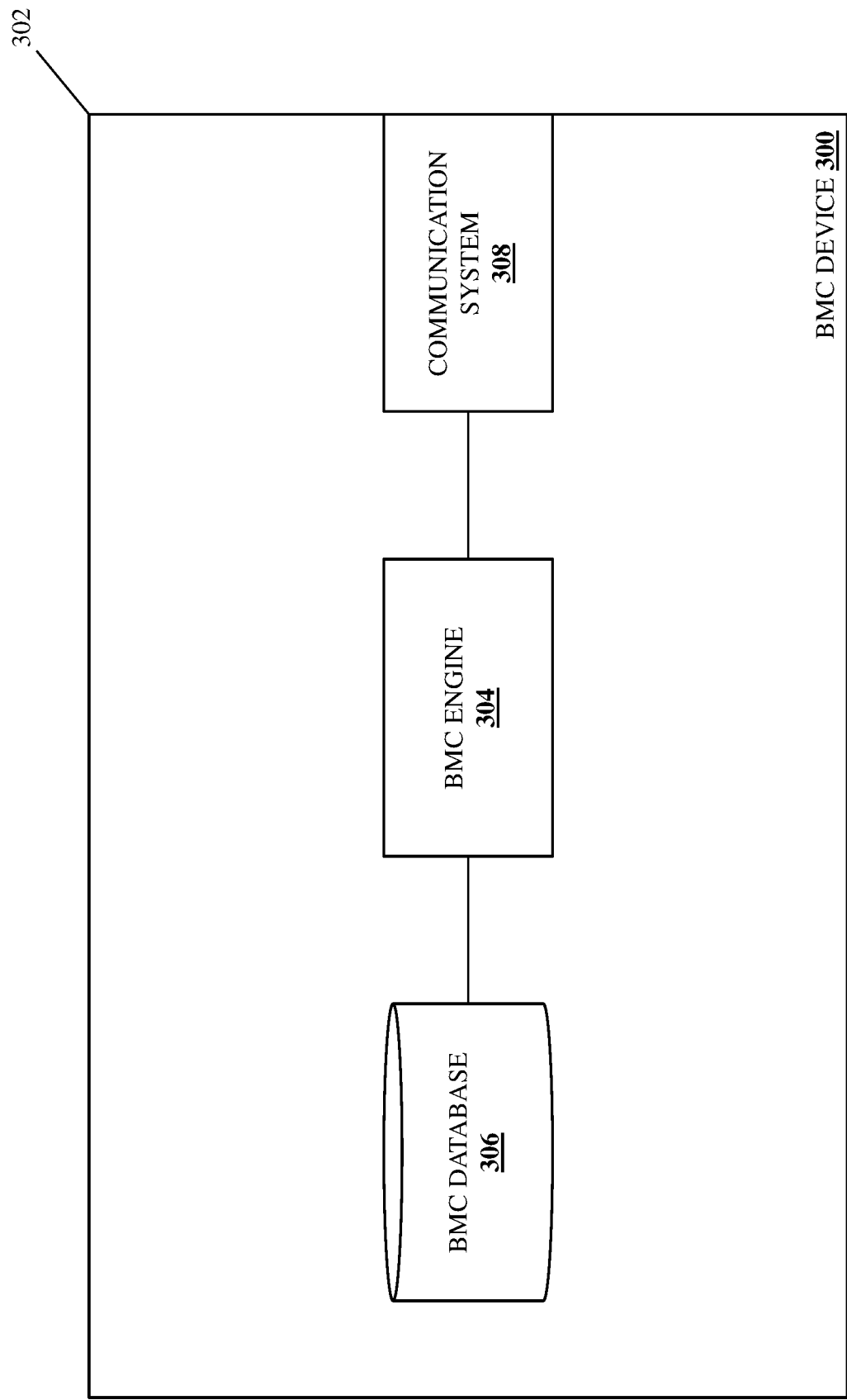
FIG. 3 is a schematic view illustrating an embodiment of a management subsystem that may be included in the computing device of FIG. 2.

Referring now to FIG. 3, an embodiment of a Baseboard Management Controller (BMC) device 300 is illustrated that may provide the BMC device 206 discussed above with reference to FIG. 2. As such, the BMC device 300 may be provided by the IHS 100 discussed above with reference to FIG. 1 and/or may include some or all of the components of the IHS 100, and in specific example, may be provided by the iDRAC device described above. Furthermore, while illustrated and discussed as being provided by a BMC device/iDRAC device, one of skill in the art in possession of the present disclosure will recognize that the functionality of the BMC device 300 discussed below may be provided by other management subsystems that are configured to operate similarly as the BMC device 300 discussed below. In the illustrated embodiment, the BMC device 300 includes a chassis 302 that supports the components of the BMC device 300, only some of which are illustrated and described below. For example, the chassis 302 may support a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 304 that is configured to perform the functionality of the BMC engines, management subsystems, and/or BMC devices discussed below.

The chassis 302 may also house a storage system (not illustrated, but which may include the storage 108 discussed above with reference to FIG. 1) that is coupled to the BMC engine 304 (e.g., via a coupling between the storage system and the processing system) and that includes a BMC database 306 that is configured to store any of the information utilized by the BMC engine 304 discussed below. The chassis 302 may also house a communication system 308 that is coupled to the BMC engine 304 (e.g., via a coupling between the communication system 308 and the BMC processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific BMC device 300 has been illustrated and described, one of skill in the art in possession of the present disclosure will recognize that management subsystems (or other devices operating according to the teachings of the present disclosure in a manner similar to that described below for the BMC device 300) may include a variety of components and/or component configurations for providing conventional management device functionality, as well as the software RAID/management communication functionality discussed below, while remaining within the scope of the present disclosure as well.

Figure 4:
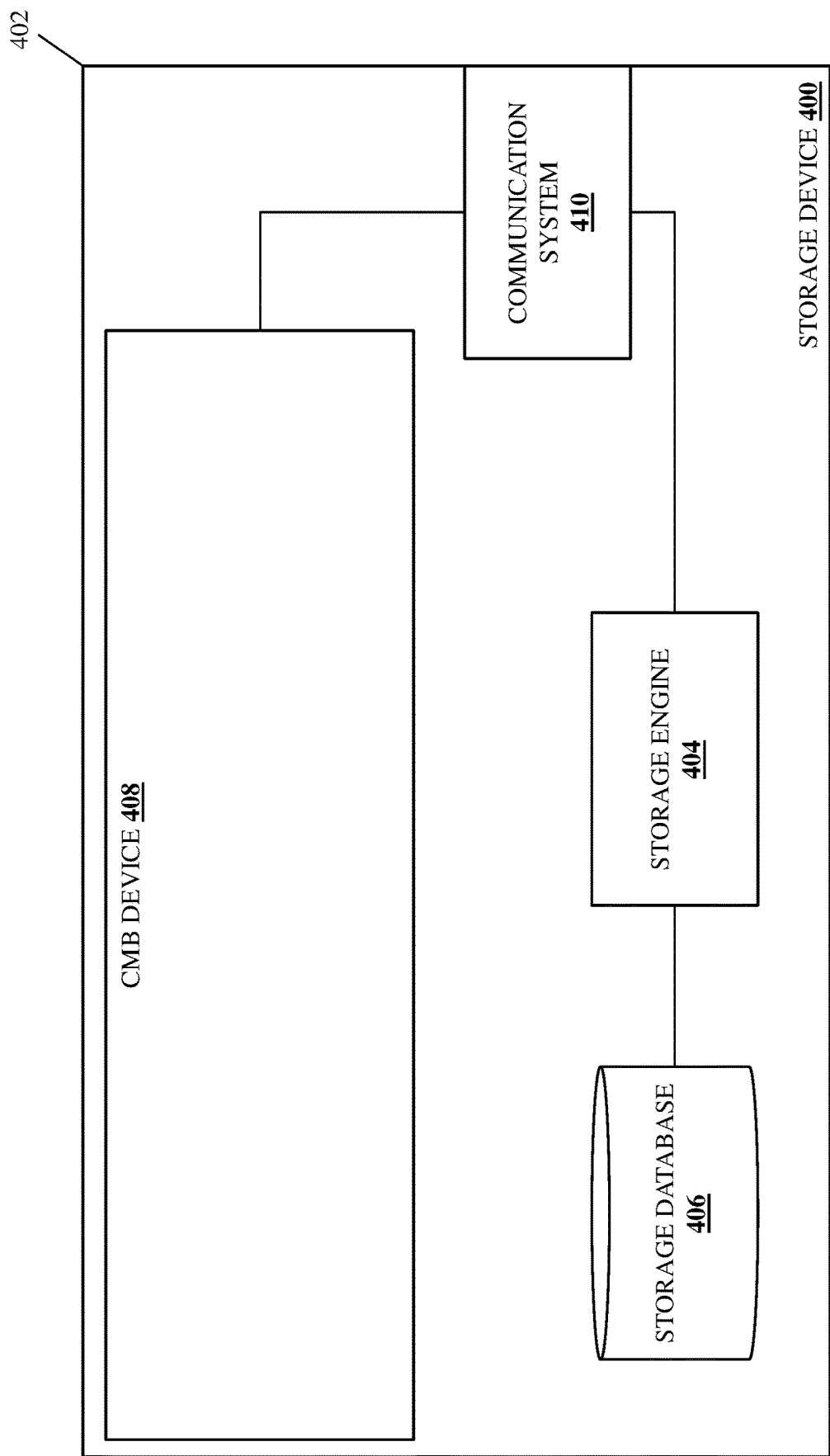
FIG. 4 is a schematic view illustrating an embodiment of a storage device may be included in the computing device of FIG. 2.

Referring now to FIG. 4, an embodiment of a storage device 400 is illustrated that may provide any or each of the storage devices 202a-202c discussed above with reference to FIG. 2. As such, the storage device 400 may be provided by an NVMe storage device in specific examples. However, while illustrated and discussed as being provided by an NVMe storage device, one of skill in the art in possession of the present disclosure will recognize that the functionality of the storage device 400 discussed below may be provided by other types of devices that are configured to operate similarly as the storage device 400 discussed below in order to allow for the software RAID/management communication functionality described below. In the illustrated embodiment, the storage device 400 includes a chassis 402 that houses the components of the storage device 400, only some of which are illustrated and described below.

For example, the chassis 402 may house a storage processing system (not illustrated, but which may be similar to the processor 102 discussed above with reference to FIG. 1 and may be included in a storage controller device) and a storage memory system (not illustrated, but which may be similar to the memory 114 discussed above with reference to FIG. 1 and may be included in a storage controller device) that is coupled to the storage processing system and that includes instructions that, when executed by the storage processing system, cause the storage processing system to provide a storage engine 404 that is configured to perform any of a variety of conventional storage functionality (e.g., NVMe storage functionality) that would be apparent to one of skill in the art in possession of the present disclosure, as well as any of the functionality of the storage engines and/or storage devices described below. The chassis 402 may also house a storage subsystem (not illustrated, but which may be similar to the storage 108 discussed above with reference to FIG. 1) that is coupled to the storage engine 404 (e.g., via a coupling between the storage subsystem and the storage processing system) and that includes a storage database 406 that is configured to store any of the information utilized by the storage engine 404 discussed below.

The chassis 402 may also house a storage device memory subsystem that, in the embodiments illustrated and described below, is provided by a Controller Memory Buffer (CMB) device 408 in an NVMe storage device that is conventionally utilized by a host in a server device to provide Input/Output (I/O) commands for the NVMe storage device in a controller memory subsystem of an NVMe controller in that NVMe storage device, to perform Direct Memory Access (DMA) operations, to store non-persistent data, and/or provide other CMB functionality known in the art, and one of skill in the art in possession of the present disclosure with appreciate how the CMB device 408 may be configured for use with general purpose memory read/write operations to provide those I/O commands. However, while illustrated and described as being provided by a CMB device, one of skill in the art in possession of the present disclosure will appreciate how other memory subsystems in other devices may be utilized to enable the software RAID/management communication functionality described below, and thus will fall within the scope of the present disclosure as well.

The chassis 402 may also house a communication system 410 that is coupled to the storage engine 404 (e.g., via a coupling between the communication system 408 and the processing system) and the CMB device 408 and that may be provided by any of a variety of storage device communication components that would be apparent to one of skill in the art in possession of the present disclosure. However, while a specific storage device 400 has been illustrated and described, one of skill in the art in possession of the present disclosure will recognize that other types of storage devices (or other types of devices operating according to the teachings of the present disclosure in a manner similar to that described below for the storage device 400) may include a variety of components and/or component configurations for providing conventional device functionality, as well as the software RAID/management communication functionality discussed below, while remaining within the scope of the present disclosure as well.

Figure 5A:
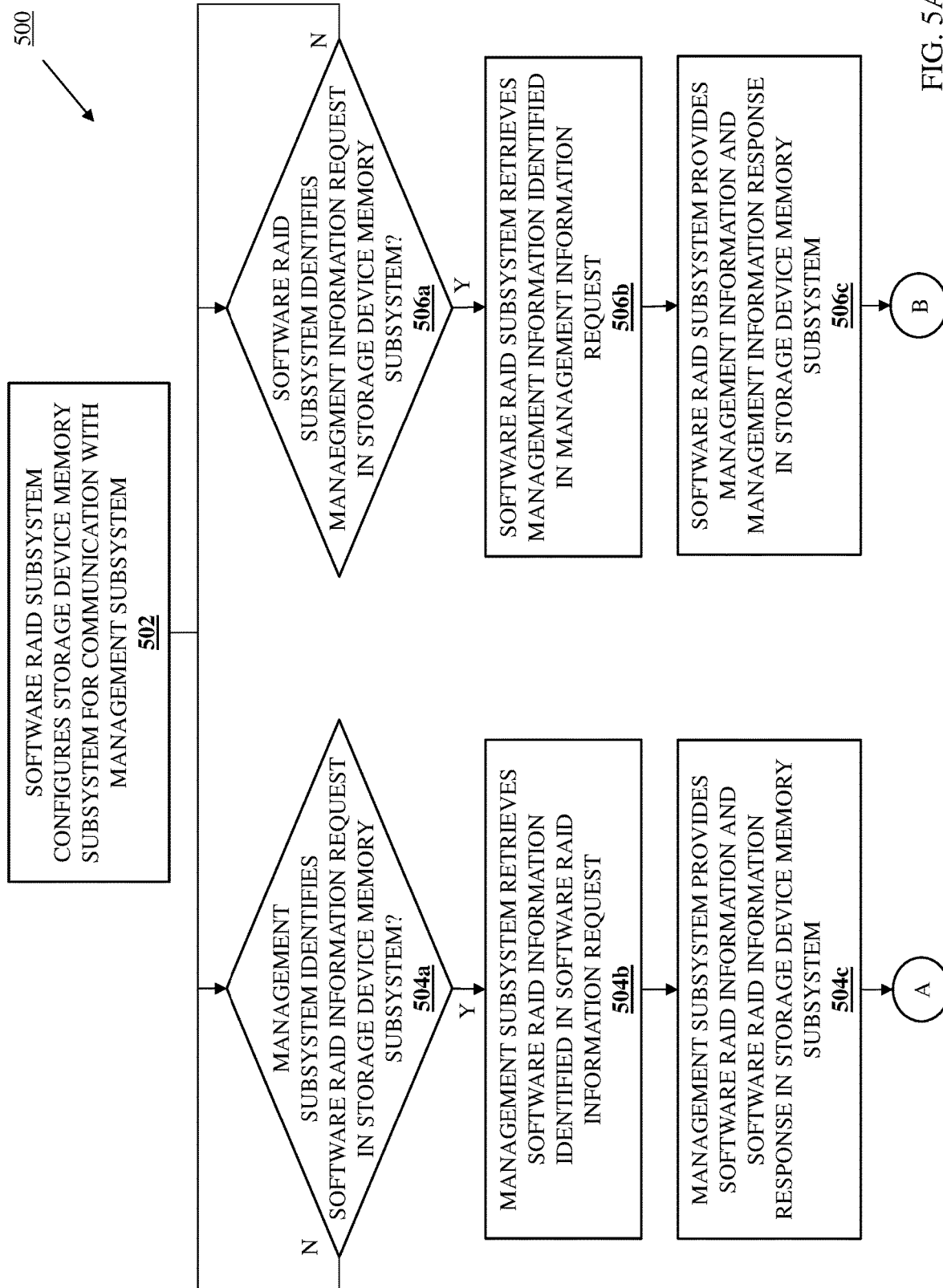
FIG. 5A is a flow chart illustrating an embodiment of a portion of a method for providing communication between a software RAID subsystem and a management subsystem in a computing device.
Figure 5B:
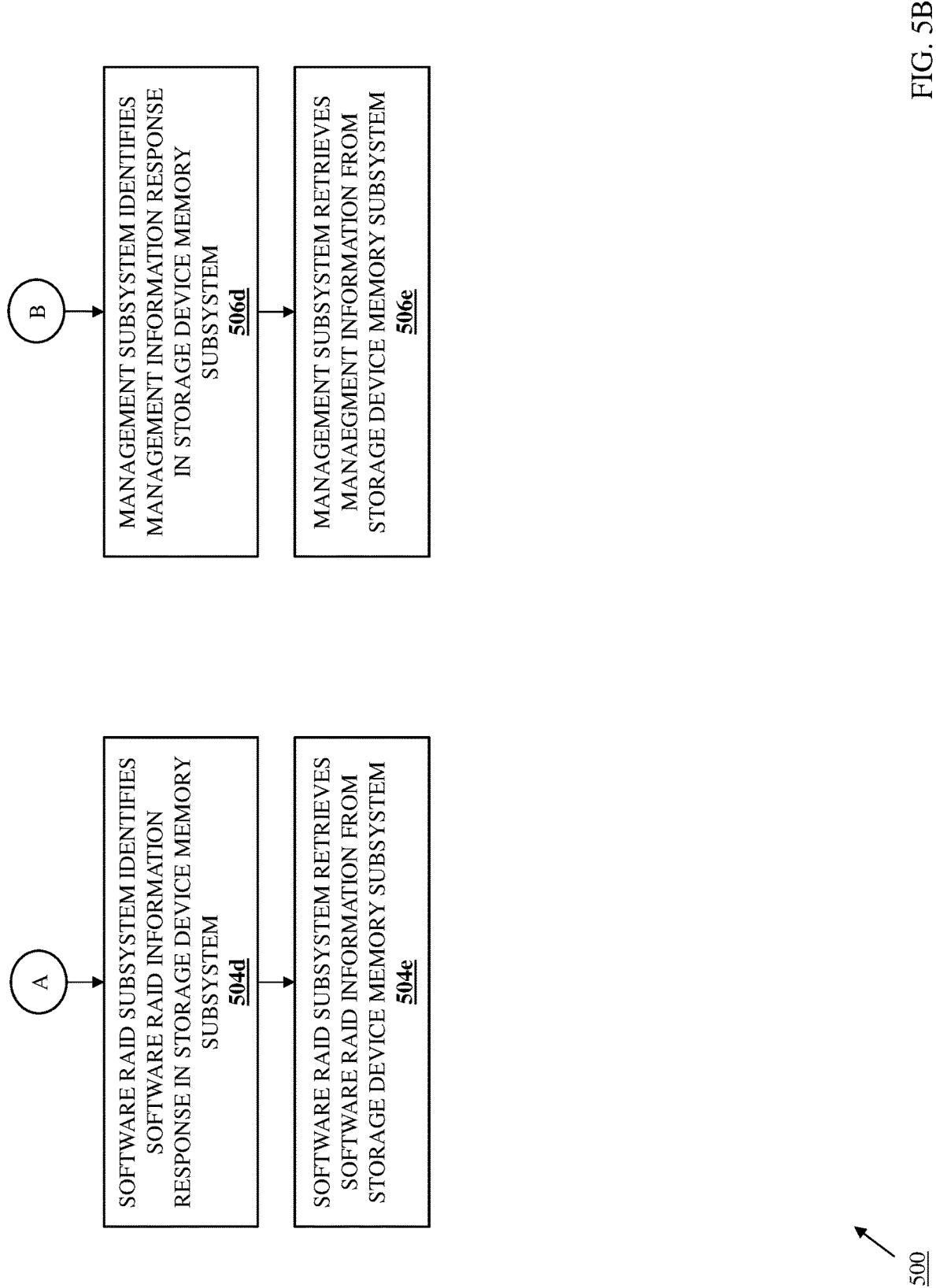
FIG. 5B is a flow chart illustrating an embodiment of a portion of a method for providing communication between a software RAID subsystem and a management subsystem in a computing device.

Referring now to FIGS. 5A and 5B, an embodiment of a method 500 for providing communication between a software Redundant Array of Independent Disk (RAID) subsystem and a management subsystem in a computing device is illustrated. As discussed below, the systems and methods of the present disclosure utilize a storage device memory subsystem in a storage device for communications between a software RAID subsystem and a management subsystem. For example, the software RAID/management communication system of the present disclosure may include a chassis housing a software Redundant Array of Independent Disk (RAID) subsystem and a management subsystem that are each coupled to a storage device having a storage device memory subsystem. The software RAID subsystem provides a software RAID information request in the storage device memory subsystem that requests the management subsystem provide software RAID information associated with the operation of a software RAID provided by the software RAID subsystem, the software RAID subsystem then periodically accesses the storage device memory subsystem and, when the software RAID subsystem determines that the management subsystem has provided a management information response in the storage device memory subsystem, the software RAID subsystem retrieves the software RAID information that was provided in the storage device memory subsystem by the management subsystem. As such, critical, real-time data may be exchanged between software RAID subsystems and management subsystems without the need to rely on changes/updates to an SMBIOS, BIOS, and/or IPMI and the corresponding time delays required for such changes/updates.

The method 500 begins at block 502 where a software RAID subsystem configures a storage device memory subsystem for communication with a management subsystem. In an embodiment, prior to the method 500, a "software RAID/management communication" memory space in the CMB device 408 of the storage device 202a/400 may be reserved for software RAID subsystem/management subsystem communications. For example, the software RAID/management communication memory space may be mapped to a "software RAID/management communication" Base Address Register (BAR), and Controller Memory Buffer LOCation (CMBLOC) registers may store information identifying a mapped "software RAID/management communication" BAR number and "software RAID/management communication" memory space offset in the CMB device 408 of the storage device 202a/400 for the software RAID/management communication memory space. As will be appreciated by one of skill in the art in possession of the present disclosure, the software RAID/management communication BAR number and software RAID/management communication memory space offset in the CMBLOC registers may be utilized by the software RAID engine 204 and the BMC engine 304 to establish communications.

As will be appreciated by one of skill in the art in possession of the present disclosure, a storage device provider of the storage device (e.g., a storage device "vendor") may provide vendor-specific memory address areas (e.g., BAR0 and/or BAR1) that may be utilized by the manufacturer of the computing device 200 to provide the software RAID/management communication memory space in the CMB device 408 of the storage device 202a/400. However, in some examples, there may be restrictions on the use of those vendor-specific memory address areas (e.g., restrictions on PCIe read/write operations), and thus the use of other BARs to provide the software RAID/management communication memory space in the CMB device 408 of the storage device 202a/400 will fall within the scope of the present disclosure as well.

For example, as will be appreciated by one of skill in the art in possession of the present disclosure, the CMBLOC registers discussed above may store information identifying a "conventional" CMB memory space offset for a conventional CMB memory space in the CMB device 408 of the storage device 202a/400 that may be used by the storage device 202a/400 for conventional CMB operations, and the software RAID/management communication memory space of the present disclosure may be located inside the conventional CMB memory space that begins at the conventional CMB memory space offset. To provide a specific example, if the conventional CMB memory space offset is provided at a 0x100 memory address in the CMB device 408 of the storage device 202a/400 included in BAR2 (e.g., outside of the vendor-specific memory address areas BAR0 and BAR1), and if the software RAID/management communication memory space offset is 0x200 with a 0x300 size requirement for the software RAID/management communication memory space, then software RAID/management communication memory space may be provided between the 0x300 address and the 0x600 address in the CMB device 408 included in BAR2. However, while a specific example of the use of non-vendor-specific memory address areas for the software RAID/management communication memory space has been described, one of skill in the art in possession of the present disclosure will appreciate how the software RAID/management communication memory space may be provided in a variety of manners that will fall within the scope of the present disclosure as well.

In any of the embodiments discussed above, the software RAID/management communication memory space (e.g., the software RAID/management communication memory space offset and the size of the software RAID/management communication memory space) may be identified to the software RAID engine 204 and the BMC engine 304 in the BMC device 206/300 during or prior to the method 500 in order to enable use of the software RAID/management communication memory space by the software RAID engine 204 and the BMC engine 304. In addition, the software RAID/management communication memory space (e.g., the software RAID/management communication memory space offset and the size of the software RAID/management communication memory space) may be identified to a host (e.g., an operating system) in the computing device 200 to prevent use of the software RAID/management communication memory space by the host. As such, one of skill in the art in possession of the present disclosure will appreciate how the software RAID/management communication memory space in the CMB device 408 may be configured in any of a variety of manners that ensure that it is not utilized for purposes other than the software RAID/management communications described below.

Figure 6A:
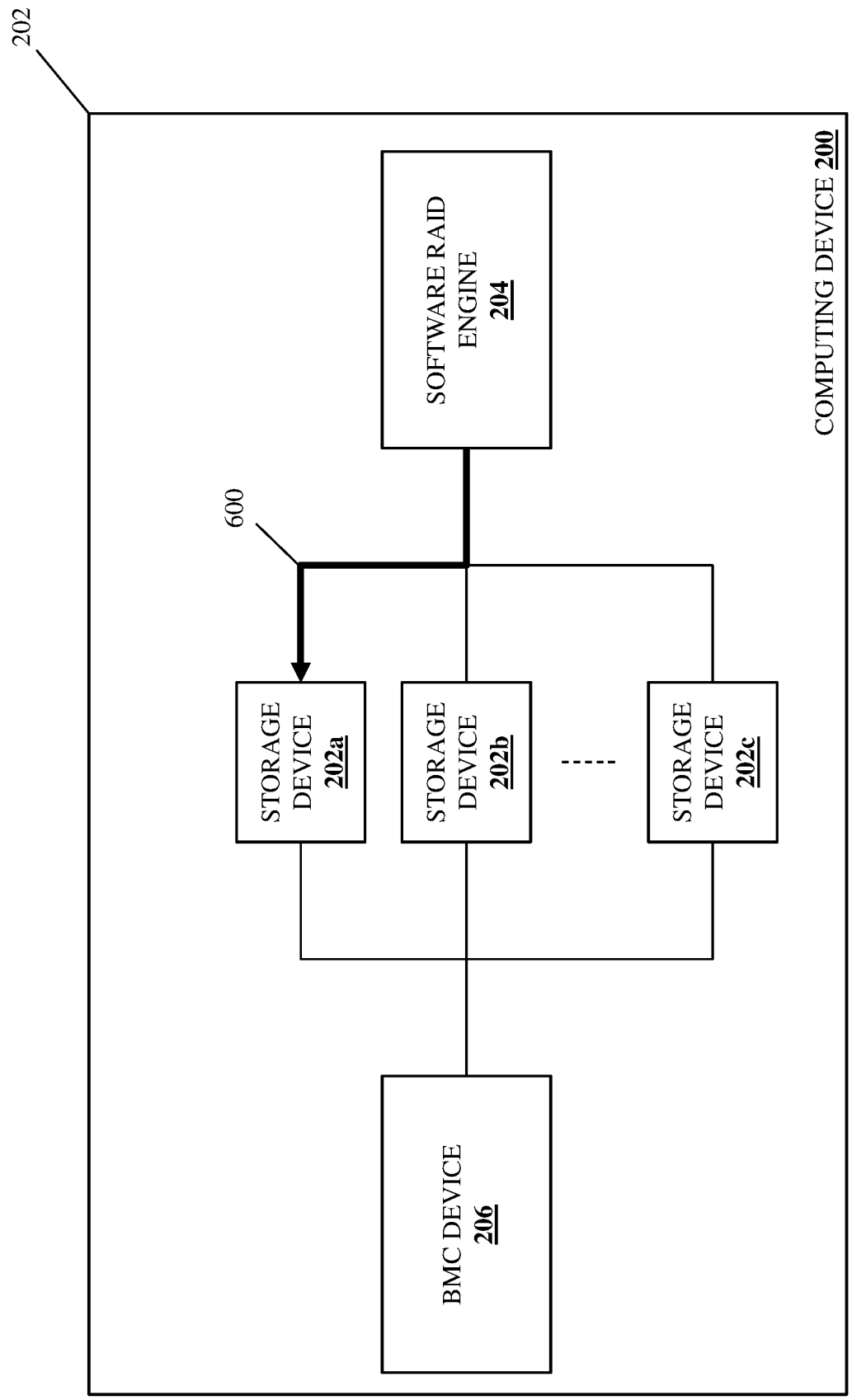
FIG. 6A is a schematic view illustrating an embodiment of the operation of the computing device of FIG. 2 during the method of FIGS. 5A and 5B.

With reference to FIGS. 6A and 6B, in an embodiment of block 502, the software RAID engine 204 in the computing device 200 may perform storage device memory subsystem configuration operations 600 that include configuring the CMB device 408 of the storage device 202a/400 (e.g., the software RAID/management communication memory space discussed above) via the communication system 410 in the storage device 202a/400 with a header 602, a software RAID request queue 604a, a software RAID response queue 604b, a BMC request queue 606a, a BMC response queue 606b, a response buffer 608, and/or any other storage device memory subsystem elements that one of skill in the art in possession of the present disclosure would recognize as providing for the functionality described below.

For example, in response to initialization of the computing device 200, the software RAID engine 204 (e.g., a software RAID driver) may load, the storage device 202a (e.g., an NVMe storage device) may initialize, the CMB device 408 in the storage device 202a/400 may be enabled, and the software RAID engine 204 may create the software RAID request queue 604a, the software RAID response queue 604b, the BMC request queue 606a, and the BMC response queue 606b in the software RAID/management communication memory space of the CMB device 408. The software RAID engine 204 may then provide and/or update the header 602 in the software RAID/management communication memory space of the CMB device 408 with queue address information (e.g., queue base addresses for the software RAID request/response queues and the BMC request/response queues discussed above), CMB device ready information (e.g., indicating that the software RAID/management communication memory space of the CMB device 408 is ready for use), authentication information (e.g., a signature, key, or other authentication information that may be authenticated by the BMC device 206/300 as discussed below), head/tail information (e.g., initially set to "0/0" as discussed below), and/or any other information that would be apparent to one of skill in the art in possession of the present disclosure.

As will be appreciated by one of skill in the art in possession of the present disclosure, the header 602 configured in the software RAID/management communication memory space of the CMB device 408 of the storage device 202a/400 may store any information that is required to use the software RAID/management communication memory space as described below, including queue numbering information, the queue address information discussed above, information about a number of queues, basic communication data, the CMB device ready information discussed above, the head/tail information discussed above, and/or any other information that one of skill in the art in possession of the present disclosure would recognize as enabling the functionality described below. However, while a specific example of a header and the data included therein that enable communications via the software RAID/management communication memory space of the CMB device 408 is provided above, one of skill in the art in possession of the present disclosure will appreciate how communications via the software RAID/management communication memory space of the CMB device 408 may be enabled in a variety of manners that will fall within the scope of the present disclosure as well.

As discussed in further detail below, in a specific example, the software RAID request queue 604a configured in the software RAID/management communication memory space of the CMB device 408 of the storage device 202a/400 may provide a management queue (e.g., rather than an Input/Output (I/O) queue) for the submission of software RAID information requests by the software RAID engine 204 in the computing device 200, while the software RAID response queue 604b configured in the software RAID/management communication memory space of the CMB device 408 may provide a management queue (e.g., rather than an I/O queue) for submission of software RAID information responses to software RAID information requests by the BMC engine 304 in the BMC device 206/300 in the computing device 200. As such, the software RAID request queue 604a and the software RAID response queue 604b may include any management queue features that one of skill in the art in possession of the present disclosure would recognize as providing for the functionality described below.

As also discussed in further detail below, in a specific example, the BMC request queue 606a configured in the software RAID/management communication memory space of the CMB device 408 of the storage device 202a/400 may provide a management queue (e.g., rather than an (I/O) queue) for the submission of management information requests by the BMC engine 304 in the BMC device 206/300 in the computing device 200, while the BMC response queue 606b configured in the software RAID/management communication memory space of the CMB device 408 may provide a management queue (e.g., rather than an I/O queue) for submission of management information responses to management information requests by the software RAID engine 204 in the computing device 200. As such, the BMC request queue 606a and the BMC response queue 606b may include any management queue features that one of skill in the art in possession of the present disclosure would recognize as providing for the functionality described below.

As will be appreciated by one of skill in the art in possession of the present disclosure, in response to configuring the software RAID request/response queues and the BMC request/response queues, the software RAID engine 204 may update any associated queue information in the header 602 of the CMB device 408 of the storage device 202a/400. However, while specific software RAID request/response queues and the BMC request/response queues are illustrated and described herein, one of skill in the art in possession of the present disclosure will appreciate how different numbers and/or configurations of the management queues described herein may be provided in the software RAID/management communication memory space of the CMB device 408 while remaining within the scope of the present disclosure as well. For example, one of skill in the art in possession of the present disclosure will appreciate how a minimum of one management queue pair may be provided to allow for the exchange of requests and responses between the software RAID engine 204 and the BMC engine 304 in the BMC device 206/300 while remaining within the scope of the present disclosure as well.

As discussed in further detail below, in a specific example, the response buffer 608 configured in the software RAID/management communication memory space of the CMB device 408 of the storage device 202a/400 may provide for the provisioning and retrieval of software RAID information requested by the software RAID engine 204 in the computing device 200, as well as the provisioning and retrieval of management information requested by the BMC engine 304 in the BMC device 206/300 in the computing device 200. However, while a specific example of a response buffer is provided herein, one of skill in the art in possession of the present disclosure will appreciate that the software RAID/management communication memory space of the CMB device 408 may be configured to transfer the software RAID information and/or management information described below in a variety of manners that will fall within the scope of the present disclosure as well.

In some embodiments, the software RAID engine 204 in the computing device 200 may set a register in the CMB device 408 of the storage device 202a/400 (e.g., by setting a CMBMSC.CRE register to "1") in order to indicate an intent to utilize the software RAID/management communication memory space of the CMB device 408 for communication with the BMC device 206/300 in the computing device 200. Furthermore, in response to providing the indication of an intent to the utilize the software RAID/management communication memory space of the CMB device 408 for communication with the BMC device 206/300 in the computing device 200, the software RAID engine 204 in the computing device 200 may populate the header 602 in the CMB device 408 (e.g., with any of the information described above) and subsequently begin periodically accessing the header 602 in the CMB device 408 to determine whether the BMC engine 304 has provided a management communication.

Figure 6C:
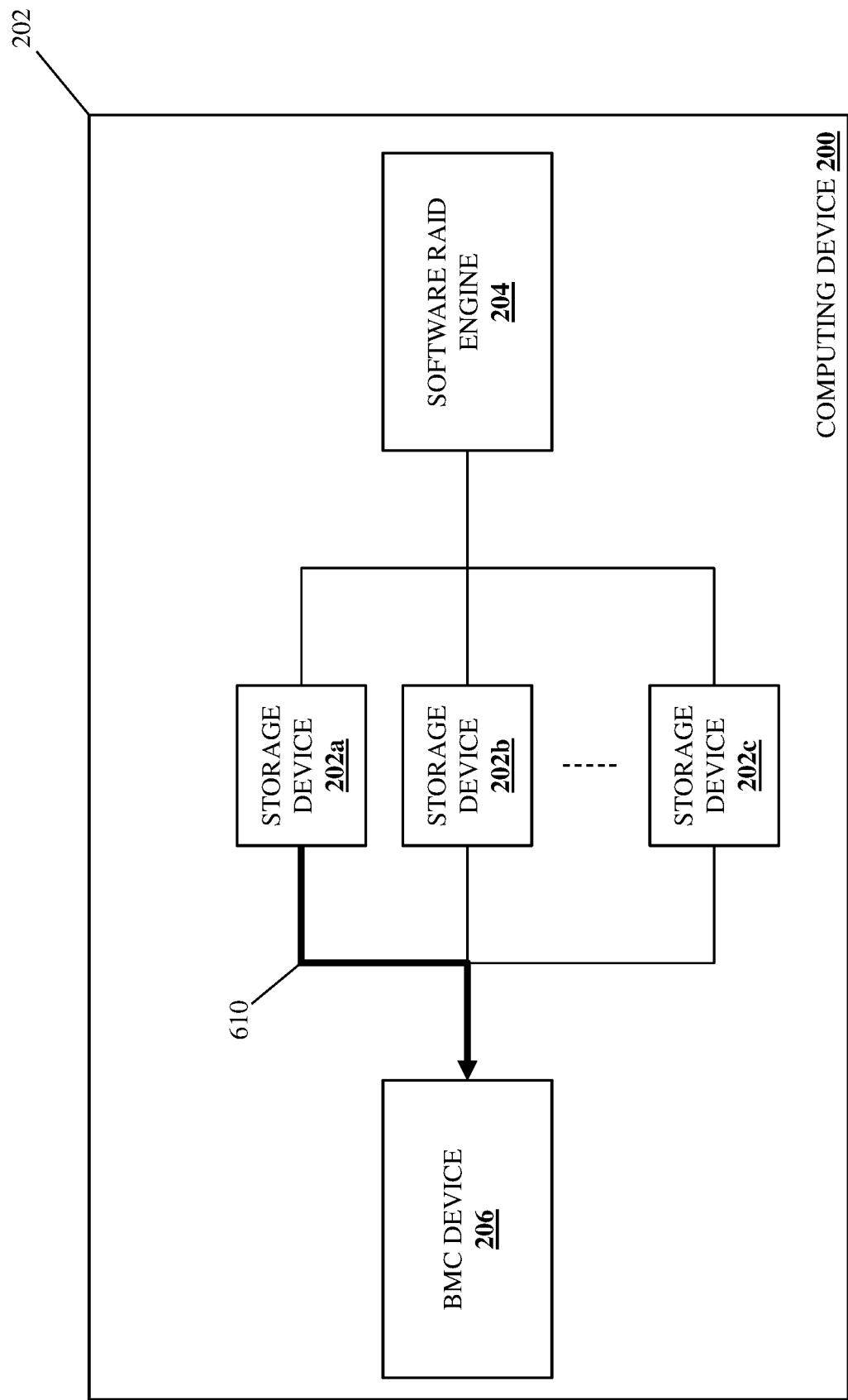
FIG. 6C is a schematic view illustrating an embodiment of the operation of the computing device of FIG. 2 during the method of FIGS. 5A and 5B.
Figure 6D:
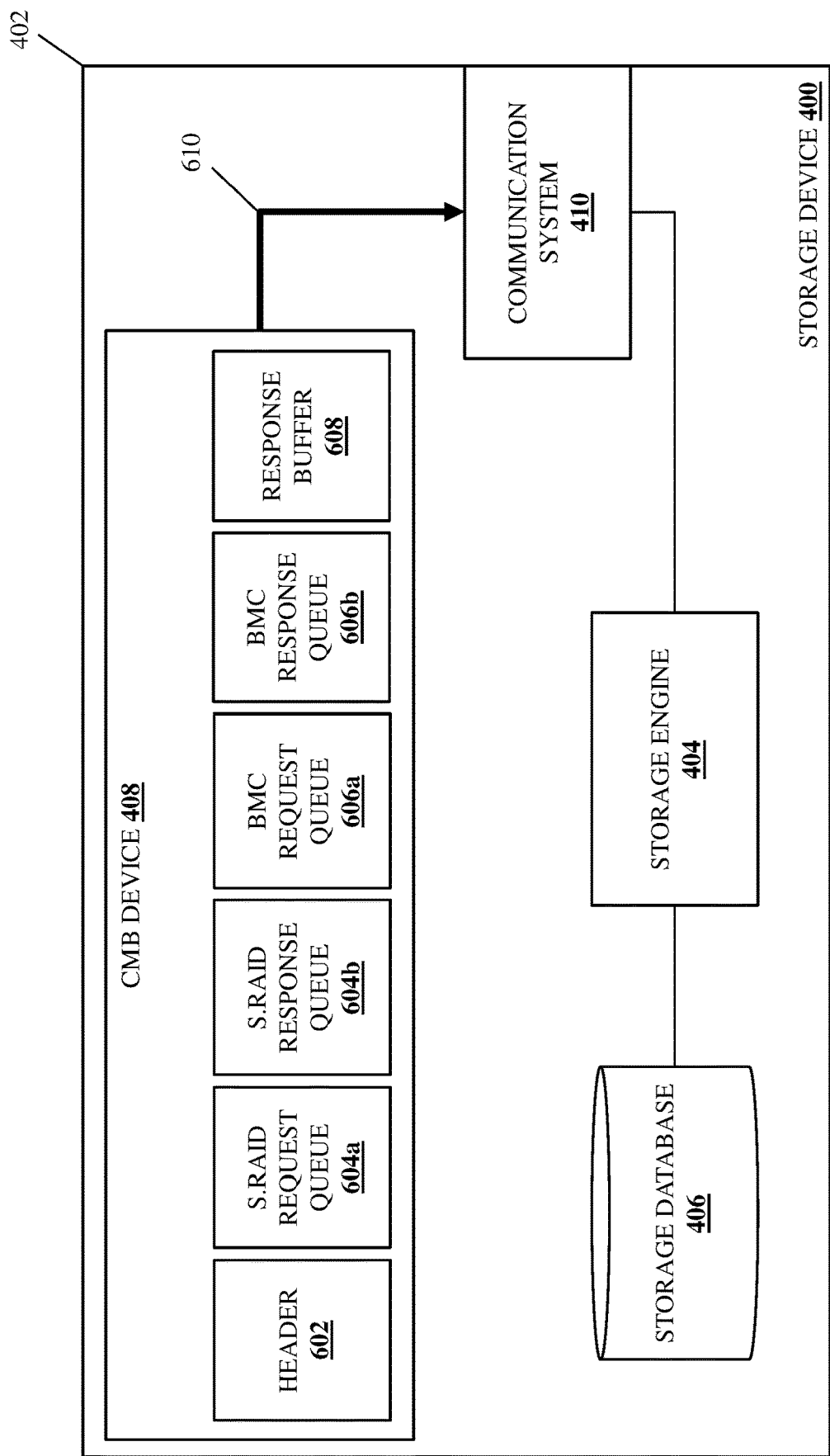
FIG. 6D is a schematic view illustrating an embodiment of the operation of the storage device of FIG. 4 during the method of FIGS. 5A and 5B.

With reference to FIGS. 6C and 6D, the BMC engine 304 in the BMC device 206/300 in the computing device 200 may perform CMB device read operations 610 that include reading any of a variety of information from the CMB device 400 via the communication system 410 in the storage device 202a/400. As will be appreciated by one of skill in the art in possession of the present disclosure, the CMB device read operations 610 performed by the BMC engine 304 in the BMC device 206/300 in the computing device 200 may include reading (e.g., via NVMe-Management Interface (MI)-PCIe reads) CMB registers in the CMB device 408 of the storage device 202a/400 in order to identify CMB support information, BAR location information, CMB offset information, CMB size information, read/write bit information, and/or other CMB information that one of skill in the art in possession of the present disclosure will recognize enables the use of the CMB device 408 by the BMC engine 304. Furthermore, the CMB device read operations 610 may allow the BMC engine 304 to determine that the register in the CMB device 408 was set by the software RAID engine 204 to indicate an intent to utilize the software RAID/management communication memory space of the CMB device 408 for communication with the BMC device 206/300, and in response the BMC engine 304 in the BMC device 206/300 may determine that it should begin periodically accessing the header 602 in the CMB device 408 (e.g., via NVMe-MI-PCIe reads) to determine whether the software RAID engine 204 has provided a software RAID communication.

In an embodiment, the CMB device read operations 610 may also include the BMC engine 304 accessing the header 602 in the software RAID/management communication memory space of the CMB device 408 to retrieve authentication information (e.g., the signature, key, or other authentication information discussed above), and using any of a variety of authentication technique to authenticate the data provided by the software RAID engine 204 in the software RAID/management communication memory space of the CMB device 408. For example, the authentication information may be provided by the software RAID engine 204 in one or more fields in the header 602 using information that is already known to the BMC engine 304, and following its authentication the BMC engine 304 may proceed with performing the remainder of the method 500. As will be appreciated by one of skill in the art in possession of the present disclosure, if the BMC engine 304 cannot authenticate information retrieved from the header 602 in the CMB device 408, the BMC engine 304 may assume that the software RAID engine 204 has not yet configured the software RAID/management communication memory space of the CMB device 408, and may periodically perform the CMB device read operations 610 until information that can be authenticated is retrieved from the header 602.

The method 500 may then proceed to decision block 504a where the method 500 proceeds depending on whether the management subsystem identifies a software RAID information request in the storage device memory subsystem, as well as to decision block 506a where the method 500 proceeds depending on whether the software RAID subsystem identifies a management information request in the storage device memory subsystem. As will be appreciated by one of skill in the art in possession of the present disclosure, blocks 504a-504e of the method 500 describe embodiments in which the software RAID subsystem may initiate communication with the management subsystem, while blocks 506a-506e of the method 500 describe embodiments in which the management subsystem may initiate communication with the software RAID subsystem, and while the software-RAID-initiated communication of blocks 504a-504e are described in detail below, the management-initiated communication of blocks 506a-506e may be performed in a substantially similar manner except for where detailed below.

Beginning with the software-RAID-initiated communication of blocks 504a-504e, in an embodiment of decision block 504a, the BMC engine 304 in the BMC device 206/300 in the computing device 200 may access the software RAID/management communication memory space in the CMB device 408 of the storage device 202a/400 to determine whether a software RAID information request was provided by the software RAID engine 204 in the CMB device 408. As discussed above, in response to determining that the software RAID engine 204 indicated an intent to utilize the software RAID/management communication memory space of the CMB device 408 for communication with the BMC device 206/300, the BMC engine 304 in the BMC device 206/300 may begin periodically accessing the header 602 in the CMB device 408 to determine whether the software RAID engine 204 has provided a software RAID information request in the software RAID request queue 604a in the CMB device 408.

In a specific example, the software RAID engine 204 may be configured to increment a "tail" portion of the head/tail information stored in the header 602 in the CMB device 408 in response to submitting a software RAID information request in the software RAID request queue 604a in the CMB device 408, and thus the BMC engine 304 may be configured to periodically access the head/tail information stored in the header 602 in the CMB device 408 to determine whether the tail portion of the head/tail information matches a "head" portion of the head/tail information in order to determine whether a software RAID information request was provided by the software RAID engine 204 in the CMB device 408. In other words, if the tail portion is greater than the head portion in the head/tail information, then the software RAID engine 204 has incremented that tail portion following the provisioning of the software RAID information request, while if the tail portion is equal to the head portion in the head/tail information, then the software RAID engine 204 has not provided a software RAID information request.

If, at decision block 504a, the management subsystem does not identify a software RAID information request in the storage device memory subsystem, the method 500 returns to decision block 504a. For example, if at decision block 504a the BMC engine 304 in the BMC device 206/300 in the computing device 200 determines that the tail portion of the head/tail information in the header 602 in the CMB device 408 is equal to the head portion of the head/tail information in the header 602 in the CMB device 408 (e.g., the head/tail information remains as initially set during block 502 at "0/0"), the BMC engine 304 will determine that the software RAID engine 204 in the computing device 200 has not submitted a software RAID information request to the software RAID request queue 604a, and the method 500 will return to decision block 504a. As such, the method 500 may loop such that the BMC engine 304 periodically accesses the header 602 in the CMB device 408 at decision block 504a as long as no software RAID information request is identified in the CMB device 408 (e.g., as long as the tail portion of the head/tail information is equal to the head portion of the head/tail information in the header 602 in the CMB device 408).

With reference now to the management-initiated communication of blocks 506a-506e, similarly as described above, the software RAID engine 204 in the computing device 200 may periodically access the software RAID/management communication memory space in the CMB device 408 of the storage device 202a/400 at decision block 506a to determine whether a management information request was provided by the BMC engine 304 in the CMB device 408. As discussed above, following the configuration of the software RAID/management communication memory space of the CMB device 408 for communication with the BMC device 206/300, the software RAID engine 204 may periodically access the header 602 in the CMB device 408 to determine whether the BMC engine 304 has provided a management information request in the BMC request queue 606a in the CMB device 408.

In a specific example, the BMC engine 304 may be configured to increment the head portion of the head/tail information stored in the header 602 in the CMB device 408 in response to submitting a management information request in the BMC request queue 606a in the CMB device 408, and thus the software RAID engine 204 may be configured to periodically access the head/tail information stored in the header 602 in the CMB device 408 to determine whether the head portion of the head/tail information matches the tail portion of the head/tail information in order to determine whether a management information request was provided by the BMC engine 304 in the CMB device 408. In other words, if the head portion is greater than the tail portion in the head/tail information, then the BMC engine 304 has incremented that head portion following the provisioning of the management information request, while if the head portion is equal to the tail portion in the head/tail information, then the BMC engine 304 has not provided a management information request.

If, at decision block 506a, the software RAID subsystem does not identify a management information request in the storage device memory subsystem, the method 500 returns to decision block 506a. For example, if at decision block 506a the software RAID engine 204 in the in the computing device 200 determines that the head portion of the head/tail information in the header 602 in the CMB device 408 is equal to the tail portion of the head/tail information in the header 602 in the CMB device 408 (e.g., the head/tail information remains as initially set during block 502 at "0/0"), the software RAID engine 204 will determine that the BMC engine 304 in the BMC device 206/300 in the computing device 200 has not submitted a management information request to the BMC request queue 606a, and the method 500 will return to decision block 506a. As such, the method 500 may loop such that the software RAID engine 204 periodically accesses the header 602 in the CMB device 408 at decision block 504a as long as no management information request is identified in the CMB device 408 (e.g., as long as the head portion of the head/tail information is equal to the tail portion of the head/tail information in the header 602 in the CMB device 408).

Figure 7A:
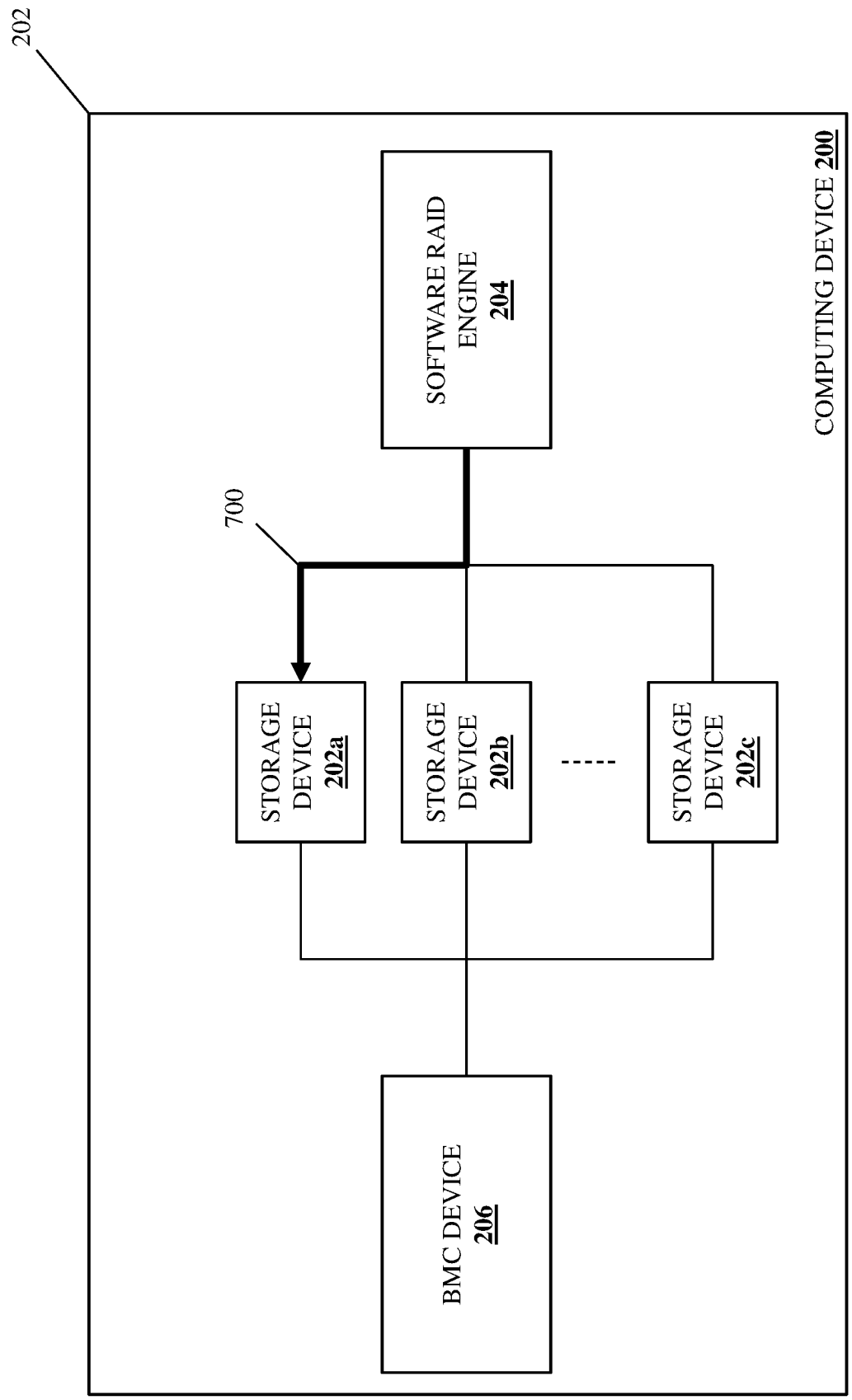
FIG. 7A is a schematic view illustrating an embodiment of the operation of the computing device of FIG. 2 during the method of FIGS. 5A and 5B.

Returning to the software-RAID-initiated communication of blocks 504a-504e, if at decision block 504a the management subsystem identifies a software RAID information request in the storage device memory subsystem, the method 500 proceeds to block 504b where the management subsystem retrieves software RAID information identified in the software RAID information request. With reference to FIGS. 7A and 7B, in an embodiment of decision block 504a, the software RAID engine 204 in the computing device 200 may perform software RAID information request submission operations 700 that include submitting a software RAID information request in the software RAID request queue 604a via the communication system 410 in the storage device 202a/400. For example, the software RAID information request may include any of a variety of formats (e.g., formats that may be defined by a vendor of the storage device 202a/400), and may request any particular software RAID information, may identify the response buffer 608 as the location where the software RAID information should be provided, and/or may include any other information that one of skill in the art in possession of the present disclosure would recognize as allowing for the functionality discussed below.

In the specific examples provided below, the software RAID information request includes a request by the software RAID engine 204 for a bay identifier (e.g., the software RAID information request may include a vendor-defined opcode for "BAYID") of a storage device (e.g., an NVMe storage device) in the computing device 200, but one of skill in the art in possession of the present disclosure will appreciate that the software RAID engine 204 may request any of a variety of software RAID information (e.g., a slot identifier ("SlotID"), a form factor, etc.) while remaining within the scope of the present disclosure as well. As will be appreciated by one of skill in the art in possession of the present disclosure, any software RAID information requests (and/or alignments) submitted at decision block 504a may conform to Management Component Transport Protocol (MCTP) standards.

Figure 7D:
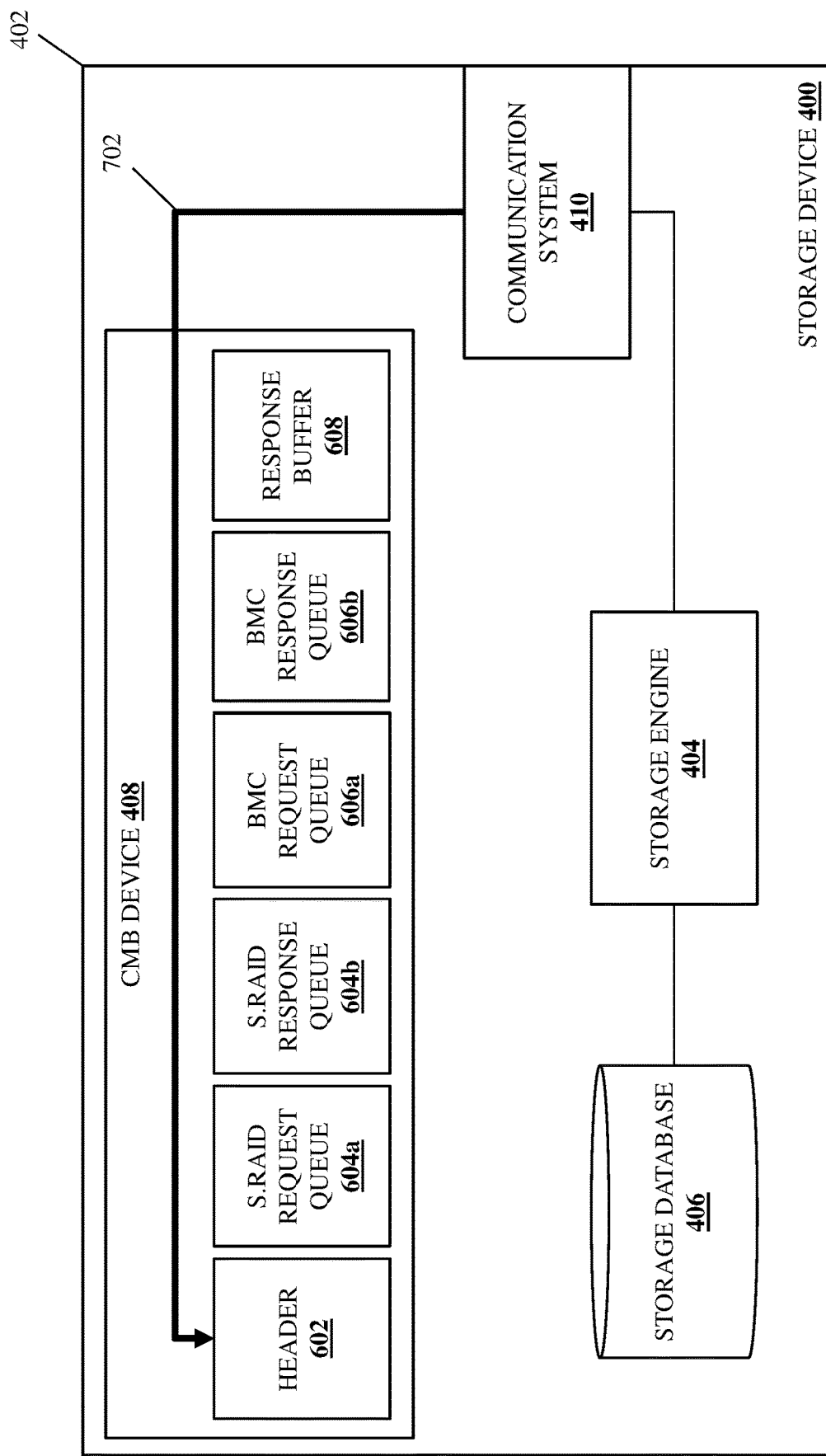
FIG. 7D is a schematic view illustrating an embodiment of the operation of the storage device of FIG. 4 during the method of FIGS. 5A and 5B.

Furthermore, with reference to FIGS. 7C and 7D, in an embodiment of decision block 504a, the software RAID engine 204 in the computing device 200 may perform software RAID information request header identification operations 702 that include identifying the submission of the software RAID information request in the header 602 configured in the CMB device 408 via the communication system 410 in the storage device 202a/400. Similarly as discussed above, the software RAID engine 204 may increment a tail portion of the head/tail information stored in the header 602 in the CMB device 408 (e.g., from the "0/0" as initially set during block 502 to "0/1") in response to submitting the software RAID information request in the software RAID request queue 604a in the CMB device 408 at decision block 504a.

Figure 8B:
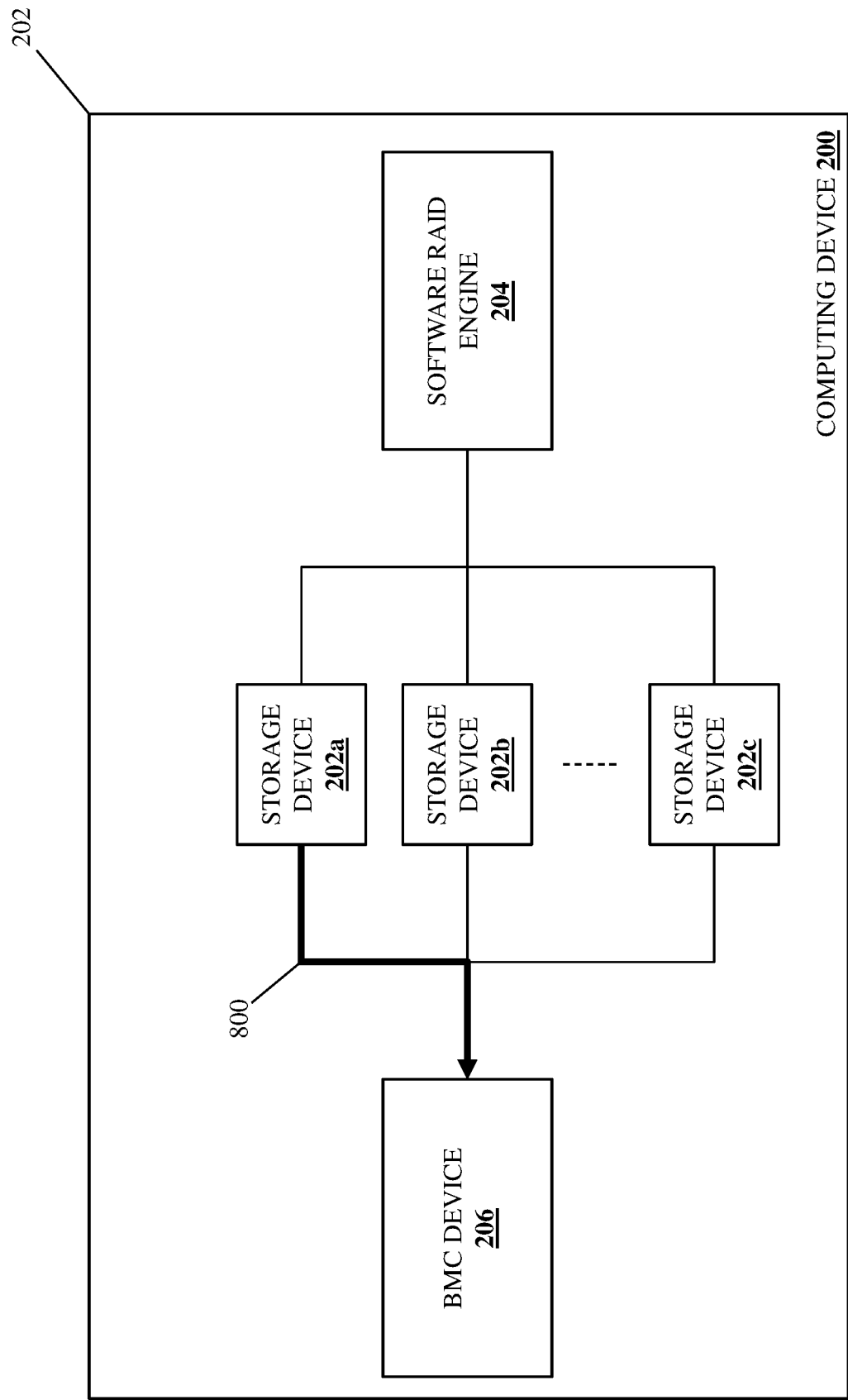
FIG. 8B is a schematic view illustrating an embodiment of the operation of the computing device of FIG. 2 during the method of FIGS. 5A and 5B.
Figure 8C:
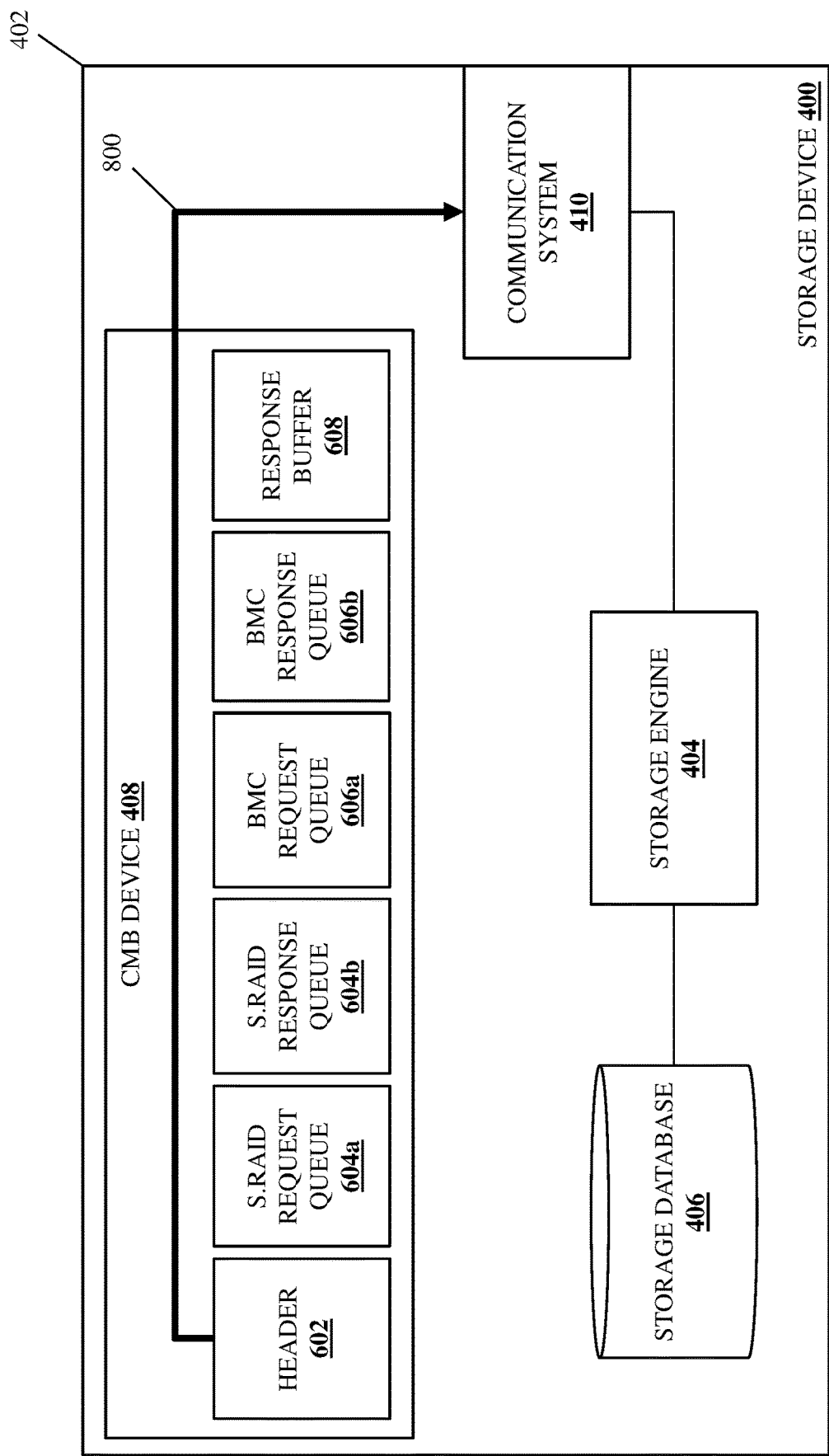
FIG. 8C is a schematic view illustrating an embodiment of the operation of the storage device of FIG. 4 during the method of FIGS. 5A and 5B.

As such, with reference to FIGS. 8A, 8B, and 8C, in an embodiment of decision block 504a and as part of the periodic accesses of the header 602 in the CMB device 408 of the storage device 202a/300, the BMC engine 304 in the BMC device 206/300 in the computing device 200 may perform software RAID information request identification operations 800 that include accessing the header 602 in the CMB device 408 in the storage device 202a/400 via the communication system 410 in the storage device 202a/400 and the communication system 308 in the BMC device 206/300, and determining that the software RAID engine 204 in the computing device 200 has submitted a software RAID information request in the software RAID request queue 604a based on the tail portion not matching the head portion of the head/tail information stored in the header 602 in the CMB device 408 (e.g., head/tail information such as "0/1" following an initial submission of a software RAID information request).

Figure 8E:
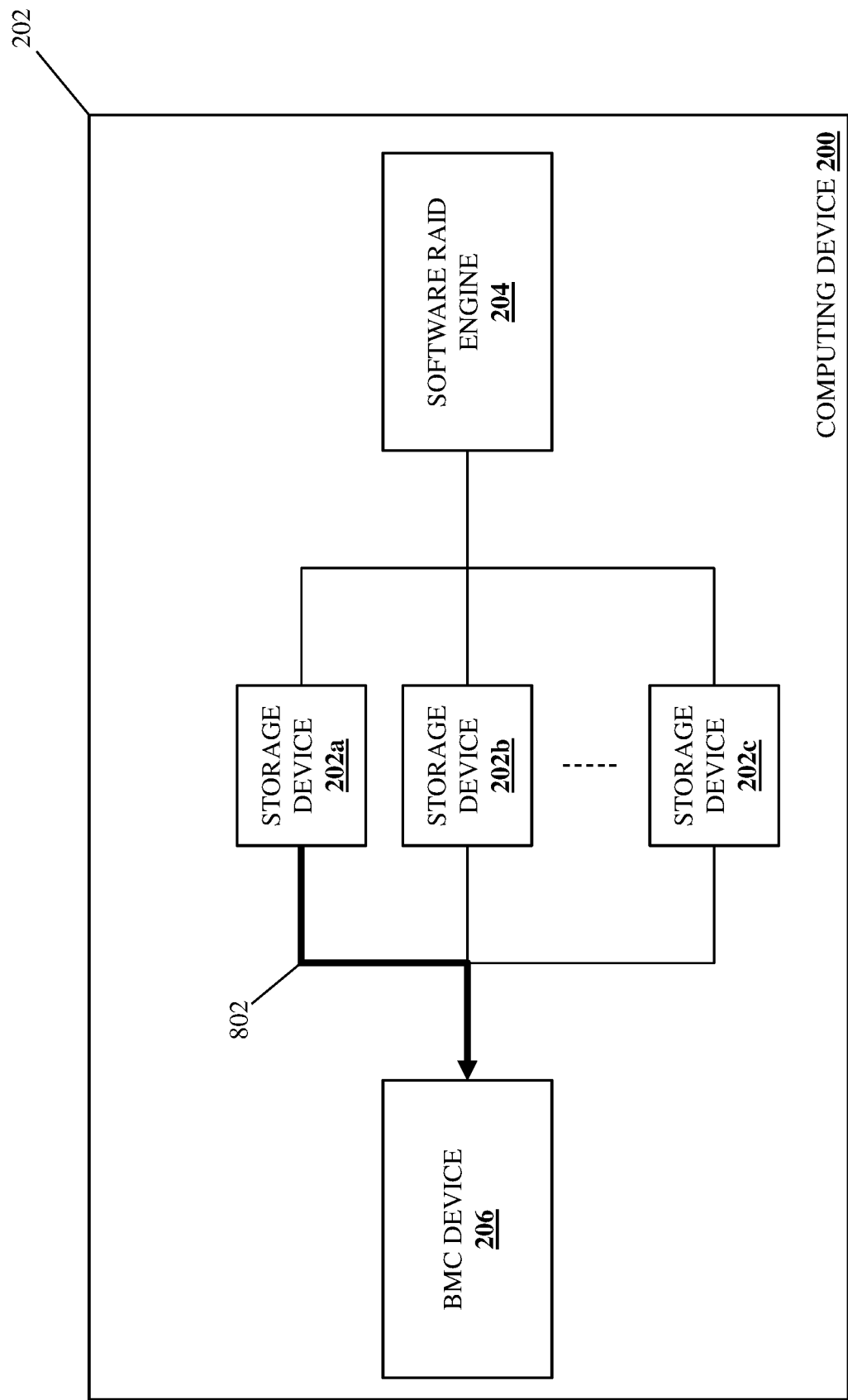
FIG. 8E is a schematic view illustrating an embodiment of the operation of the computing device of FIG. 2 during the method of FIGS. 5A and 5B.

With reference to FIGS. 8D, 8E, and 8F, in an embodiment of block 504b and in response to determining that the software RAID engine 204 in the computing device 200 has submitted a software RAID information request in the software RAID request queue 604a, the BMC engine 304 in the BMC device 206/300 in the computing device 200 may perform software RAID information request retrieval operations 802 that include accessing the software RAID request queue 604a in the CMB device 408 in the storage device 202a/400 via the communication system 410 in the storage device 202a/400 and the communication system 308 in the BMC device 206/300, and retrieving the software RAID information request.

Returning to the management-initiated communication of blocks 506a-506e, and similarly as described above, if at decision block 506a the software RAID subsystem identifies a management information request in the storage device memory subsystem, the method 500 proceeds to block 506b where the software RAID subsystem retrieves management information identified in the management information request. While not illustrated and described in detail, one of skill in the art in possession of the present disclosure will appreciate how decision block 506a and block 506b may be performed by the software RAID engine 204 in the computing device 200 similarly as described above for the performance of decision block 504a and block 504b by the BMC engine 304 in the BMC device 206/300 in the computing device 200. As such, the BMC engine 304 may submit a management information request in the BMC request queue 606a, and any management information requests (and/or alignments) submitted at decision block 506a may conform to MCTP standards. The BMC engine 304 may also identify the submission of the management information request in the header 602 configured in the CMB device 408 by incrementing a head portion of the head/tail information stored in the header 602 in the CMB device 408 in response to submitting the management information request (e.g., from the "0/0" as initially set during block 502 to "1/0").

Subsequently and as part of the periodic accesses of the header 602 in the CMB device 408 of the storage device 202a/300, the software RAID engine 204 in the computing device 200 may access the header 602 and determine that the BMC engine 304 has submitted a management information request in the BMC request queue 606a based on the head portion not matching the tail portion of the head/tail information stored in the header 602 in the CMB device 408 (e.g., head/tail information such as "1/0" following an initial submission of a management information request). The software RAID engine 204 may then access the BMC request queue 606a and retrieve the management information request.

Figure 8I:
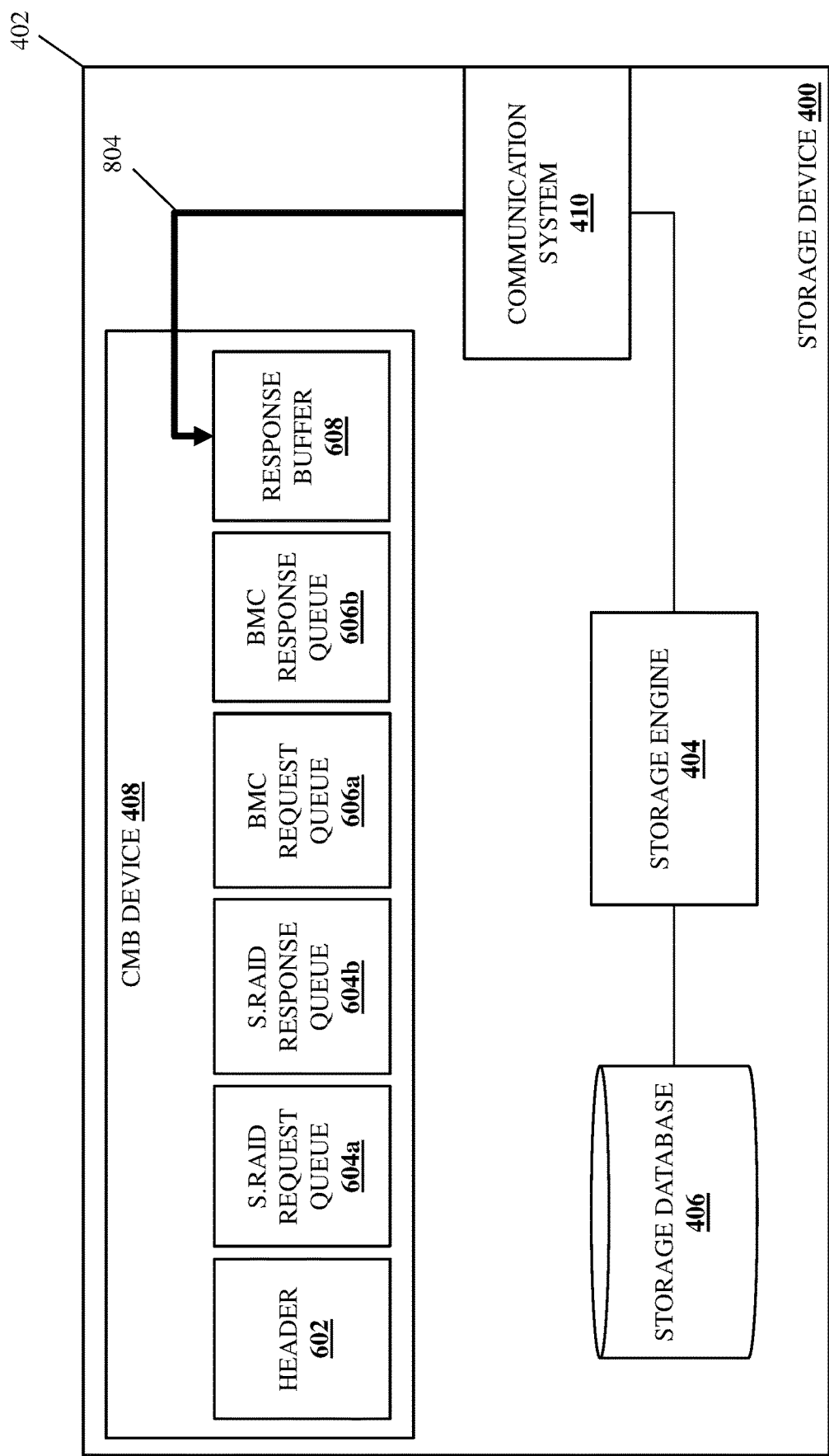
FIG. 8I is a schematic view illustrating an embodiment of the operation of the storage device of FIG. 4 during the method of FIGS. 5A and 5B.

Returning to the software-RAID-initiated communication of blocks 504a-504e, the method 500 then proceeds to block 504c where the management subsystem provides the software RAID information and a software RAID information response in the storage device memory subsystem. With reference to FIGS. 8G, 8H, and 8I, in an embodiment of block 504c, the BMC engine 304 in the BMC device 206/300 in the computing device 200 may perform software RAID information provisioning operations 804 that include retrieving the software RAID information (e.g., the BMC engine 304 may identify the vendor-defined opcode for "BAYID" in the software RAID information request and, in response, retrieve the BAYID of the NVMe storage device requested by the software RAID engine 204 in the specific example above), and transmitting that software RAID information via its communication system 308 and the communication system 410 in the storage device 202a/400 to the response buffer 608 in the CMB device 408 in the storage device 202a/400.

Figure 8L:
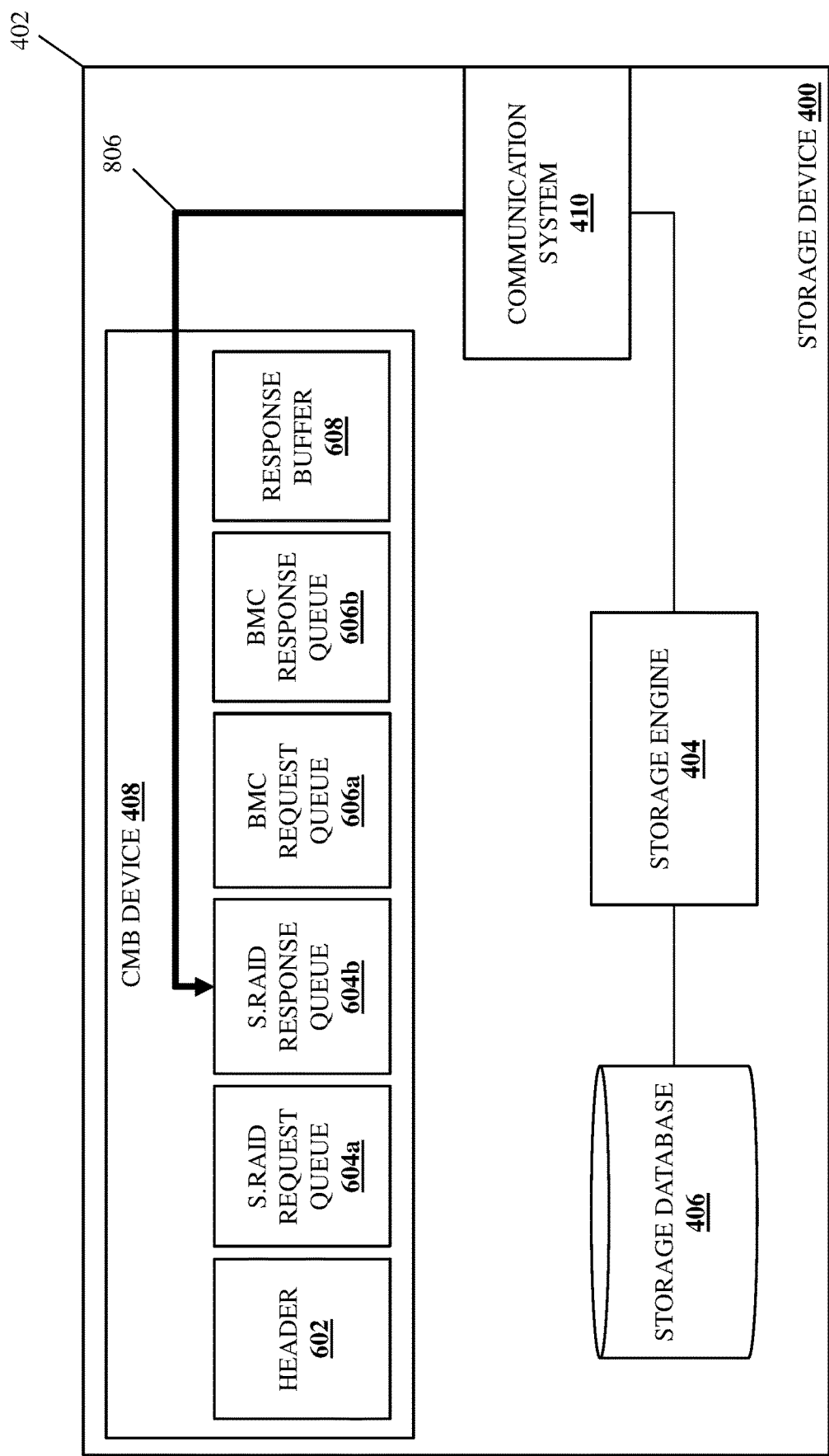
FIG. 8L is a schematic view illustrating an embodiment of the operation of the storage device of FIG. 4 during the method of FIGS. 5A and 5B.
Figure 8O:
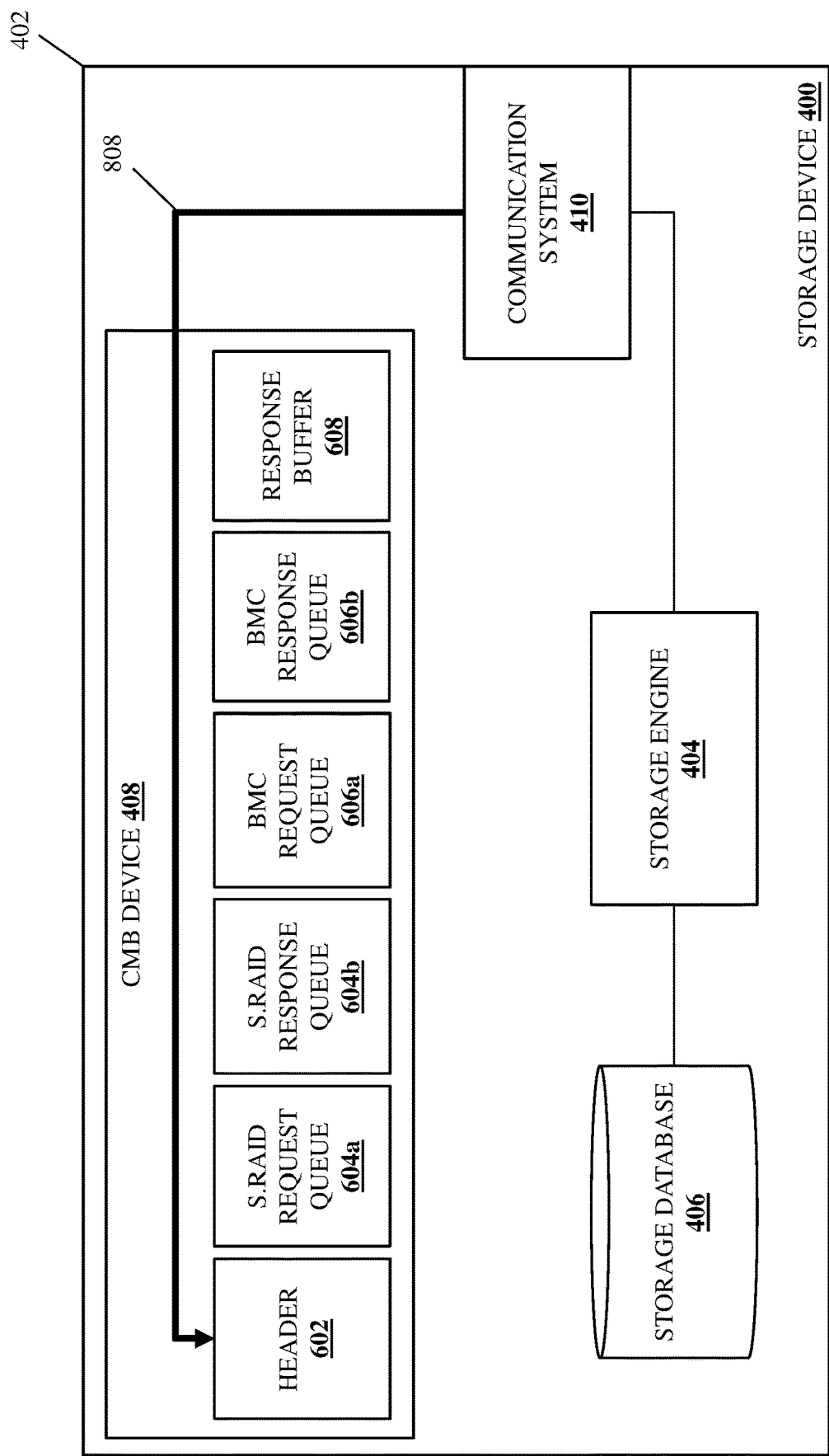
FIG. 8O is a schematic view illustrating an embodiment of the operation of the storage device of FIG. 4 during the method of FIGS. 5A and 5B.

With reference to FIGS. 8J, 8K, and 8L, in an embodiment of block 504c, the BMC engine 304 in the BMC device 206/300 in the computing device 200 may perform software RAID information response provisioning operations 806 that include transmitting a software RAID information response via its communication system 308 and the communication system 410 in the storage device 202a/400 to the software RAID response queue 604b in the CMB device 408 in the storage device 202a/400. Similarly as described above, any software RAID information responses (and/or alignments) submitted at block 504c may conform to MCTP standards. With reference to FIGS. 8M, 8N, and 8O, in an embodiment of block 504c, the BMC engine 304 in the BMC device 206/300 in the computing device 200 may perform software RAID information response identification operations 808 that include accessing the header 602 in the CMB device 408 of the storage device 202a/400 via its communication system 308 and the communication system 410 in the storage device 202a/400, and updating the head portion of the head/tail information in the header 602 (e.g., from the "0/1" following the provisioning of the software RAID information request by the software RAID engine 204 to "1/1") to indicate that the software RAID information response has been provided in response to the software RAID information request.

Returning to the management-initiated communication of blocks 506a-506e, and similarly as described above, at block 506c the software RAID subsystem provides the management information and a management information response in the storage device memory subsystem. While not illustrated and described in detail, one of skill in the art in possession of the present disclosure will appreciate how block 506c may be performed by the software RAID engine 204 in the computing device 200 similarly as described above for the performance of block 504c by the BMC engine 304 in the BMC device 206/300 in the computing device 200. As such, the software RAID engine 204 may retrieve the management information requested by the BMC engine 304, and transmit that management information to the response buffer 608 in the CMB device 408 in the storage device 202a/400. Furthermore, the software RAID engine 204 may transmit management information response to the BMC response queue 606b in the CMB device 408, and any management information responses (and/or alignments) submitted at block 506c may conform to MCTP standards. Finally, the software RAID engine 204 may also access the header 602 in the CMB device 408 of the storage device 202a/400, and update the tail portion of the head/tail information in the header 602 (e.g., from the "1/0" following the provisioning of the management information request by the BMC engine 304 to "1/1") to indicate that the management information response has been provided in response to the management information request.

Figure 9A:
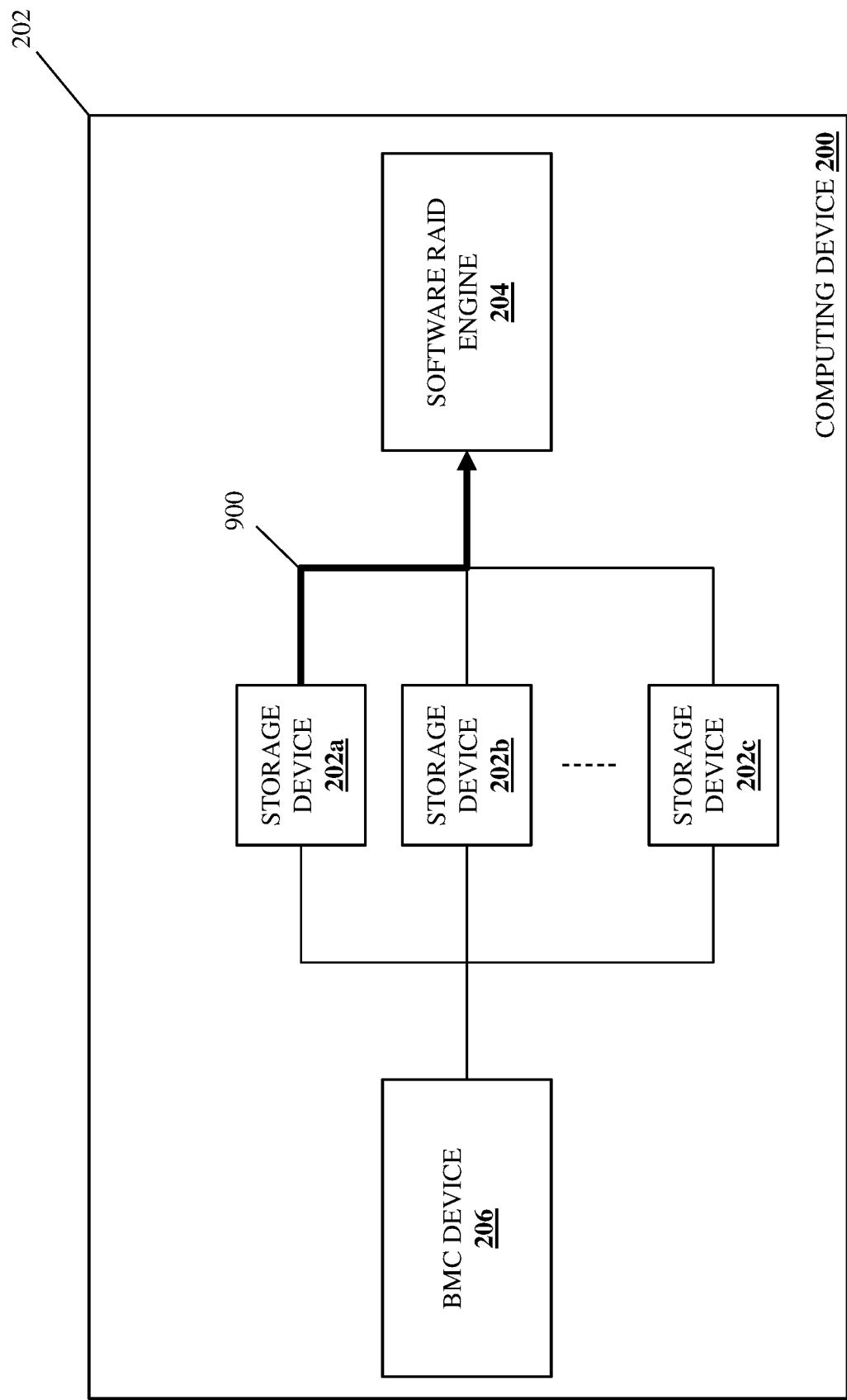
FIG. 9A is a schematic view illustrating an embodiment of the operation of the computing device of FIG. 2 during the method of FIGS. 5A and 5B.
Figure 9B:
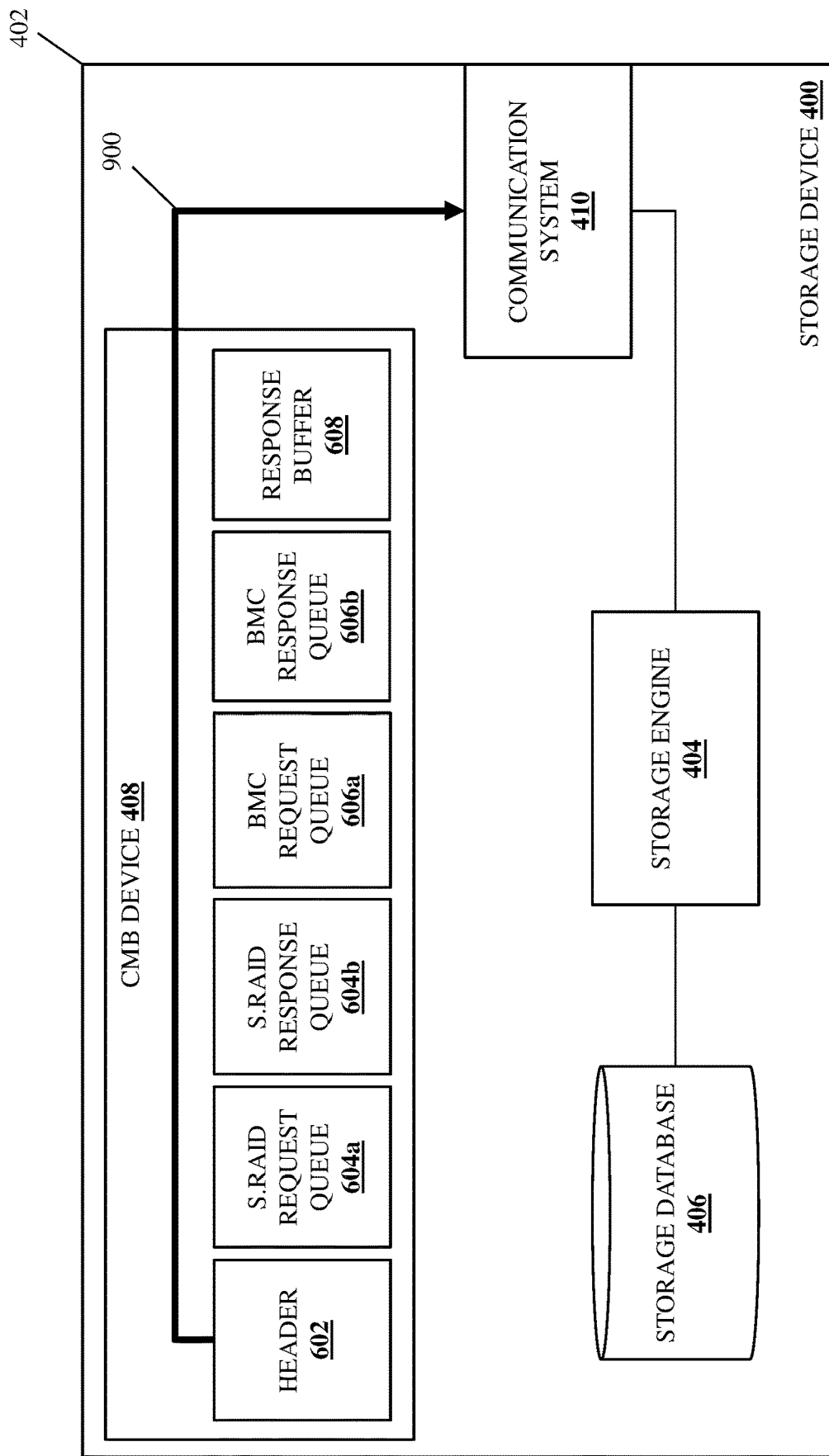
FIG. 9B is a schematic view illustrating an embodiment of the operation of the storage device of FIG. 4 during the method of FIGS. 5A and 5B.

Returning to the software-RAID-initiated communication of blocks 504a-504e, the method 500 then proceeds to block 504d where the software RAID subsystem identifies the software RAID information response in the storage device memory subsystem. With reference to FIGS. 9A and 9B, in an embodiment of block 504d and as part of the periodic accesses of the header 602 in the CMB device 408 of the storage device 202a/300, the software RAID engine 204 in the computing device 200 may perform software RAID information response identification operations 900 that include accessing the header 602 in the CMB device 408 in the storage device 202a/400 via the communication system 410 in the storage device 202a/400, and determining that the BMC engine 304 in the BMC device 206/300 in the computing device 200 has submitted a software RAID information response in the software RAID response queue 604b based on the tail portion being equal to the head portion of the head/tail information stored in the header 602 in the CMB device 408 (e.g., head/tail information such as "1/1" following a software RAID information response to an initial submission of a software RAID information request). In response to determining that the BMC engine 304 has submitted a software RAID information response in the software RAID response queue 604b, the software RAID engine 204 will retrieve the software RAID information response from the software RAID response queue 604b.

Returning to the management-initiated communication of blocks 506a-506e, and similarly as described above, at block 506d the management subsystem identifies the management information response in the storage device memory subsystem. While not illustrated and described in detail, one of skill in the art in possession of the present disclosure will appreciate how block 506d may be performed by the BMC engine 204 in the BMC device 206/300 in the computing device 200 similarly as described above for the performance of block 504d by the software RAID engine 204 in the computing device 200. As such, as part of the periodic accesses of the header 602 in the CMB device 408 of the storage device 202a/300, the BMC engine 304 in the BMC device 206/300 in the computing device 200 may access the header 602 in the CMB device 408 in the storage device 202a/400 and determine that the software RAID engine 204 has submitted a management information response in the management response queue 606b based on the head portion being equal to the tail portion of the head/tail information stored in the header 602 in the CMB device 408 (e.g., head/tail information such as "1/1" following a management information response to an initial submission of a management information request). In response to determining that the software RAID engine 204 has submitted a management information response in the management response queue 606b, the BMC engine 304 will retrieve the management information response from the management response queue 606b.

Figure 9D:
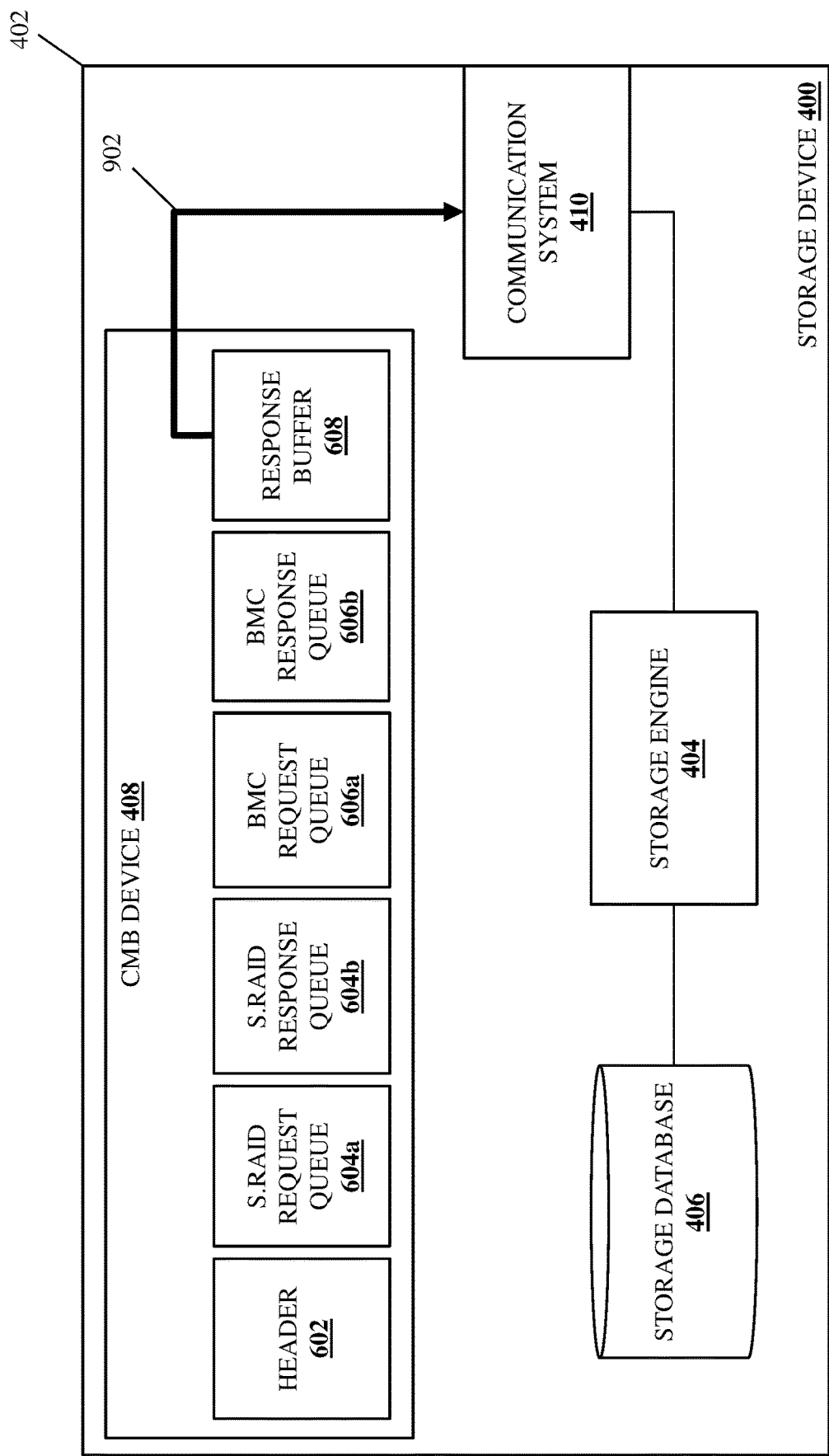
FIG. 9D is a schematic view illustrating an embodiment of the operation of the storage device of FIG. 4 during the method of FIGS. 5A and 5B.

Returning to the software-RAID-initiated communication of blocks 504a-504e, the method 500 then proceeds to block 504e where the software RAID subsystem retrieves the software RAID information from the storage device memory subsystem. With reference to FIGS. 9C and 9D, in an embodiment of block 504e and in response to determining that the BMC engine 304 in the BMC device 206/300 in the computing device 200 has submitted a management information response in the software RAID response queue 604b, the software RAID engine 204 in the computing device 200 may perform software RAID information retrieval operations 902 that include retrieving the software RAID information (provided by the BMC engine 304) from the response buffer 608 in the CMB device 408 in the storage device 202a/400 via the communication system 410 in the storage device 202a/400. As such, the software RAID engine 204 may request and receive software RAID information from the BMC device 206/300 using the CMB device 408 in the storage device 202a/400.

Returning to the management-initiated communication of blocks 506a-506e, and similarly as described above, at block 506e the management subsystem retrieves the management information from the storage device memory subsystem. While not illustrated and described in detail, one of skill in the art in possession of the present disclosure will appreciate how block 506e may be performed by the BMC engine 204 in the BMC device 206/300 in the computing device 200 similarly as described above for the performance of block 504e by the software RAID engine 204 in the computing device 200. As such, in response to determining that the software RAID engine 204 in the computing device 200 has submitted a management information response in the BMC response queue 606b, the BMC engine 304 may retrieve the management information (provided by the software RAID engine 204) from the response buffer 608 in the CMB device 408 in the storage device 202a/400. As such, the BMC device 206/300 may request and receive management information from the software RAID engine 204 using the CMB device 408 in the storage device 202a/400.

Thus, systems and methods have been described that utilize a storage device memory subsystem in a storage device for communications between a software RAID subsystem and a management subsystem. For example, the software RAID/management communication system of the present disclosure may include a chassis housing a software Redundant Array of Independent Disk (RAID) subsystem and a management subsystem that are each coupled to a storage device having a storage device memory subsystem. The software RAID subsystem provides a software RAID information request in the storage device memory subsystem that requests the management subsystem provide software RAID information associated with the operation of a software RAID provided by the software RAID subsystem, the software RAID subsystem then periodically accesses the storage device memory subsystem and, when the software RAID subsystem determines that the management subsystem has provided a management information response in the storage device memory subsystem, the software RAID subsystem retrieves the software RAID information that was provided in the storage device memory subsystem by the management subsystem. As such, critical, real-time data may be exchanged between software RAID subsystems and management subsystems without the need to rely on changes/updates to an SMBIOS, BIOS, and/or IPMI and the corresponding time delays required for such changes/updates.

Referring now to FIG. 10, an embodiment of a method 1000 for providing trusted storage-device-based communications between a software RAID subsystem and a management subsystem in a computing device is illustrated. As discussed below, the systems and methods of the present disclosure provide for the provisioning of trusted storage-device-based communications between a management subsystem and a software RAID subsystem in computing device. For example, the software RAID/management trusted storage-device-based communication system of the present disclosure may include a chassis housing a software RAID subsystem, a storage device that is coupled to the software RAID subsystem and that includes a storage device memory subsystem, and a management subsystem that is coupled to the storage device. The management subsystem authenticates the storage device to establish management subsystem/storage device trust between the management subsystem and the storage device and, in response, uses the storage device to establish management subsystem/software RAID subsystem trust between the management subsystem and the software RAID subsystem. In response to establishing the management subsystem/storage device trust and the management subsystem/software RAID subsystem trust, the management subsystem transmits communications with the software RAID subsystem via the storage device memory subsystem in the storage device. As such, the authenticity of communications transmitted via a storage device and between a management subsystem and a software RAID subsystem may be ensured.

As will be appreciated by one of skill in the art in possession of the present disclosure, the method 1000 may be performed during the method 500 discussed above with reference to FIGS. 5A and 5B (e.g., subsequent to the configuration of the storage device memory subsystem at block 502) in order to provide trusted storage-device-based communications between the software RAID engine 204a and the BMC engine 304 in the BMC device 206/300 included in the computing device 200 during the method 500. However, while a particular timing for establishing trust for particular communications between the software RAID engine 204a and the BMC engine 304 has been described, one of skill in the art in possession of the present disclosure will appreciate how the method 1000 may be performed at other times to provide other trusted storage-device-based communications between the software RAID engine 204a and the BMC engine 304 while remaining within the scope of the present disclosure as well.

As will be appreciated by one of skill in the art in possession of the present disclosure, the method 1000 described below may include blocks 1002a, 1004a, and 1006a in which the management subsystem uses the storage device to establish management subsystem/software RAID subsystem trust with the software RAID subsystem prior to transmitting communications to the software RAID subsystem via the storage device, and/or may also include blocks 1002b, 1004b, and 1006b in which the software RAID subsystem uses the storage device to establish software RAID subsystem/management subsystem trust with the management subsystem prior to transmitting communications to the management subsystem via the storage device, with either or both of blocks 1002a-1006a and blocks 1002b-1006b performed as part of the method 1000. Furthermore, while the establishment of trust for communications by the management subsystem is described in more detail below, one of skill in the art in possession of the present disclosure will recognize how trust for communications may established by the software RAID subsystem in a similar manner while remaining within the scope of the present disclosure as well.

Figure 11A:
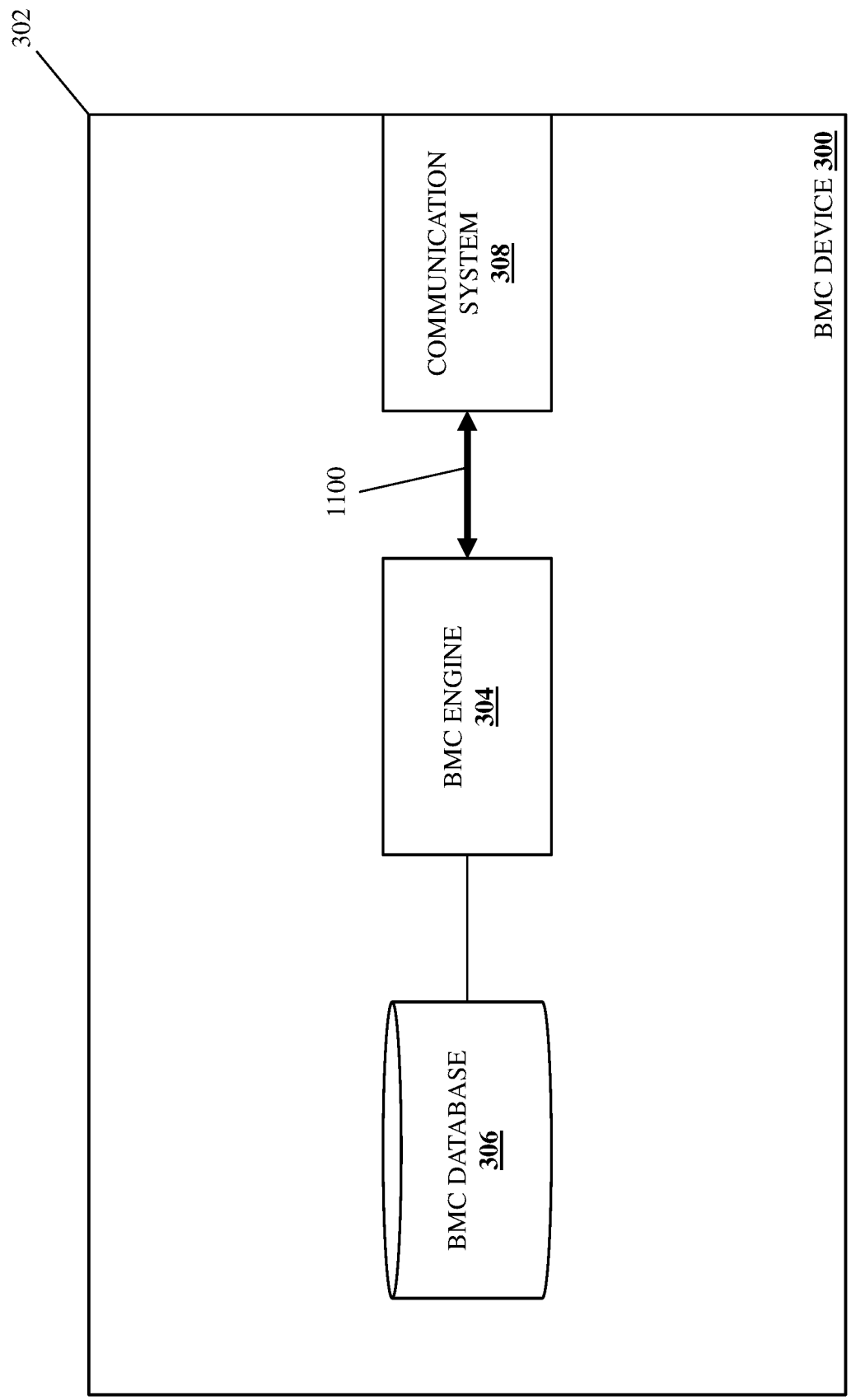
FIG. 11A is a schematic view illustrating an embodiment of the operation of the management subsystem of FIG. 3 during the method of FIG. 10.
Figure 11C:
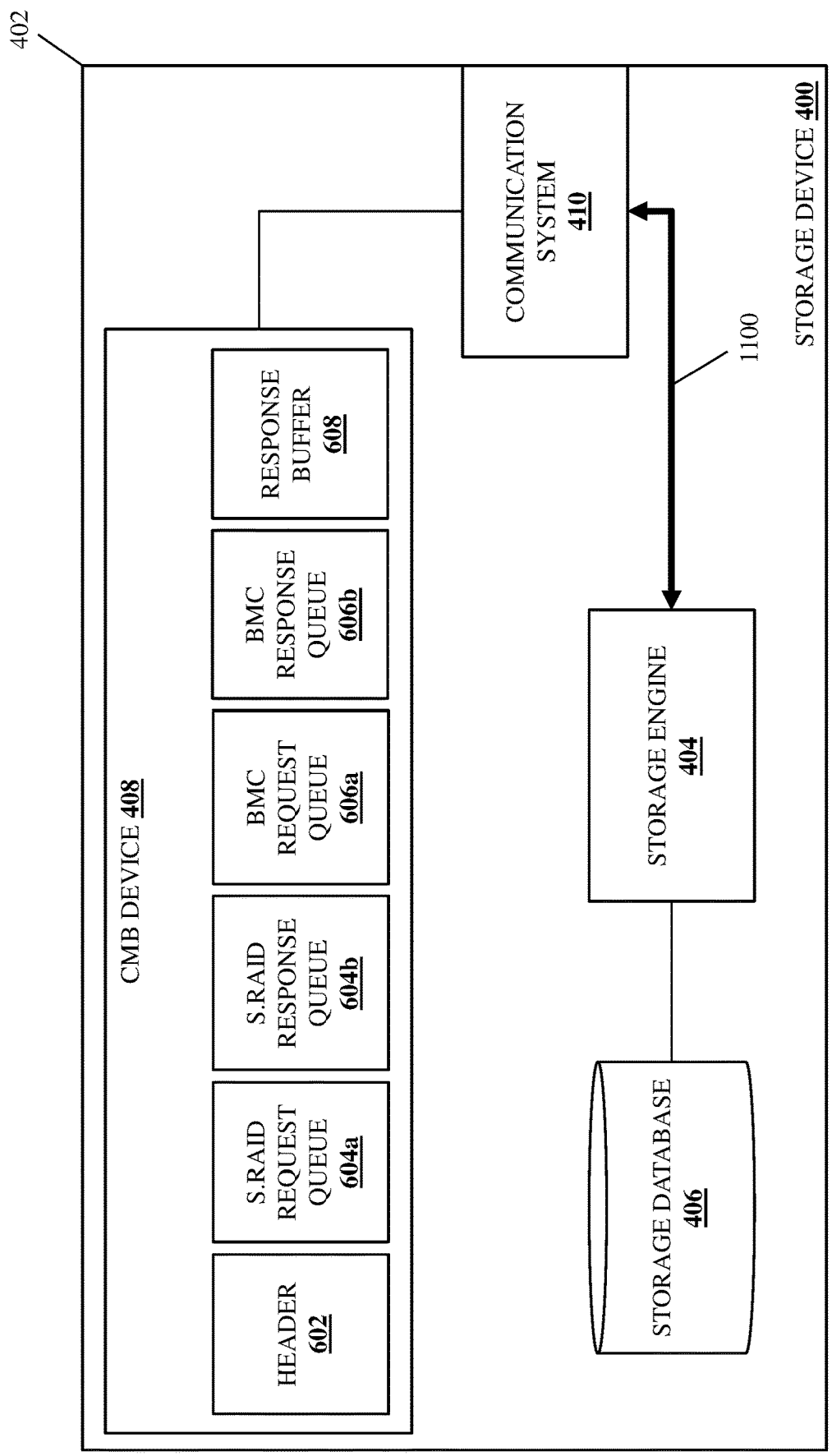
FIG. 11C is a schematic view illustrating an embodiment of the operation of the storage device of FIG. 4 during the method of FIG. 10.

With reference to the embodiment of the method 1000 involving blocks 1002a-1006a, the method 1000 may begin at block 1002a where a management subsystem authenticates a storage device to establish management subsystem/storage device trust. With reference to FIGS. 11A, 11B, and 11C, in an embodiment of block 1002a, the BMC engine 304 in the BMC device 206/300 of the computing device 200 may perform storage device authentication operations 1100 with the storage engine 404 in the storage device 202a/400 via their respective communication systems 308 and 410. In a specific example, the storage device authentication operations 1100 performed by the BMC engine 304 may be SPDM authentication operations that may include the BMC engine 304 performing any of a variety of SPDM challenge operations with the storage device 202a/400 (e.g., using certificates as described below), and the storage device 202a/400 providing any of a variety of SPDM challenge responses to those SPDM challenge operations, that one of skill in the art in possession of the present disclosure would recognize as providing for the authentication of the storage device 202a/400 with the BMC engine 304 as per the SPDM specification. As such, SPDM authentication operations may provide for the certificate-based authentication described below that results in the establishment of a secure encrypted communication channel used for the trusted storage-device-based communications described below.

However, while SPDM authentication operations have been described, one of skill in the art in possession of the present disclosure will appreciate how other storage device authentication operations will fall within the scope of the present disclosure as well. For example, the BMC engine 304 in the BMC device 206/300 of the computing device 200 may have access to a computing device component verification certificate (e.g., a Secure Component Verification (SCV) certificate included in computing device provided by DELL® Inc. of Round Rock, Texas, United States) that is configured for use in verifying components that were provided in the computing device 200 during its manufacture, and the BMC engine 304 may utilize that computing device component verification certificate during the storage device authentication operations 1100 to authenticate the storage device 202a/400 by verifying that storage device 202a/400 was provided in the computing device 200 during its manufacture (e.g., in embodiments in which the storage device 202a/400 does not support SPDM authentication operations). As such, following block 1002a, the BMC engine 304 in the BMC device 206/300 may have authenticated the storage device 202a/400 such that management subsystem/storage device trust is established (i.e., such that a secure communication channel has been established between the BMC engine 304 and the storage device 202a/400).

Furthermore, one of skill in the art in possession of the present disclosure will appreciate how the method 1000 involving blocks 1002b-1006b may also begin at block 1002b where a software RAID subsystem authenticates a storage device to establish software RAID subsystem/storage device trust similarly as described above for the management subsystem at block 1002a. As such, the software RAID engine 204 may perform storage device authentication operations with the storage device 202a/400 (e.g., the SPDM authentication operations discussed above, the storage device authentication operations using the computing device component verification certificate discussed above, etc.) such that software RAID subsystem/storage device trust is established (i.e., such that a secure communication channel has been established between the software RAID engine 304 and the storage device 202a/400).

Figure 12:
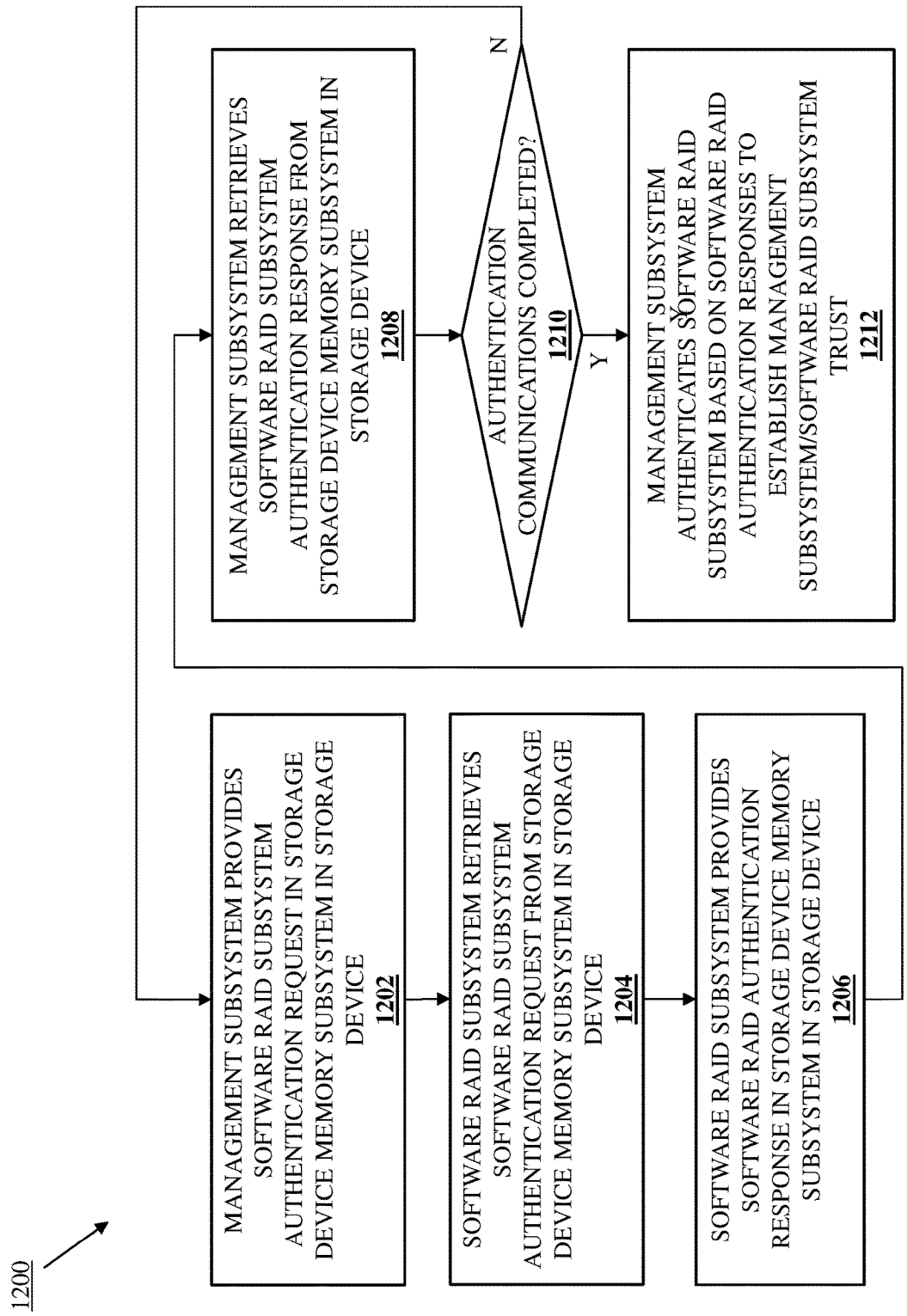
FIG. 12 is a flow chart illustrating an embodiment of a method for using a storage device to establish trust for storage-device-based communications between a software RAID subsystem and a management subsystem in a computing device.

Returning to the embodiment of the method 1000 involving blocks 1002a-1006a, the method 1000 may then proceed from block 1002a to block 1004a where the management subsystem uses the storage device to establish management subsystem/software RAID subsystem trust. As discussed below, in different embodiments of block 1004a and subsequent to establishing the management subsystem/storage device trust at block 1002a, the BMC engine 304 in the BMC device 206/300 of the computing device 200 may use that storage device 202a/400 in different ways in order to establish management subsystem/software RAID subsystem trust. For example, with reference to FIG. 12, an embodiment of a method 1200 for using a storage device to establish trust for storage-device-based communications between a software RAID subsystem and a management subsystem in a computing device is illustrated that may be performed during block 1004a of the method 1000. As discussed below, the method 1200 provides for the performance of software RAID subsystem authentication operations through the storage device in order to authenticate the software RAID subsystem and establish management subsystem/software RAID subsystem trust.

Figure 13A:
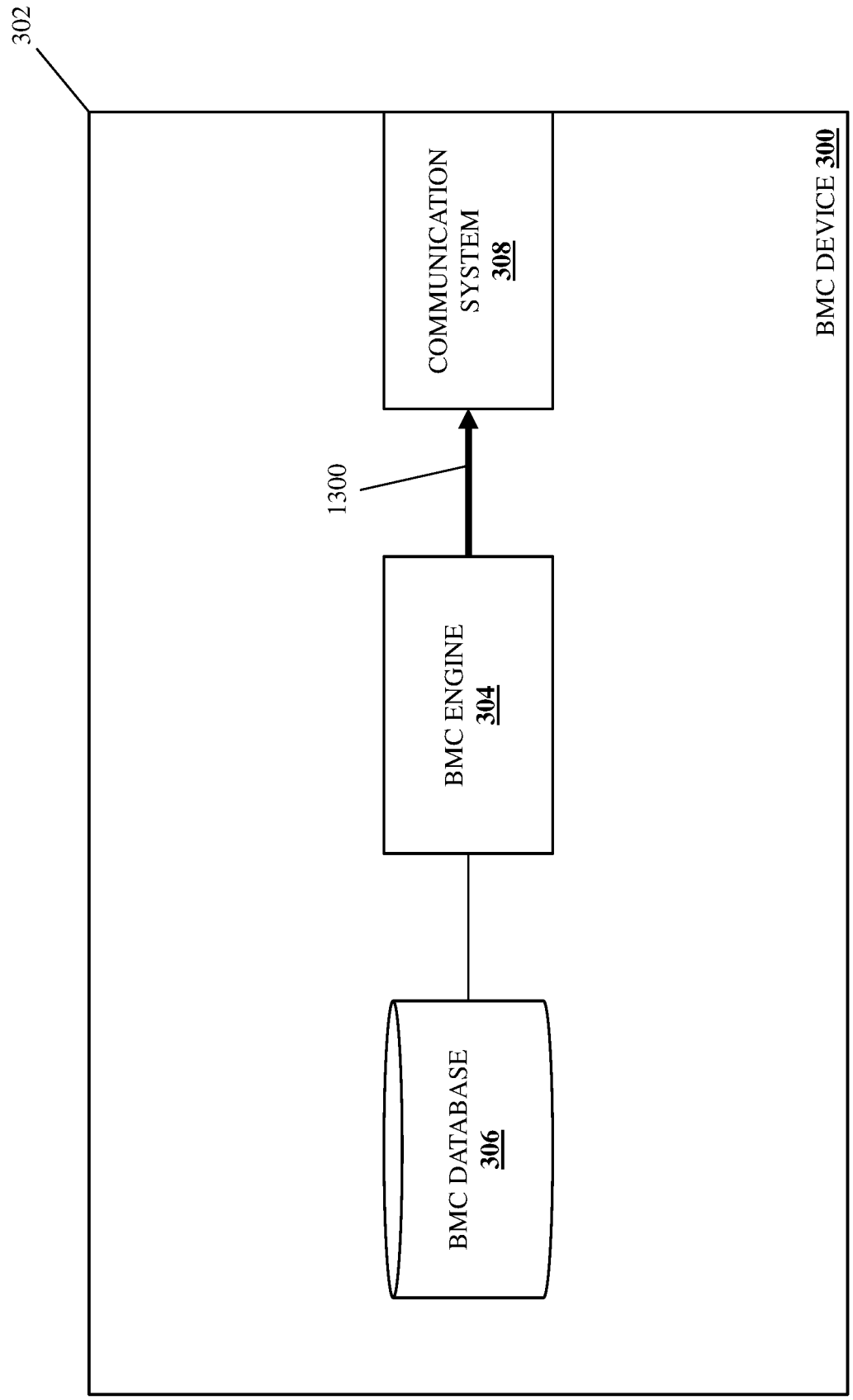
FIG. 13A is a schematic view illustrating an embodiment of the operation of the management subsystem of FIG. 3 during the method of FIG. 12.
Figure 13B:
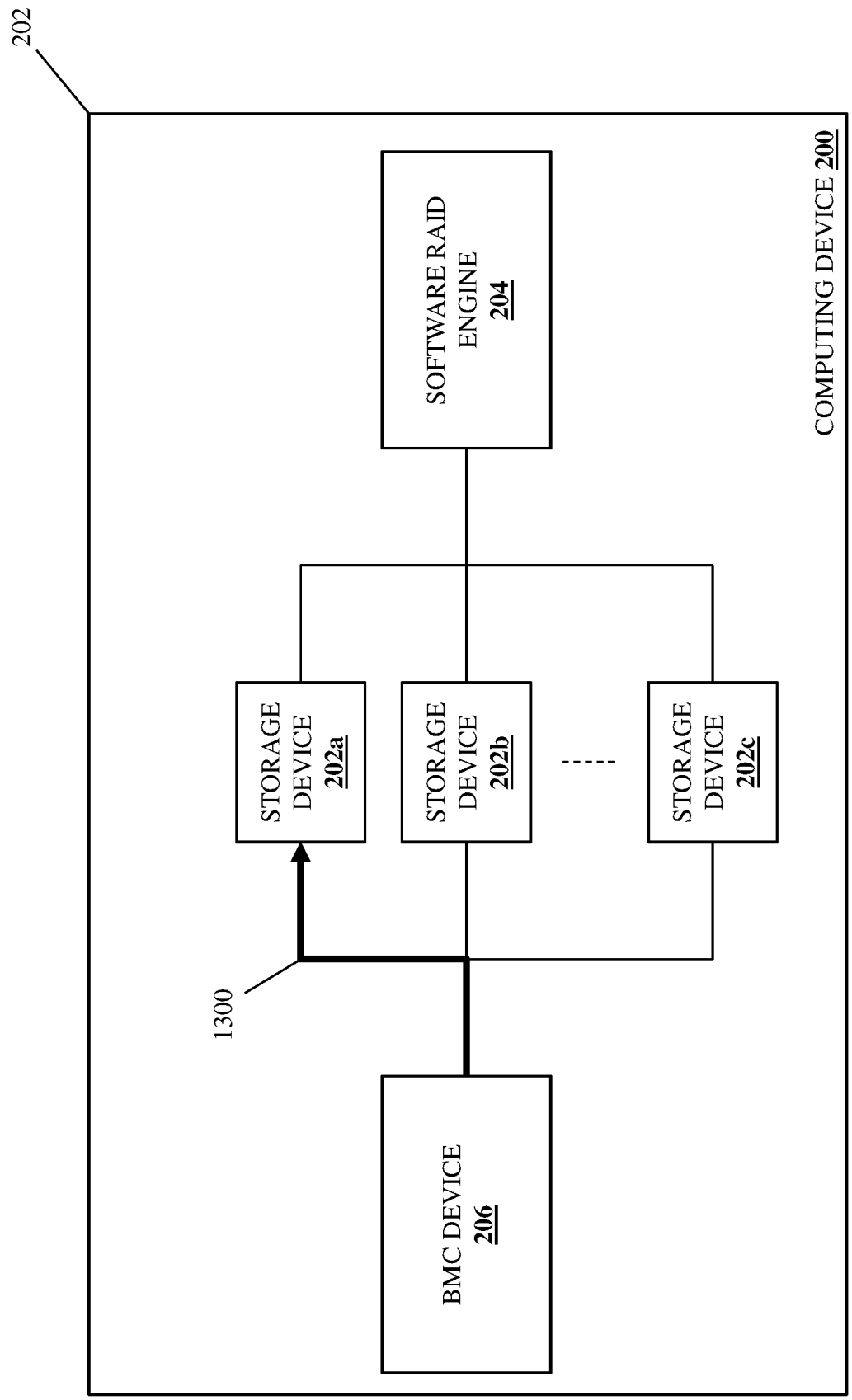
FIG. 13B is a schematic view illustrating an embodiment of the operation of the computing device of FIG. 2 during the method of FIG. 12.

For example, the method 1200 may begin at block 1202 where the management subsystem provides a software RAID subsystem authentication request in a storage device memory subsystem of the storage device. With reference to FIGS. 13A and 13B, in an embodiment of block 1202, the BMC engine 304 in the BMC device 206/300 of the computing device 200 may perform software RAID subsystem authentication request provisioning operations 1300 that include generating a software RAID subsystem authentication request and providing that software RAID subsystem authentication request to the storage device 202a/400. As such, similarly as described above during the method 500, at block 1202 the BMC engine 304 may provide the software RAID subsystem authentication request in the BMC request queue 606a in the CMB device 408.

Figure 13C:
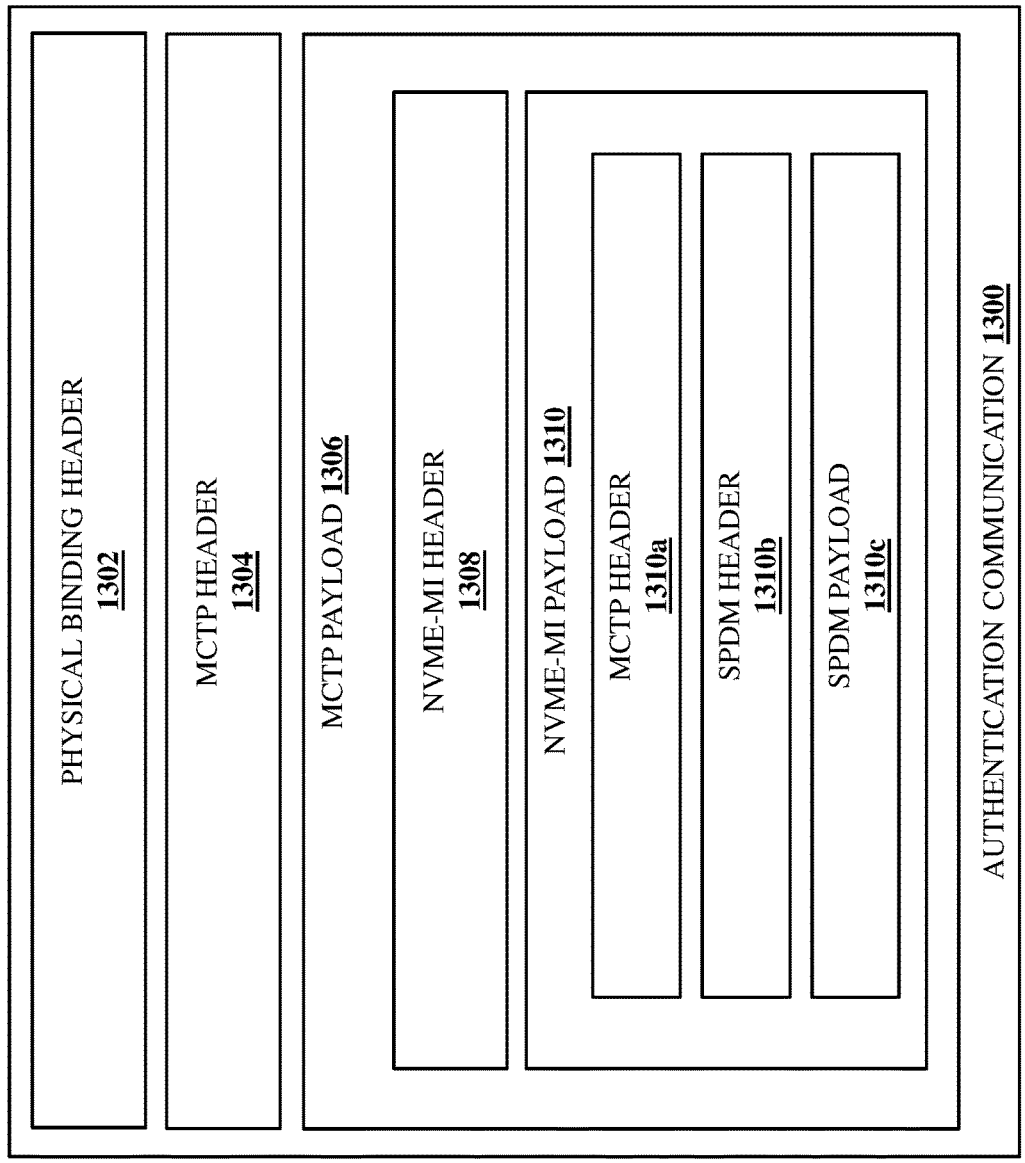
FIG. 13C is a schematic view illustrating an embodiment of an authentication communication transmitted during the method of FIG. 12.

With reference to FIG. 13C, an embodiment of an authentication communication 1300 is illustrated that may be utilized by the BMC engine 304 to provide the software RAID subsystem authentication request in the BMC request queue 606a in the CMB device 408 at block 1202 as part of the software RAID subsystem authentication request provisioning operations 1300. The authentication communications 1300 in the examples provided below are Management Component Transport Protocol (MCTP) communications that are configured to transmit NVMe-MI commands (i.e., commands using the NVMe-MI protocol), and are used in the present disclosure to tunnel SPDM commands within the NVMe-MI commands. As such, the authentication communication 1300 in the illustrated embodiment includes a physical binding header 1302 that will have header information that depends on the physical medium (e.g., an Inter-Integrated Circuit (I2C) medium, a Peripheral Component Interconnect express (PCIe) Vendor Defined Message (VDM) medium, etc.) over which the authentication communication 1300 is transmitted. The authentication communication 1300 also includes an MCTP header 1304 (e.g., an MCTP transport header) and an MCTP payload 1306, with an NVMe-MI header 1308 and NVMe-MI payload 1310 included in the MCTP payload 1306, and an MCTP header 1310a, an SPDM header 1310b, and an SPDM payload 1310c included in the NVMe-MI payload 1310. However, while a specific example of the tunneling of SPDM commands in NVMe-MI commands transmitted using MCTP communications has been provided, communications that utilize other protocols and/or transmit authentication communications in other manners are envisioned as falling within the scope of the present disclosure as well.

Thus, continuing with the specific example provided above, at block 1202 the BMC engine 304 may generate an SPDM command that provides the software RAID subsystem authentication request discussed above, provide that SPDM command in the SPDM payload 1310c of the authentication communication 1300 (while also providing any other information that one of skill in the art in possession of the present disclosure would recognize as being needed in the physical binding header 1302, the MCTP header 1304, the MCTP payload 1306, the NVMe-MI header 1308, the NVMe-MI payload 1310, the MCTP header 1310a, and/or the SPDM header 1310b in order to provide the functionality described below), submit that authentication communication 1300 to the BMC request queue 606a in the CMB device 408 of the storage device 202a/400, and increment the head portion of the head/tail information stored in the header 602 in the CMB device 408.

Figure 14:
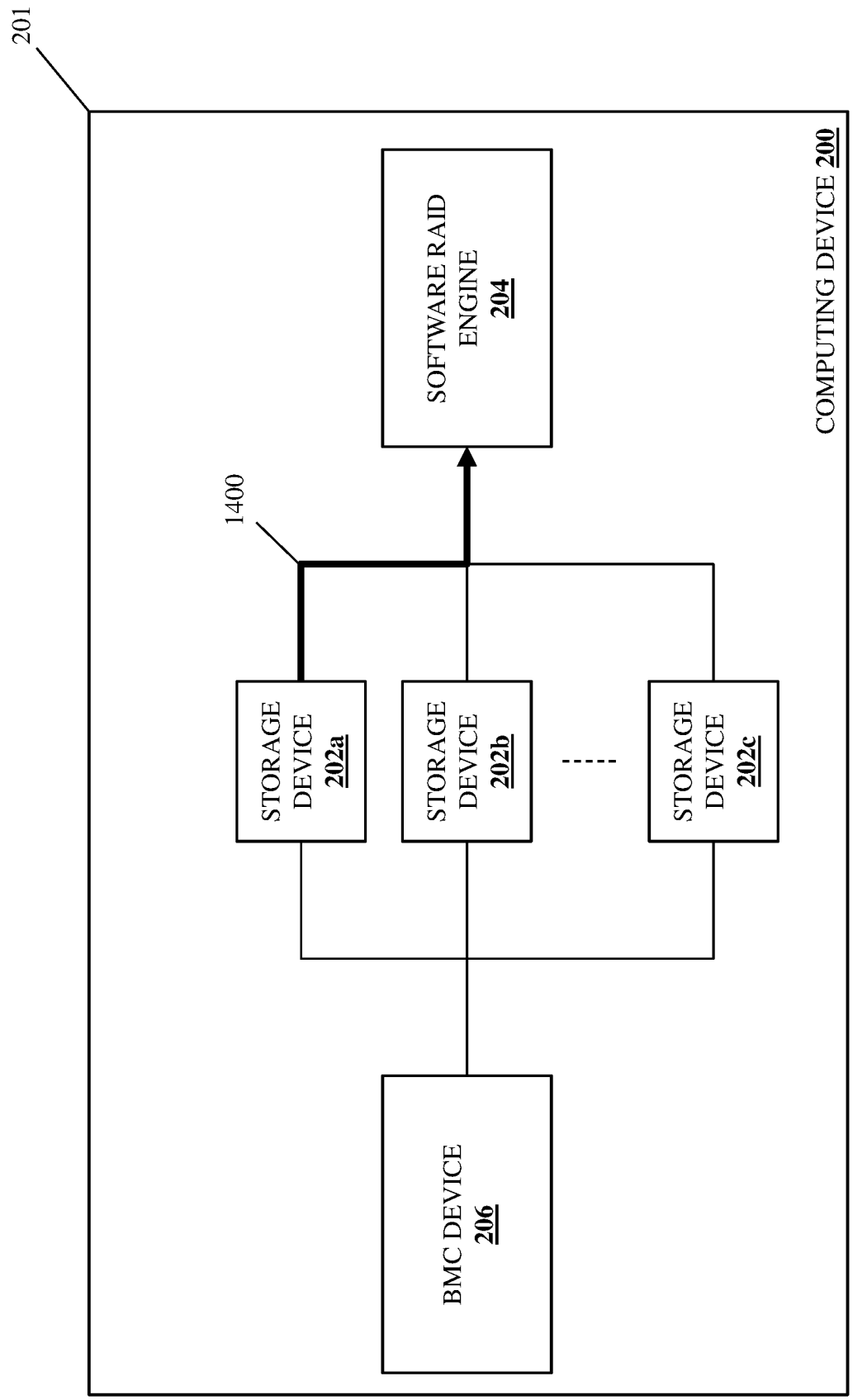
FIG. 14 is a schematic view illustrating an embodiment of the operation of the computing device of FIG. 2 during the method of FIG. 12.

The method 1200 then proceeds to block 1204 where the software RAID subsystem retrieves the software RAID subsystem authentication request from the storage device memory subsystem in the storage device. With reference to FIG. 14, in an embodiment of block 1204, the software RAID engine 204 in the computing device 200 may perform software RAID subsystem authentication request retrieval operations 1400 that include retrieving the software RAID subsystem authentication request from the storage device 202a. As such, similarly as described above with reference to block 506b of the method 500, as part of its periodic accesses of the header 602 in the CMB device 408 of the storage device 202a/300, the software RAID engine 204 in the computing device 200 may access the header 602 and determine that the BMC engine 304 has submitted a software RAID subsystem authentication request in the BMC request queue 606a based on the head portion not matching the tail portion of the head/tail information stored in the header 602 in the CMB device 408 and, in response, may then access the BMC request queue 606a and retrieve the software RAID subsystem authentication request.

Figure 15:
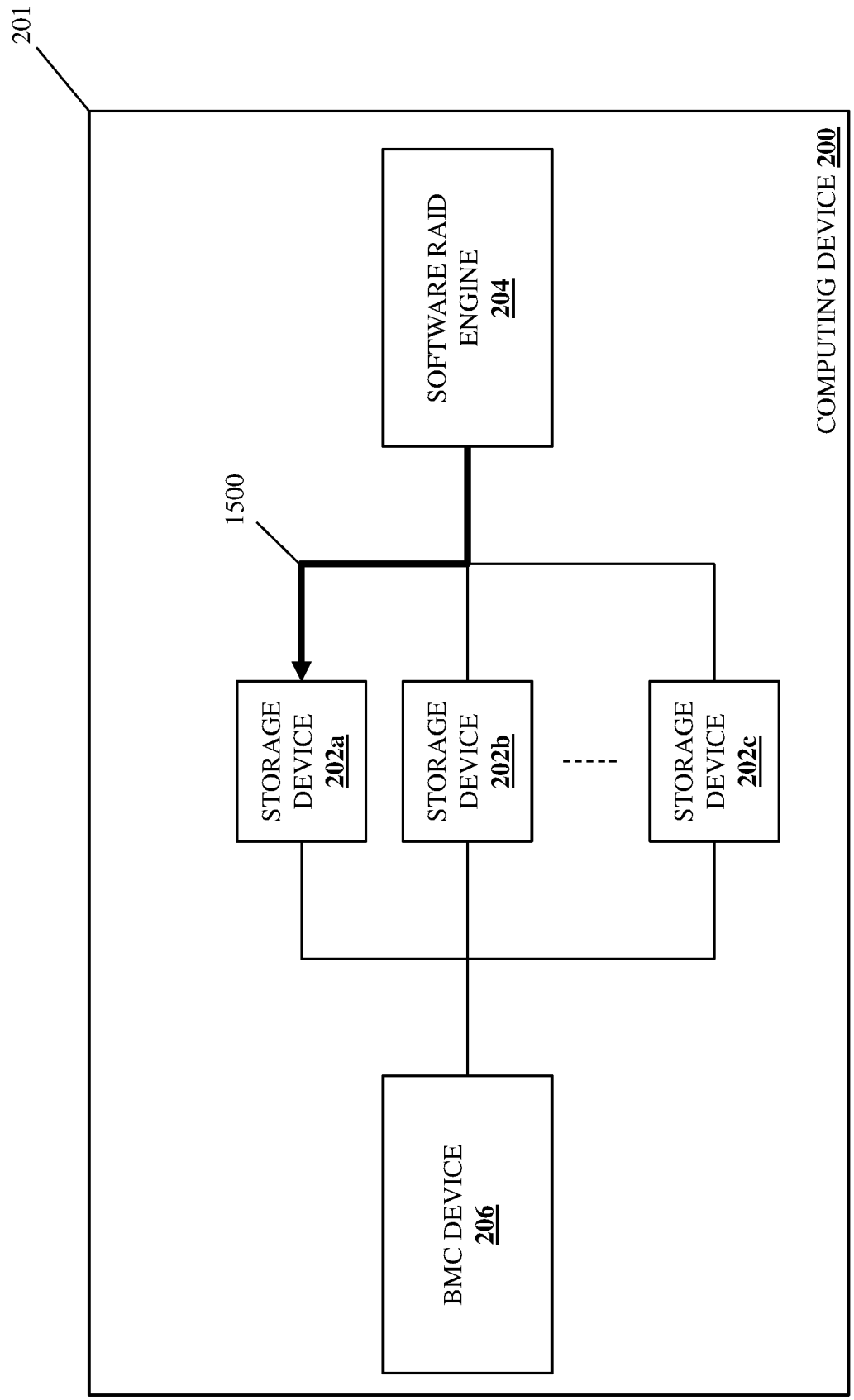
FIG. 15 is a schematic view illustrating an embodiment of the operation of the computing device of FIG. 2 during the method of FIG. 12.

The method 1200 then proceeds to block 1206 where the software RAID subsystem provides a software RAID subsystem authentication response in the storage device memory subsystem in the storage device. With reference to FIG. 15, in an embodiment of block 1206 and in response to retrieving the software RAID subsystem authentication request, the software RAID engine 204 in the computing device 200 may perform software RAID subsystem authentication response provisioning operations 1500 that include generating a software RAID subsystem authentication response and providing that response to the storage device 202a.

Continuing with the specific example of the authentication communication 1300 provided above, at block 1206 the software RAID engine 204 may generate an SPDM command that provides the software RAID subsystem authentication response discussed above using any of a variety of SPDM request/response techniques that would be apparent to one of skill in the art in possession of the present disclosure, provide that SPDM command in the SPDM payload 1310c of the authentication communication 1300 (while also providing any other information that one of skill in the art in possession of the present disclosure would recognize as being needed in the physical binding header 1302, the MCTP header 1304, the MCTP payload 1306, the NVMe-MI header 1308, the NVMe-MI payload 1310, the MCTP header 1310a, and/or the SPDM header 1310b in order to provide the functionality described below), transmit that authentication communication 1300 to the BMC response queue 606b in the CMB device 408, access the header 602 in the CMB device 408 of the storage device 202a/400, and update the tail portion of the head/tail information in the header 602 to indicate that the software RAID subsystem authentication response has been provided in response to the software RAID subsystem authentication request.

Figure 16A:
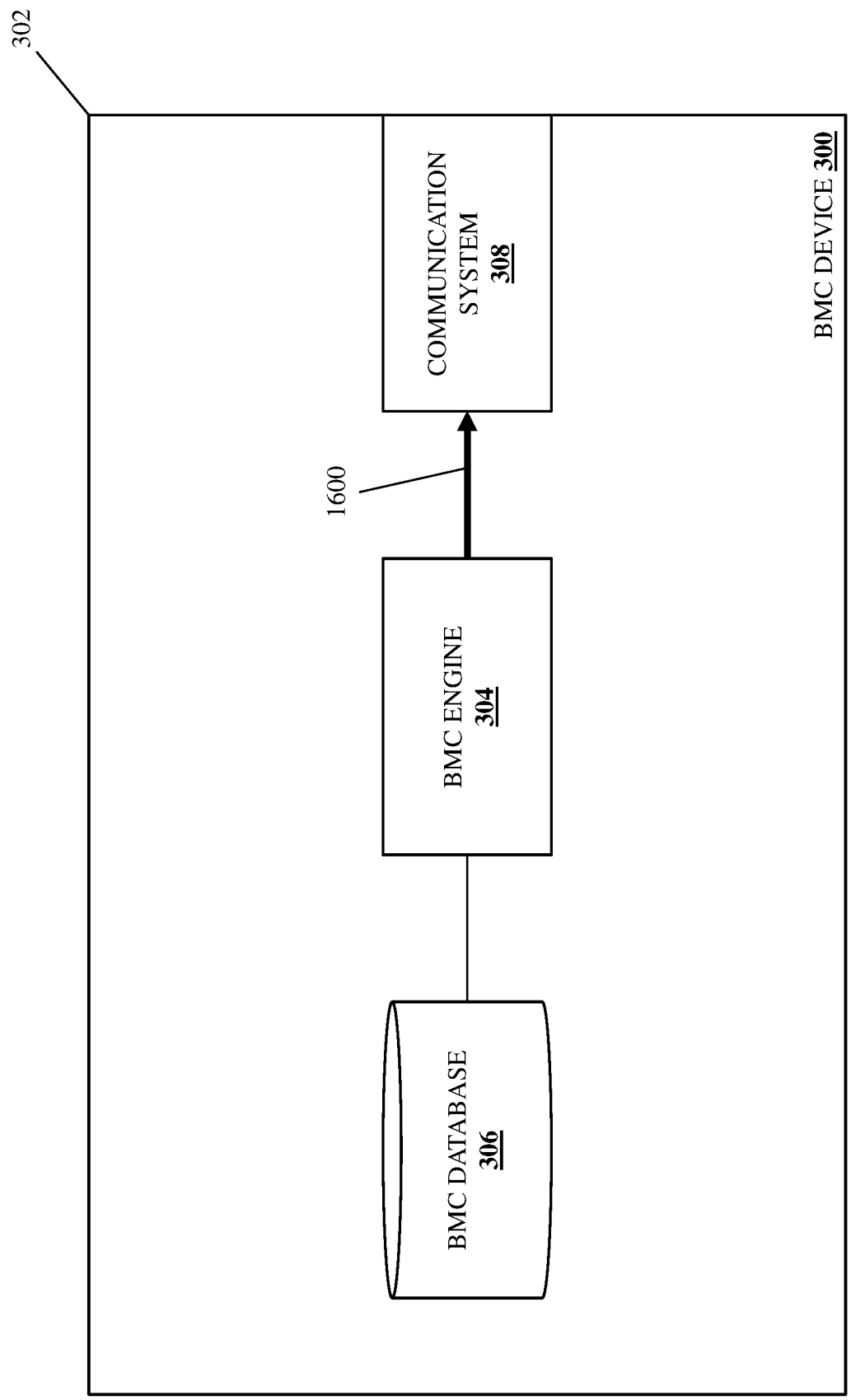
FIG. 16A is a schematic view illustrating an embodiment of the operation of the management subsystem of FIG. 3 during the method of FIG. 12.

The method 1200 then proceeds to block 1208 where the management subsystem retrieves the software RAID subsystem authentication response from the storage device memory subsystem in the storage device. With reference to FIGS. 16A and 16B, in an embodiment of block 1208, the BMC engine 304 in the BMC device 206/300 of the computing device 200 may perform software RAID subsystem authentication response retrieval operations 1600 that include retrieving the software RAID subsystem authentication response from the storage device 202a. As such, similarly as described above with reference to block 506d of the method 500, as part of its periodic accesses of the header 602 in the CMB device 408 of the storage device 202a/300, the BMC engine 304 may access the header 602 and determine that the software RAID engine 204 has submitted a software RAID subsystem authentication response in the BMC response queue 606b based on the tail portion not matching the head portion of the head/tail information stored in the header 602 in the CMB device 408 and, in response, may then access the BMC response queue 606b and retrieve the software RAID subsystem authentication response.

The method 1200 then proceeds to decision block 1210 where it is determined whether authentication communications have been completed. As will be appreciated by one of skill in the art in possession of the present disclosure, the management subsystem/software RAID subsystem authentication operations of the present disclosure (e.g., the SPDM authentication operations in the specific examples described above) may include a plurality of authentication communications (e.g., a plurality of software RAID subsystem authentication requests and responses at different iterations of blocks 1202-1208), and thus in an embodiment of decision block 1210, the BMC engine 304 in the BMC device 206/300 of the computing device 200 may determine whether those authentication communications have completed. If, at decision block 1210, it is determined that authentication communications have not been completed, the method 1200 returns to block 1202. As such, the method 1200 may loop such that authentication communications that provide the management subsystem/software RAID subsystem authentication operations of the present disclosure may be performed until the authentication communications have completed.

If, at decision block 1210, it is determined that authentication communications have been completed, the method 1200 proceeds to block 1212 where the management subsystem authenticates the software RAID subsystem based on the software RAID subsystem authentication responses to establish the management subsystem/software RAID subsystem trust. In an embodiment, at block 1212, the BMC engine 304 in the BMC device 206/300 of the computing device 200 may perform software RAID subsystem authentication operations that include authenticating the software RAID engine 204 in the computing device 200 based on the authentication communications transmitted during the iterations of the method 1000 (e.g., the plurality of software RAID subsystem authentication requests/responses described above). As such, continuing with the specific example provided above, at block 1212 the BMC engine 304 may perform any of a variety of SPDM authentication techniques using the software RAID subsystem authentication requests/responses that one of skill in the art in possession of the present disclosure will recognize as providing for the authentication of the software RAID engine 204. As such, following block 1212, the BMC engine 304 in the BMC device 206/300 of the computing device 200 may have authenticated the software RAID engine 204 in the computing device 200 such that management subsystem/software RAID subsystem trust is established (i.e., such that a secure communication channel has been established between the BMC engine 304 and the software RAID engine 204).

Furthermore, one of skill in the art in possession of the present disclosure will appreciate how the method 1000 involving blocks 1002*b*-1006*b* may proceed from block 1002*b* to block 1004*b* where the software RAID subsystem uses the storage device to establish software RAID subsystem/management subsystem trust similarly as the management subsystem described above during the method 1200. As such, the software RAID engine 204 may provide management subsystem authentication requests in the software RAID request queue 604*a* of the CMB device 408 in the storage device 202*a*/400 similarly as described above with reference to block 1202, the BMC engine 304 may retrieve management subsystem authentication requests similarly as described above with reference to block 1204 and provide management subsystem authentication responses in the software RAID response queue 604*b* of the CMB device 408 in the storage device 202*a*/400 similarly as described above with reference to block 1206, and the software RAID engine 204 may retrieve management subsystem authentication responses similarly as described above with reference to block 1208 in order to authenticate the BMC engine 304 and establish software RAID subsystem/management subsystem trust (i.e., such that a secure communication channel has been established between the software RAID engine 204 and the BMC engine 304).

Further still, one of skill in the art in possession of the present disclosure will appreciate how some embodiments of the method 1200 may provide for mutual authentication of the BMC engine 304 and the software RAID engine 204 during the method 1200. For example, using the SPDM authentication techniques discussed above, the authentication request and response exchanges at blocks 1202-1208 may be supplemented to allow the software RAID engine 204 to authenticate the BMC engine 304 to establish the software RAID subsystem/management subsystem trust discussed above (i.e., while the BMC engine 304 is authenticating the software RAID engine 204 to establish the management subsystem/software RAID subsystem trust as described in detail above).

As such, one of skill in the art in possession of the present disclosure will appreciate how the embodiments of the system and methods of the present disclosure may use a storage device to establish management subsystem/software RAID subsystem trust (and/or software RAID subsystem/management subsystem trust) by tunneling SPDM commands in NVMe-MI commands that are exchanged via a CMB device in that storage device. However, while the tunneling of authentication communications via a storage device to establish trust between a management subsystem and a software RAID subsystem has been described, one of skill in the art in possession of the present disclosure will appreciate how the storage device may be used in other manners to establish trust between a management subsystem and a software RAID subsystem while remaining within the scope of the present disclosure as well.

Figure 17:
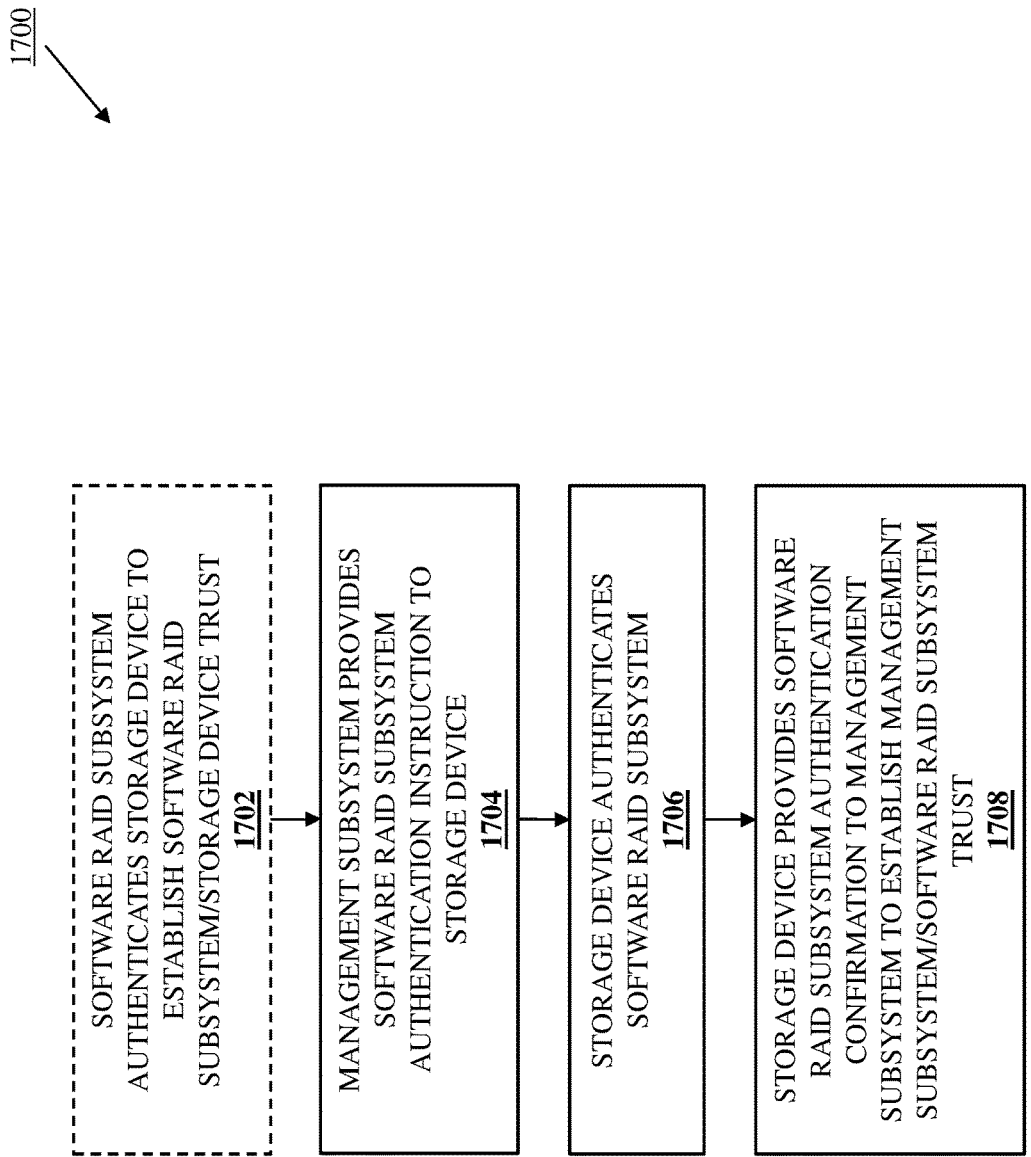
FIG. 17 is a flow chart illustrating an embodiment of a method for using a storage device to establish trust for storage-device-based communications between a software RAID subsystem and a management subsystem in a computing device.

For example, with reference to FIG. 17, an embodiment of a method 1700 for using a storage device to establish trust for storage-device-based communications between a software RAID subsystem and a management subsystem in a computing device is illustrated that may be performed during block 1004*a* of the method 1000. As discussed below, the method 1700 provides for the performance of software RAID subsystem authentication operations by the storage device in order to authenticate the software RAID subsystem and establish management subsystem/software RAID subsystem trust. As such, the storage device may operate as an authentication proxy for the management subsystem in order to establish the management subsystem/software RAID subsystem trust of the present disclosure.

Figure 18A:
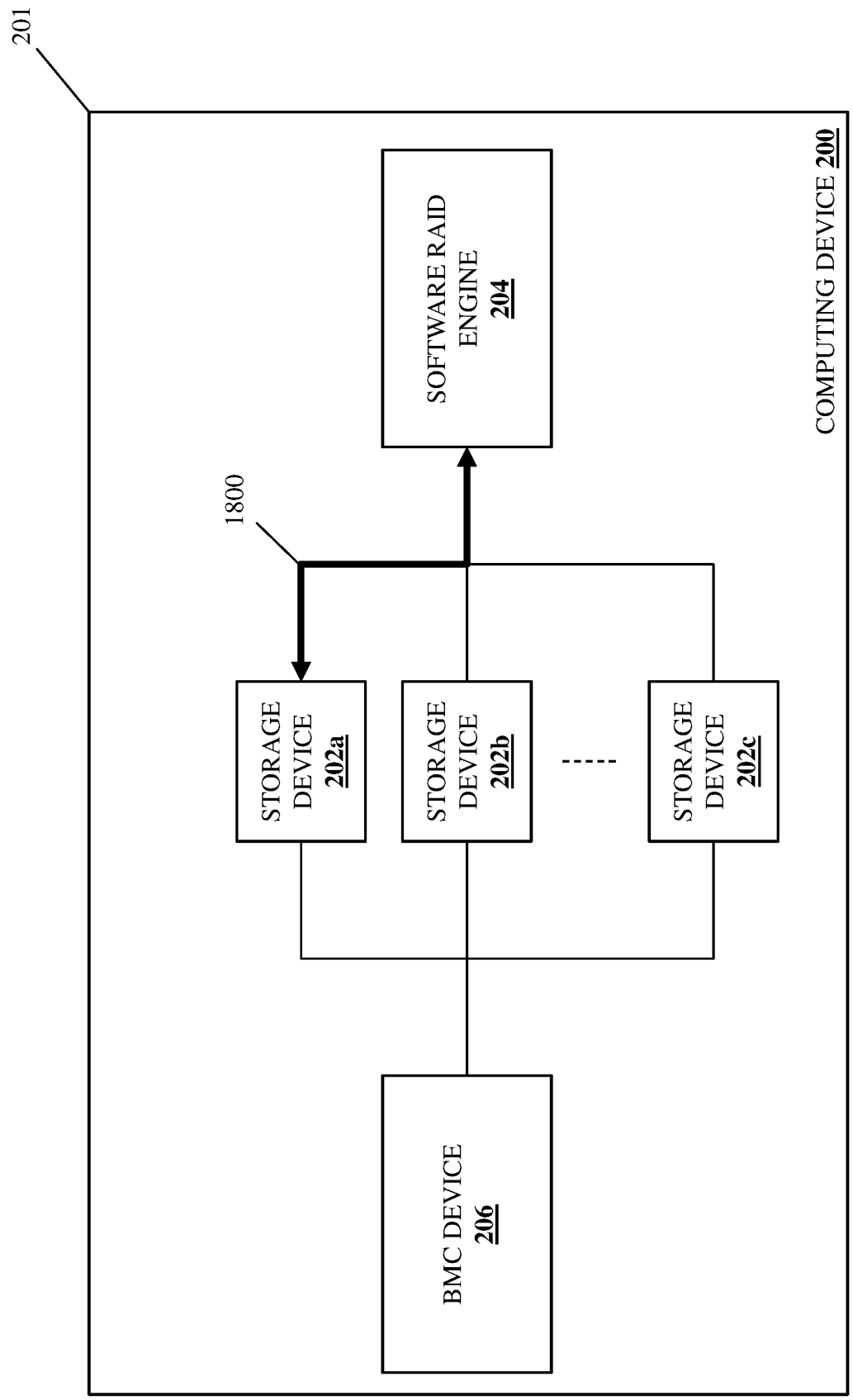
FIG. 18A is a schematic view illustrating an embodiment of the operation of the computing device of FIG. 2 during the method of FIG. 17.
Figure 18B:
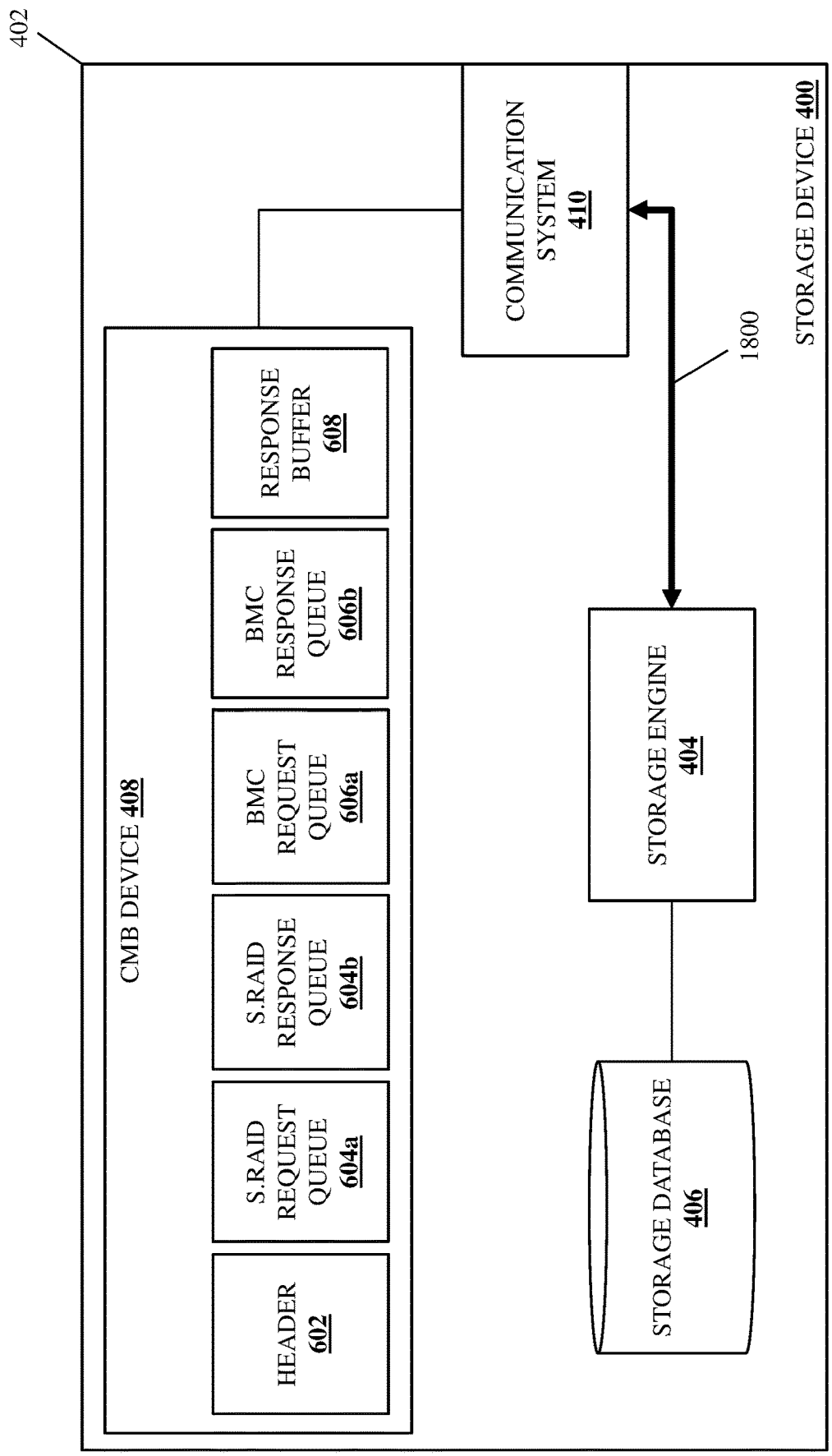
FIG. 18B is a schematic view illustrating an embodiment of the operation of the storage device of FIG. 4 during the method of FIG. 17.

The method 1700 may begin at optional block 1702 where the software RAID subsystem may authenticate the storage device to establish software RAID subsystem/storage device trust. As will be appreciated by one of skill in the art in possession of the present disclosure, optional block 1702 may be performed by the software RAID engine 204 in the computing device 200 during the method 1700 prior to responding to any communications from the storage device 202*a*/400 (e.g., prior to providing SPDM responses to SPDM challenges as part of the SPDM authentication operations described herein). With reference to FIGS. 18A and 18B, in an embodiment of optional block 1702, the software RAID engine 204 in the computing device 200 may perform storage device authentication operations 1800 with the storage engine 404 in the storage device 202*a*/400 via the communication system 410 in the storage device 202*a*/400. In a specific example, the storage device authentication operations 1800 performed by the software RAID engine 204 may be SPDM authentication operations that may include the software RAID engine 204 performing any of a variety of SPDM challenge operations with the storage device 202*a*/400, and the storage device 202*a*/400 providing any of a variety of SPDM challenge responses to those SPDM challenge operations, that one of skill in the art in possession of the present disclosure would recognize as providing for the authentication of the storage device 202a/400 with the software RAID engine 204 as per the SPDM specification.

However, while SPDM authentication operations have been described, one of skill in the art in possession of the present disclosure will appreciate how other storage device authentication operations will fall within the scope of the present disclosure as well. For example, the software RAID engine 204 in the computing device 200 may have access to a computing device component verification certificate (e.g., the SCV certificate described above that may be included in computing device provided by DELL® Inc. of Round Rock, Texas, United States) that is configured for use in verifying components that were provided in the computing device 200 during its manufacture, and the software RAID engine 204 may utilize that computing device component verification certificate during the storage device authentication operations 1800 to authenticate the storage device 202a/400 by verifying that storage device 202a/400 was provided in the computing device 200 during its manufacture. As such, following block 1702 and in addition to the BMC engine 304 having authenticated the storage device 202a/400 to establish management subsystem/storage device trust at block 1004a of the method 1000, the software RAID engine 204 in the computing device 200 may have authenticated the storage device 202a/400 such that software RAID subsystem/storage device trust is established (i.e., such that a secure communication channel has been established between the software RAID engine 204 and the storage device 202a/400).

Figure 19A:
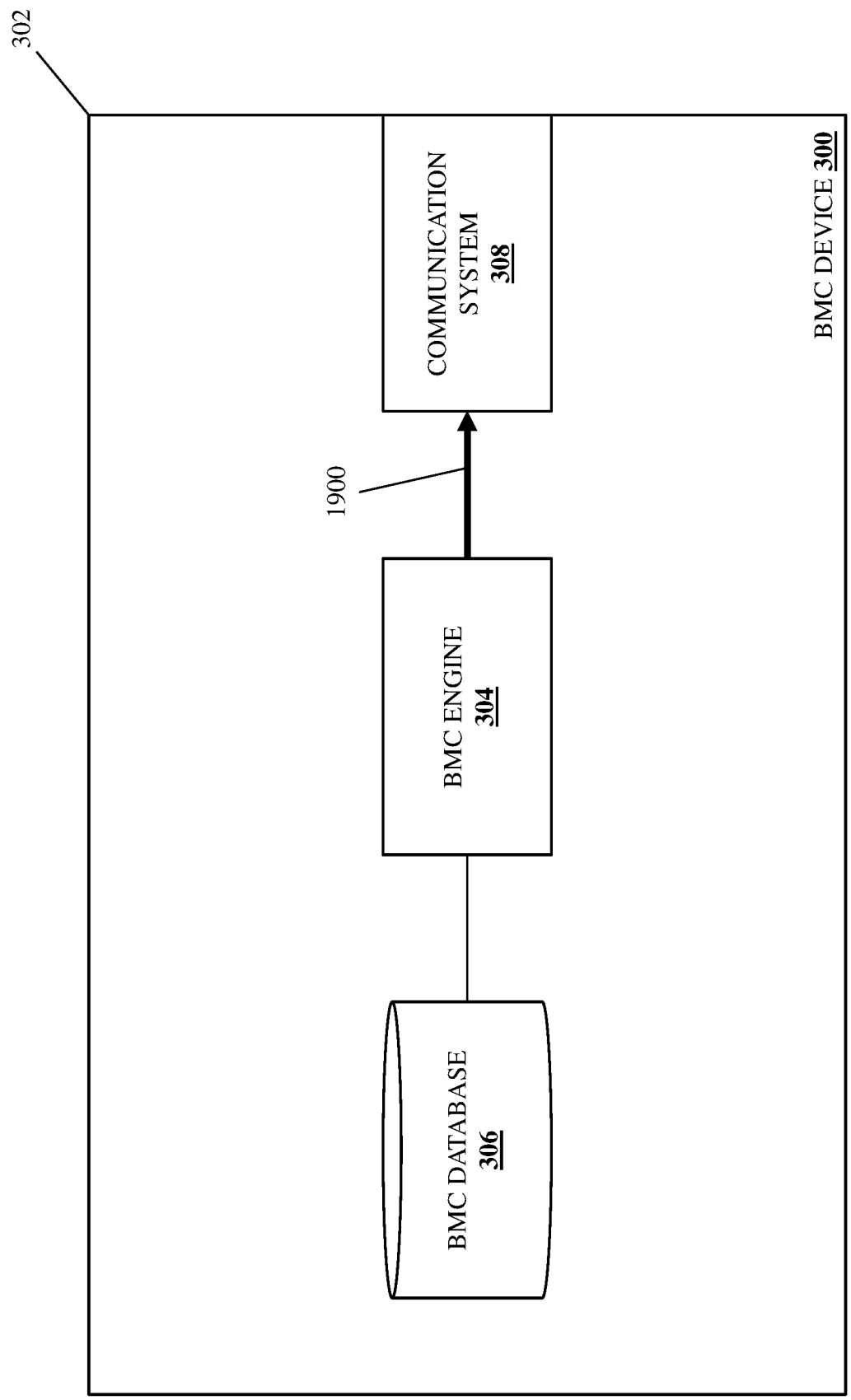
FIG. 19A is a schematic view illustrating an embodiment of the operation of the management subsystem of FIG. 3 during the method of FIG. 17.
Figure 19B:
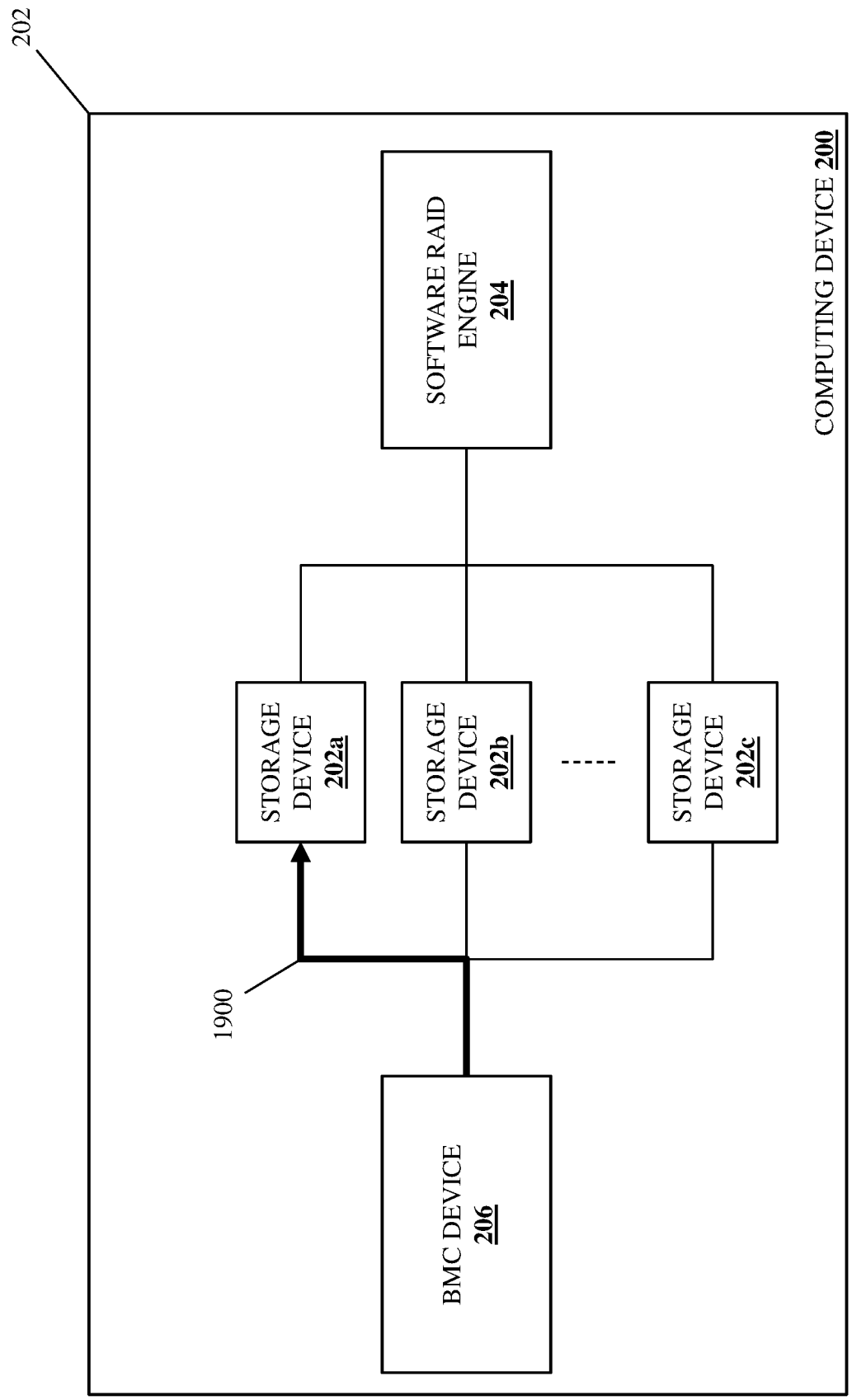
FIG. 19B is a schematic view illustrating an embodiment of the operation of the computing device of FIG. 2 during the method of FIG. 17.
Figure 19C:
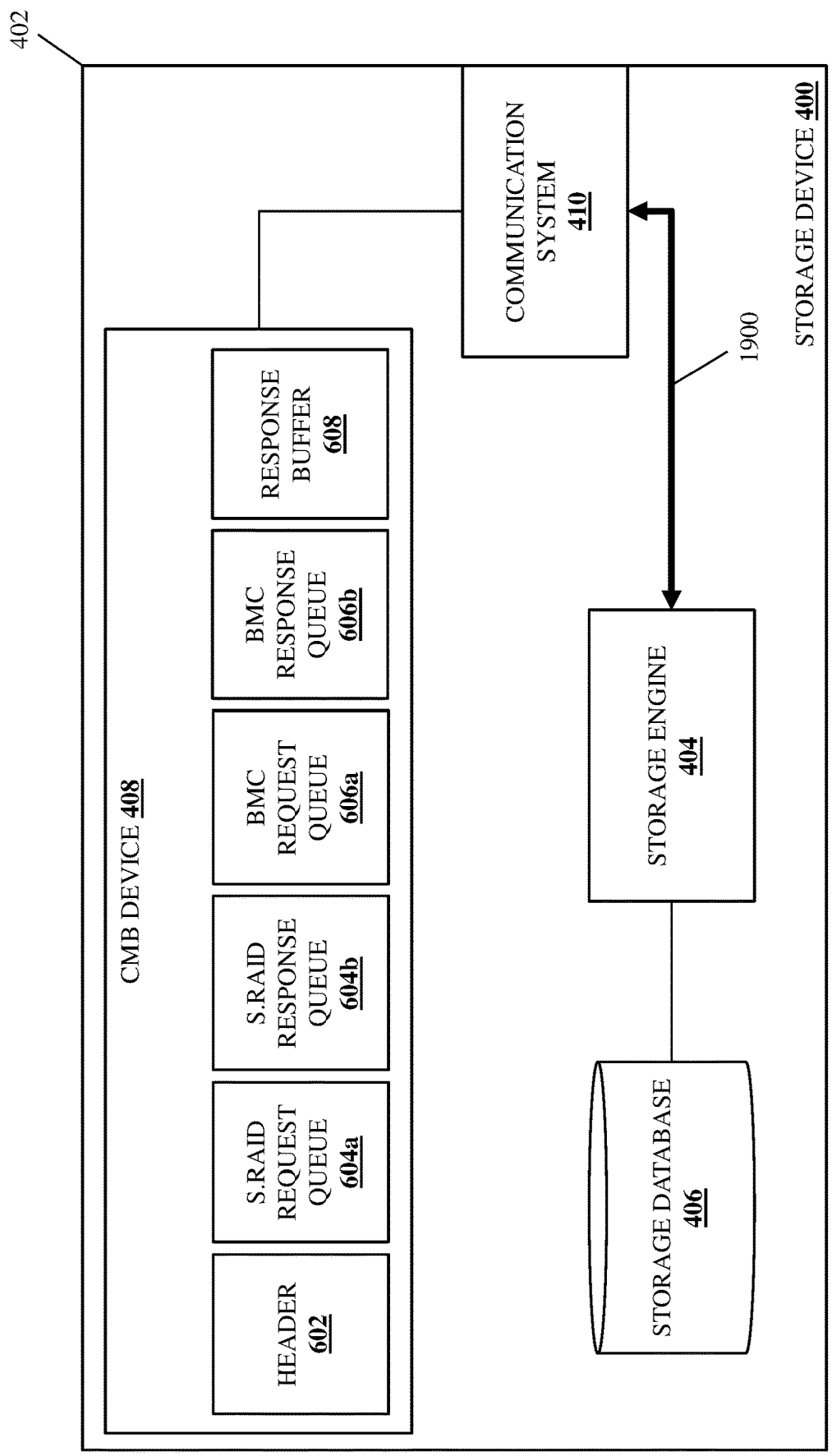
FIG. 19C is a schematic view illustrating an embodiment of the operation of the storage device of FIG. 4 during the method of FIG. 17.

The method 1700 may then proceed to (or begin at) block 1704 where the management subsystem provides a software RAID subsystem authentication instruction to the storage device. With reference to FIGS. 19A, 19B, and 19C, in an embodiment of block 1704, the BMC engine 304 in the BMC device 206/300 of the computing device 200 may perform software RAID subsystem authentication instruction provisioning operations 1900 that include generating a software RAID subsystem authentication instruction and providing that software RAID subsystem authentication instruction to the storage engine 404 in storage device 202a/400 via their communications systems 308 and 410.

In a specific example, the software RAID subsystem authentication instruction generated by the BMC engine 304 at block 1704 may be provided in an Outside Equipment Manufacturer (OEM) vendor defined command (e.g., rather than the NVMe-IM commands described above) that may be defined by the manufacturer of the computing device 200 and implemented by the vendor of the storage device 202/400, and in the example below is configured to instruct the storage device 202a/400 to authenticate the software RAID engine 204 in the computing device 200 using SPDM authentication techniques. Furthermore, in some embodiments the software RAID subsystem authentication instruction provisioning operations 1900 performed by the BMC engine 304 may include providing a root Certificate Authority (CA) certificate for the software RAID engine 204 (e.g., a software RAID subsystem identification certificate) to the storage device 202a/400 for use in performing SPDM authentication. However, embodiments in which the storage device 202a/400 includes the CA certificate for the software RAID engine 204, or obtains it in other manners, are envisioned as falling within the scope of the present disclosure as well.

Figure 20A:
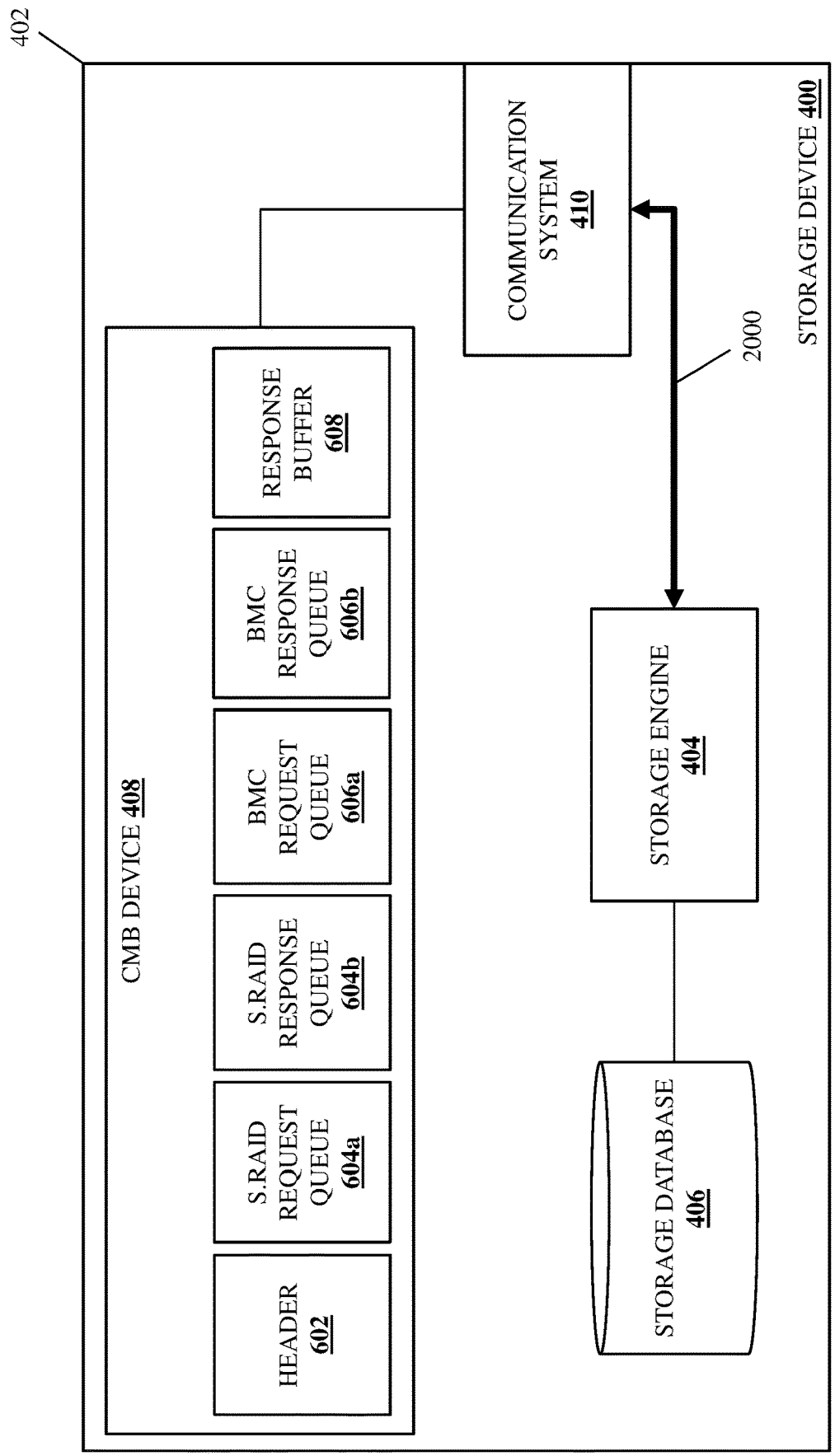
FIG. 20A is a schematic view illustrating an embodiment of the operation of the storage device of FIG. 4 during the method of FIG. 17.

The method 1700 may then proceed to block 1706 where the storage device authenticates the software RAID subsystem. With reference to FIGS. 20A and 20B, in an embodiment of block 1706 and in response to receiving the software RAID subsystem authentication instruction, the storage engine 404 in the storage device 202a/400 may perform software RAID subsystem authentication operations 2000 via its communication system 410 to authenticate the software RAID engine 204 in the computing device 200. Similarly as described in the specific examples above, the software RAID subsystem authentication operations 2000 performed by the storage device 202a/400 may be SPDM authentication operations that thus may include the plurality authentication requests and responses that one of skill in the art in possession of the present disclosure will recognize operate to allow the storage device 202a/400 to authenticate the software RAID engine 204 and establish storage device/software RAID subsystem trust (i.e., such that a secure communication channel has been established between the storage device 202a/400 and the software RAID engine 204).

Figure 21A:
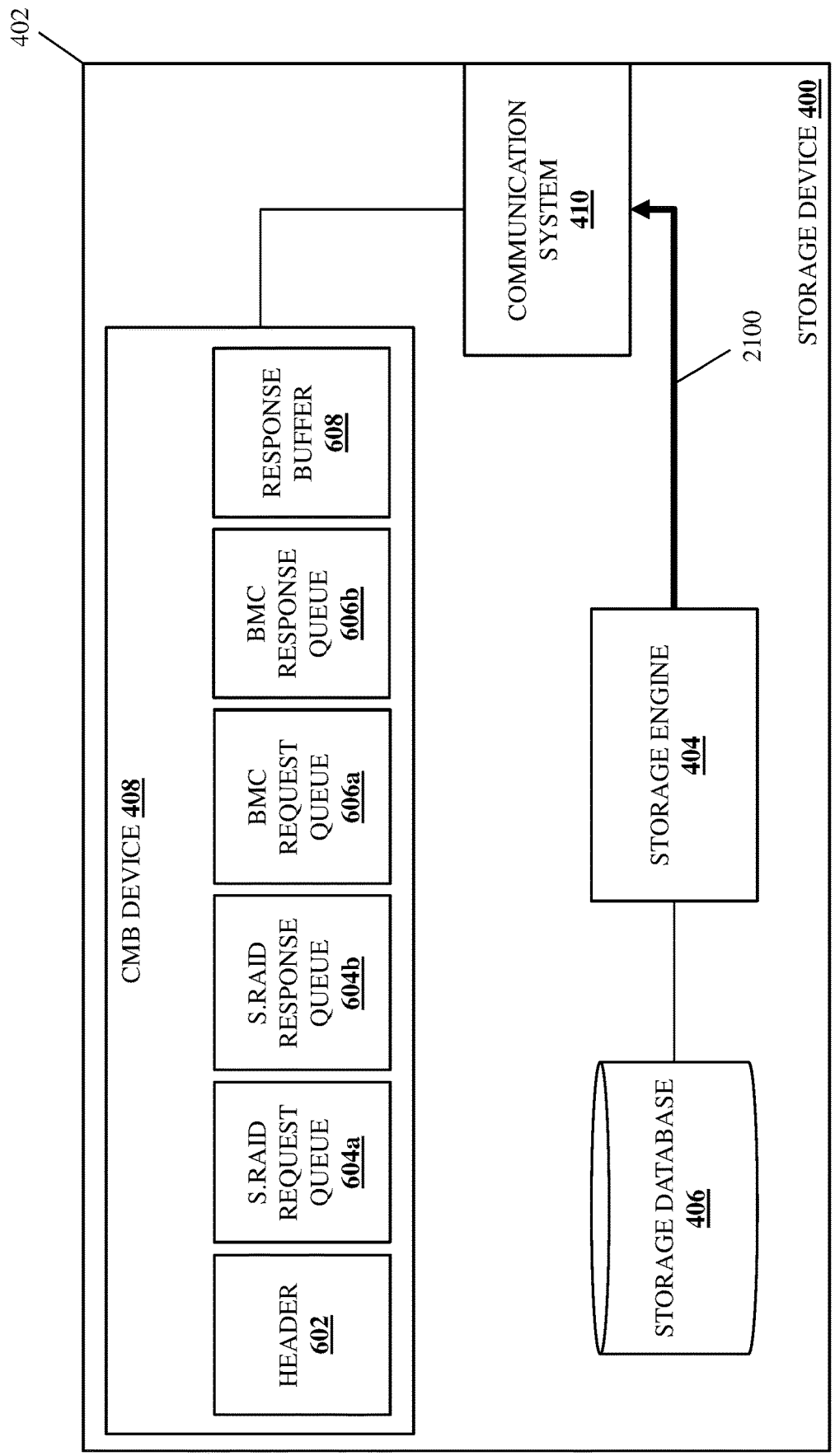
FIG. 21A is a schematic view illustrating an embodiment of the operation of the storage device of FIG. 4 during the method of FIG. 17.
Figure 21C:
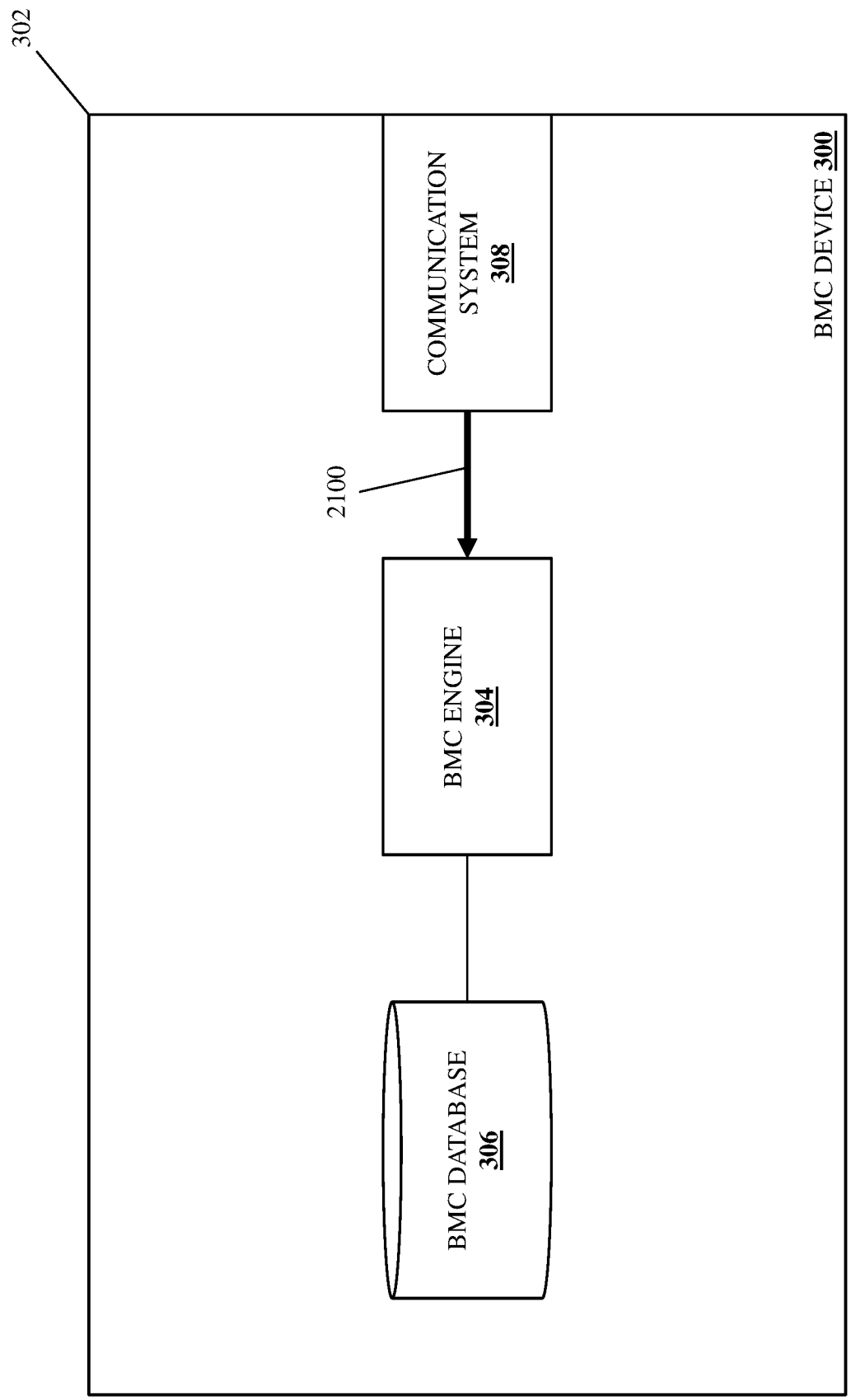
FIG. 21C is a schematic view illustrating an embodiment of the operation of the management subsystem of FIG. 3 during the method of FIG. 17.

The method 1700 may then proceed to block 1708 where the storage device provides a software RAID subsystem authentication confirmation to the management subsystem to establish management subsystem/software RAID subsystem trust. With reference to FIGS. 21A, 21B, and 21C, in an embodiment of block 1708, the storage engine 404 in the storage device 202a/400 may perform software RAID subsystem authentication confirmation provisioning operations 2100 that include generating a software RAID subsystem authentication confirmation and providing the software RAID subsystem authentication confirmation to the BMC engine 304 in the BMC device 206/300 of the computing device 200 via their communication systems 410 and 308. As will be appreciated by one of skill in the art in possession of the present disclosure, in response to the BMC engine 304 receiving the software RAID subsystem authentication confirmation, management subsystem/software RAID subsystem trust will be established (i.e., such that a secure communication channel has been established between the BMC engine 304 and the software RAID engine 204) based on the management subsystem/storage device trust and the storage device/software RAID subsystem trust discussed above.

Furthermore, one of skill in the art in possession of the present disclosure will appreciate how the method 1000 involving blocks 1002b-1006b may proceed from block 1002b to block 1004b where the software RAID subsystem uses the storage device to establish software RAID subsystem/management subsystem trust similarly as the management subsystem described above during the method 1700. As such, the BMC engine 304 may optionally authenticate the storage device 202a/400 to establish management subsystem/storage device trust similarly as described above at optional block 1702, the software RAID engine 204 may provide a management subsystem authentication instruction to the storage device 202a/400 similarly as described above at block 1704, the storage device 202a/400 may authenticate the BMC engine 304 similarly as described above at block 1706, and the storage device 202a/400 may provide the management subsystem authentication confirmation to the software RAID engine 204 to establish software RAID subsystem/management subsystem trust similarly as described above at block 1708.

Returning to the embodiment of the method 1000 involving blocks 1002a-1006a, the method 1000 may proceed from block 1004a to block 1006a where the management subsystem transmits communications with the software RAID subsystem via the storage device memory subsystem in the storage device. In an embodiment, at block 1006a, the BMC engine 304 in the BMC device 206/300 of the computing device 200 may transmit trusted communications with the software RAID engine 204 in the computing device 200 via the storage device 202*a*/400 (e.g., the Out-Of-Band (OOB) management communications transmitted as described above with reference to the method 500, the OOB configuration communications transmitted as described by at least some of the inventors of the present disclosure in U.S. patent application Ser. No. 18/228,374, filed Jul. 31, 2023, the disclosure of which is incorporated herein by reference in its entirety, etc.).

Furthermore, one of skill in the art in possession of the present disclosure will appreciate how the method 1000 involving blocks 1002*b*-1006*b* may also proceed from block 1004*b* to block 1006*b* where the software RAID subsystem transmits communications with the management subsystem via the storage device memory subsystem in the storage device similarly as the management subsystem described above at block 1006*a*. As such, at block 1006*b* the software RAID engine 204 in the computing device 200 may transmit trusted communications with the BMC engine 304 in the BMC device 206/300 of the computing device 200 via the storage device 202*a*/400 (e.g., the OOB management communications transmitted as described above with reference to the method 500, the OOB configuration communications transmitted as described by at least some of the inventors of the present disclosure in U.S. patent application Ser. No. 18/228,374, filed Jul. 31, 2023, the disclosure of which is incorporated herein by reference in its entirety, etc.).

Thus, systems and methods have been described that provide for trusted storage-device-based communications between a management subsystem and a software RAID subsystem. For example, the software RAID/management communication trusted storage-device-based communication system of the present disclosure may include a chassis housing a software RAID subsystem, a storage device that is coupled to the software RAID subsystem and that includes a storage device memory subsystem, and a management subsystem that is coupled to the storage device. The management subsystem authenticates the storage device to establish management subsystem/storage device trust between the management subsystem and the storage device and, in response, uses the storage device to establish management subsystem/software RAID subsystem trust between the management subsystem and the software RAID subsystem. In response to establishing the management subsystem/storage device trust and the management subsystem/software RAID subsystem trust, the management subsystem transmits communications with the software RAID subsystem via the storage device memory subsystem in the storage device. As such, the authenticity of communications transmitted via a storage device and between a management subsystem and a software RAID subsystem may be ensured.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A software Redundant Array of Independent Disk (RAID)/management trusted storage-device-based communication system, comprising:
   a chassis;
   a software Redundant Array of Independent Disk (RAID) subsystem that is housed in the chassis;
   a storage device that is housed in the chassis, that is coupled to the software RAID subsystem, and that includes a storage device memory subsystem; and
   a management subsystem that is housed in the chassis and that is coupled to the storage device, wherein the management subsystem is configured to:
      authenticate the storage device to establish management subsystem/storage device trust between the management subsystem and the storage device;
      use, in response to establishing the management subsystem/storage device trust, the storage device to establish management subsystem/software RAID subsystem trust between the management subsystem and the software RAID subsystem; and
      transmit, in response to establishing the management subsystem/storage device trust and the management subsystem/software RAID subsystem trust, communications with the software RAID subsystem via the storage device memory subsystem in the storage device.

2. The system of claim 1, wherein the using the storage device to establish the management subsystem/software RAID subsystem trust includes the management subsystem:
   providing software RAID subsystem authentication requests for the software RAID subsystem in the storage device memory subsystem of the storage device, wherein the software RAID subsystem is configured to retrieve the software RAID subsystem authentication requests and provide software RAID subsystem authentication responses in the storage device memory subsystem of the storage device;
   retrieving the software RAID subsystem authentication responses from the storage device memory subsystem of the storage device; and
   authenticating, based on the software RAID subsystem authentication responses, the software RAID subsystem to establish the management subsystem/software RAID subsystem trust.

3. The system of claim 1, wherein the using the storage device to establish the management subsystem/software RAID subsystem trust includes the management subsystem:
   providing a software RAID subsystem authentication instruction to the storage device that is configured to cause the storage device to authenticate the software RAID subsystem; and
   receiving, from the storage device, a software RAID subsystem authentication confirmation that confirms the authentication of the software RAID subsystem and establishes the management subsystem/software RAID subsystem trust.

4. The system of claim 1, wherein the management subsystem/software RAID subsystem trust is established using Security Protocol and Data Model (SPDM) communications.

5. The system of claim 4, wherein the management subsystem is configured to:
   tunnel one or more of the SPDM communications in authentication commands transmitted to the software RAID subsystem via the storage device memory subsystem in the storage device.

6. The system of claim 1, wherein the storage device is a Non-Volatile Memory express (NVMe) storage device, and the storage device memory subsystem is a Controller Memory Buffer (CMB) memory subsystem in the NVMe storage device.

7. The system of claim 1, wherein the software RAID subsystem is configured to:

authenticate the storage device to establish software RAID subsystem/storage device trust between the software RAID subsystem and the storage device;

use, in response to establishing the software RAID subsystem/storage device trust, the storage device to establish software RAID subsystem/management subsystem trust between the software RAID subsystem and the management subsystem; and transmit, in response to establishing the software RAID subsystem/storage device trust and the software RAID subsystem/management subsystem trust, the communications with the management subsystem via the storage device memory subsystem in the storage device.

8. An Information Handling System (IHS), comprising:
a processing system; and
a memory system that is coupled to the processing system and that includes instructions that, when executed by the processing system, cause the processing system to provide a management engine that is configured to:
authenticate a storage device that is coupled to the processing system to establish management engine/storage device trust between the processing system and the storage device;
use, in response to establishing the management engine/storage device trust, the storage device to establish management engine/software Redundant Array of Independent Disk (RAID) subsystem trust between the management engine and a software RAID subsystem that is coupled to the storage device; and
transmit, in response to establishing the management engine/storage device trust and the management engine/software RAID subsystem trust, communications with the software RAID subsystem via the storage device memory subsystem in the storage device.

9. The IHS of claim 8, wherein the using the storage device to establish the management engine/software RAID subsystem trust includes the management engine:
providing software RAID subsystem authentication requests for the software RAID subsystem in the storage device memory subsystem of the storage device, wherein the software RAID subsystem authentication requests are configured to be retrieved by the software RAID subsystem and cause the software RAID subsystem to provide software RAID subsystem authentication responses in the storage device memory subsystem of the storage device;
retrieving the software RAID subsystem authentication responses from the storage device memory subsystem of the storage device; and
authenticating, based on the software RAID subsystem authentication responses, the software RAID subsystem to establish the management engine/software RAID subsystem trust.

10. The IHS of claim 8, wherein the using the storage device to establish the management engine/software RAID subsystem trust includes the management engine:
providing a software RAID subsystem authentication instruction to the storage device that is configured to cause the storage device to authenticate the software RAID subsystem; and
receiving, from the storage device, a software RAID subsystem authentication confirmation that confirms the authentication of the software RAID subsystem and establishes the management engine/software RAID subsystem trust.

11. The IHS of claim 8, wherein the management engine/software RAID subsystem trust is established using Security Protocol and Data Model (SPDM) communications.

12. The IHS of claim 11, wherein the management engine is configured to:
tunnel one or more of the SPDM communications in authentication commands transmitted to the software RAID subsystem via the storage device memory subsystem in the storage device.

13. The IHS of claim 8, wherein the storage device is a Non-Volatile Memory express (NVMe) storage device, and the storage device memory subsystem is a Controller Memory Buffer (CMB) memory subsystem in the NVMe storage device.

14. A method for providing trusted storage-device-based communications between a software Redundant Array of Independent Disk (RAID) subsystem and a management subsystem in a computing device, comprising:
authenticating, by a management subsystem, a storage device that is coupled to the management subsystem to establish management subsystem/storage device trust between the management subsystem and the storage device;
using, by the management subsystem in response to establishing the management subsystem/storage device trust, the storage device to establish management subsystem/software Redundant Array of Independent Disk (RAID) subsystem trust between the management subsystem and a software RAID subsystem that is coupled to the storage device; and
transmitting, by the management subsystem in response to establishing the management subsystem/storage device trust and the management subsystem/software RAID subsystem trust, communications with the software RAID subsystem via the storage device memory subsystem in the storage device.

15. The method of claim 14, wherein the using the storage device to establish the management subsystem/software RAID subsystem trust includes:
providing, by the management subsystem, software RAID subsystem authentication requests for the software RAID subsystem in the storage device memory subsystem of the storage device;
retrieving, by the software RAID subsystem, the software RAID subsystem authentication requests;
providing, by the software RAID subsystem in response to retrieving the software RAID subsystem authentication requests, software RAID subsystem authentication responses in the storage device memory subsystem of the storage device;
retrieving, by the management subsystem, the software RAID subsystem authentication responses from the storage device memory subsystem of the storage device; and
authenticating, by the management subsystem based on the software RAID subsystem authentication responses, the software RAID subsystem to establish the management subsystem/software RAID subsystem trust.

16. The method of claim 14, wherein the using the storage device to establish the management subsystem/software RAID subsystem trust includes:
providing, by the management subsystem, a software RAID subsystem authentication instruction to the storage device that is configured to cause the storage device to authenticate the software RAID subsystem; and receiving, by the management subsystem from the storage device, a software RAID subsystem authentication confirmation that confirms the authentication of the software RAID subsystem and establishes the management subsystem/software RAID subsystem trust.

17. The method of claim 14, wherein the management subsystem/software RAID subsystem trust is established using Security Protocol and Data Model (SPDM) communications.

18. The method of claim 17, further comprising:
tunnelling, by the management subsystem, one or more of the SPDM communications in authentication commands transmitted to the software RAID subsystem via the storage device memory subsystem in the storage device.

19. The method of claim 14, wherein the storage device is a Non-Volatile Memory express (NVMe) storage device, and the storage device memory subsystem is a Controller Memory Buffer (CMB) memory subsystem in the NVMe storage device.

20. The method of claim 14, further comprising:

authenticating, by the software RAID subsystem, the storage device to establish software RAID subsystem/storage device trust between the software RAID subsystem and the storage device;

using, by the software RAID subsystem in response to establishing the software RAID subsystem/storage device trust, the storage device to establish software RAID subsystem/management subsystem trust between the software RAID subsystem and the management subsystem; and transmitting, by the software RAID subsystem in response to establishing the software RAID subsystem/storage device trust and the software RAID subsystem/management subsystem trust, the communications with the management subsystem via the storage device memory subsystem in the storage device.

* * * * *